(12) United States Patent
Gotou et al.

(10) Patent No.: US 6,566,827 B2
(45) Date of Patent: May 20, 2003

(54) DISK DRIVE APPARATUS AND MOTOR

(75) Inventors: Makoto Gotou, Nishinomiya (JP); Masaaki Ochi, Hirakata (JP); Hideaki Mori, Moriguchi (JP); Shingo Fukamizu, Takatsuki (JP); Susumu Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 94 days.

(21) Appl. No.: 10/005,955

(22) Filed: Nov. 8, 2001

(65) Prior Publication Data

US 2002/0053890 A1 May 9, 2002

(30) Foreign Application Priority Data

Nov. 9, 2000 (JP) ........................................ 2000-341562

(51) Int. Cl.[7] .............................................. H02K 23/00
(52) U.S. Cl. ........................ 318/254; 318/599; 318/439
(58) Field of Search ................................ 318/254, 293, 318/599, 439

(56) References Cited

U.S. PATENT DOCUMENTS

| | | | |
|---|---|---|---|
| 4,710,686 A | * 12/1987 | Guzik ........................ 318/293 |
| 5,115,359 A | * 5/1992 | Sidman ........................ 360/51 |
| 5,473,232 A | 12/1995 | Tamaki et al. ............... 318/439 |
| 5,982,118 A | * 11/1999 | Gotou et al. ................. 318/254 |
| 5,986,426 A | * 11/1999 | Rowan ........................ 318/432 |

FOREIGN PATENT DOCUMENTS

JP         2000050671 A     2/2000

* cited by examiner

Primary Examiner—Rita Leykin
(74) Attorney, Agent, or Firm—Akin Gump Strauss Hauer & Feld, L.L.P.

(57) ABSTRACT

In a disk drive apparatus of the present invention, power transistors of a power supplying part execute high-frequency switching operation and form current paths to three-phase windings so as to rotate a disk, a position detecting part produces a position signal which responds with terminal voltages of the three-phase windings, an activation operation part controls active periods of the power transistors in response to an output signal of the position detecting part, a commanding part produces a command signal in response to an output pulse signal of the position detecting part, and a switching operation block produces a switching pulse signal in response to a comparison result of a current detection signal with the command signal. The activation operation part produces a slew-rate switching signal which responds with the switching pulse signal, and causes at least a power transistor of the power supplying part to follow the slew-rate switching signal, thereby executing high-frequency switching of the power transistor in response to the slew-rate switching signal.

40 Claims, 32 Drawing Sheets

F I G. 2
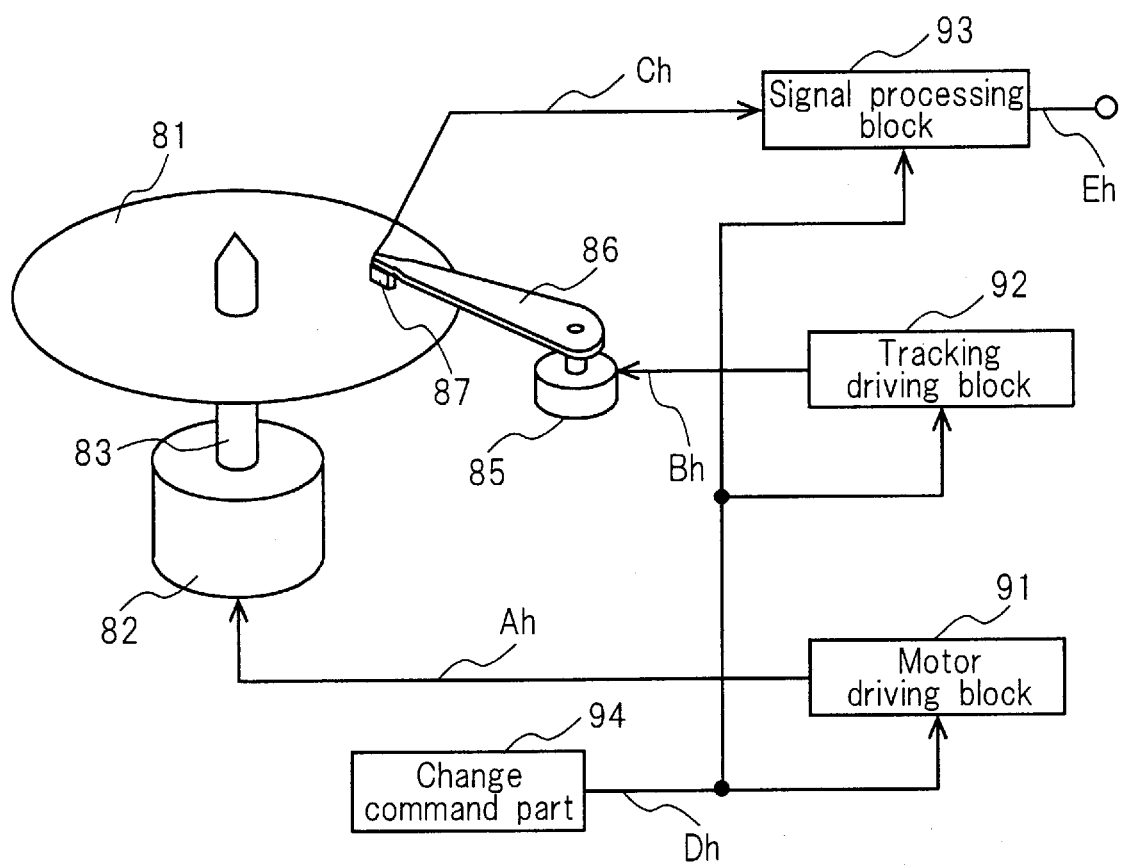

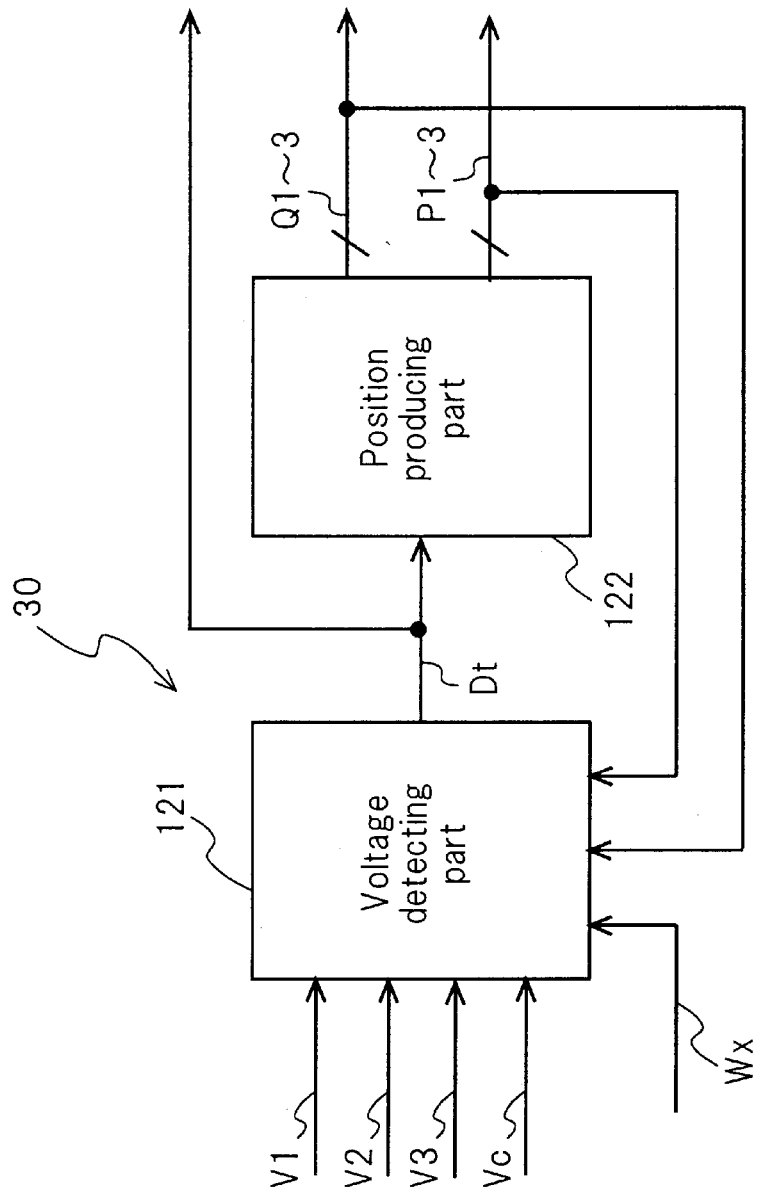
F I G. 4

DISK DRIVE APPARATUS AND MOTOR

BACKGROUND OF THE INVENTION

The present invention relates to a disk drive apparatus including a motor and a motor which is suitable to be used in a disk drive apparatus.

In recent years, a disk drive apparatus such as a hard disk drive apparatus (a HDD apparatus), an optical disk drive apparatus and a floppy disk drive apparatus includes a motor which alters current paths to windings by transistors so as to drive a disk. Conventionally, in this kind of motor, current paths to windings are altered by PNP-type bipolar power transistors and NPN-type bipolar power transistors.

FIG. 32 shows a conventional motor. The operation of the motor is briefly described below. A rotor 2011 has a field part formed by a permanent magnet. Three position detecting elements of a position detector 2041 detect the magnetic field of the field part of the rotor 2011. In other words, the position detector 2041 generates two sets of three-phase voltage signals, Kp1, Kp2 and Kp3, and Kp4, Kp5 and Kp6, from the three-phase output signals of the three position detecting elements in response to the rotation of the rotor 2011. A first distributor 2042 produces three-phase low-side activation control signals Lp1, Lp2 and Lp3 responding with the voltage signals Kp1, Kp2 and Kp3. The first distributor 2042 supplies the low-side activation control signals Lp1, Lp2 and Lp3 to the bases of low-side NPN-type bipolar power transistors 2021, 2022 and 2023 so as to control the activation of the NPN-type bipolar power transistors 2021, 2022 and 2023. A second distributor 2043 produces three-phase high-side activation control signals Mp1, Mp2 and Mp3 responding with the voltage signals Kp4, Kp5 and Kp6. The second distributor 2043 supplies the high-side activation control signals Mp1, Mp2 and Mp3 to the bases of high-side PNP-type bipolar power transistors 2025, 2026 and 2027 so as to control the activation of the PNP-type bipolar power transistors 2025, 2026 and 2027. As a result, the current paths to three-phase windings 2012, 2013 and 2014 are controlled so as to be opened or closed.

In this conventional configuration, power losses of the power transistors are large, and the power efficiency of the motor is very low. The NPN-type bipolar power transistors 2021, 2022 and 2023 and the PNP-type bipolar power transistors 2025, 2026 and 2027 supply drive voltages to the windings 2012, 2013 and 2014 by controlling the voltage drops across the emitters and the collectors of them in an analogue manner. A residual voltage in each power transistor is large, and a large power loss and a heat are generated by the product of the residual voltage and a drive current of each power transistor. As a result, the power efficiency of the motor is low, and the power consumption of the disk drive apparatus is large. In addition, the power loss and the heat of the disk drive apparatus raise a temperature of a disk, and bit errors occur frequently during recording and reproducing a signal on/from a disk.

U.S. Pat. No. 5,982,118 and U.S. Pat. No. 5,473,232 disclose motors wherein power transistors are subjected to PWM operation (PWM: Pulse Width Modulation) to reduce power consumption. However, the motor configurations in accordance with U.S. Pat. No. 5,982,118 and U.S. Pat. No. 5,473,232 cause a very large high-frequency switching noise owing to the PWM operation of the power transistors. This switching noise disturbs a reproduction signal from the head and significantly raises the bit error rate of the reproduction signal of the disk drive apparatus.

In a magnetic disk drive apparatus (such as a HDD apparatus), and an optical disk drive apparatus (such as a DVD apparatus), a high-frequency noise must be minimized to reproduce stably a signal from a high-density disk. However, when power transistors execute PWM operation, a very large high-frequency switching noise occurs. Hence, the reliability of the reproduction signal of the disk drive apparatus is significantly lowed by the high-frequency noise. It is thus difficult to allow power transistors to execute PWM operation in a disk drive apparatus.

It is therefore an object of the present invention to solve the above-mentioned problems respectively or concurrently and to provide a highly reliable disk drive apparatus, which has a low power consumption and a low noise, and a motor suitable to drive a disk or the like.

BRIEF SUMMARY OF THE INVENTION

A disk drive apparatus in accordance with the present invention comprises:
  head means for reproducing a signal from a disk;
  processing means for processing an output signal from said head means and outputting a processed signal;
  a rotor, having a field part which generates field fluxes, for driving said disk;
  Q-phase windings (Q is an integer of 3 or more);
  voltage supplying means, including two output terminals, for supplying a DC voltage;
  power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
  position detecting means for producing a position signal which responds with the rotation of said rotor;
  activation operation means for controlling active periods of said Q first power transistors and said Q second power transistors responding with an output signal of said position detecting means, each of said active periods being larger than the period of 360/Q electrical degrees;
  commanding means for producing a command signal which responds with a rotational speed of said disk; and
  switching operation means for causing at least one of said Q first power transistors and said Q second power transistors to perform high-frequency switching responding with said command signal; and that
  said switching operation means includes:
    current detecting means for producing a current detection signal which responds with or corresponds to a composed current to said Q-phase windings from said voltage supplying means, and
    switching control means for producing a switching pulse signal which responds with said current detection signal and said command signal, and
    said activation operation means produces at least a slew-rate switching signal which responds with said switching pulse signal at a control terminal side of at least one power transistor among said Q first power transistors and said Q second power transistors, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

With this configuration, since at least one of the Q first power transistors and the Q second power transistors performs high-frequency switching operation, the power losses of the power transistors are very small. In other words, the heat generation of the power transistors is very low, and a disk drive apparatus with a low power consumption is realized. In addition, since each of the active periods of the power transistors is larger than the period of 360/Q degrees and the composed current to the Q-phase windings is controlled responding with the command signal, the fluctuation of the generated drive force is remarkably reduced. So the acoustic noise and the vibration of the disk are reduced remarkably. Furthermore, since at least one of the power transistors executes high-frequency switching operation responding with the switching pulse signal of the switching operation means, the slew-rate switching signal is produced easily. Still further, the power transistor is caused to follow the slew-rate switching signal, and supplies the drive voltage signal to one of the windings. Hence, the drive voltage signal to the winding becomes a high-frequency voltage signal which has adequate voltage slopes responding with the slew-rate switching signal. So the high-frequency noise due to the high-frequency switching operation of the power transistor is reduced significantly. As a result, bit errors of the reproduction signal in the disk drive apparatus is reduced significantly. Therefore, a high-performance disk drive apparatus with a low power consumption, a low error rate of the reproduction signal, a low acoustic noise and a small vibration is realized.

A disk drive apparatus in accordance with another aspect of the present invention comprises:

head means for reproducing a signal from a disk;

processing means for processing an output signal from said head means and outputting a processed signal;

a rotor, having a field part which generates field fluxes, for driving said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said disk; and switching operation means for causing at least one of said Q first power transistors and said Q second power transistors to perform high-frequency switching responding with said command signal; and that each of said Q first power transistors is a first NMOS-FET power transistor for forming a current path from the positive terminal side of said voltage supplying means to one of said Q-phase windings, each of said Q second power transistors is a second NMOS-FET power transistor for forming a current path from the negative terminal side of said voltage supplying means to one of said Q-phase windings, said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces at least a slew-rate switching signal at a control terminal side of at least one power transistor among said first NMOS-FET power transistors responding with said switching pulse signal, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

With this configuration, since at least one of the Q first power transistors and the Q second power transistors performs high-frequency switching operation, the power losses of the power transistors are very small. In other words, the heat generation of the power transistors is very low, and a disk drive apparatus with a low power consumption is realized. In addition, since each of the active periods of the power transistors is larger than the period of 360/Q electrical degrees and the composed current to the Q-phase windings is controlled responding with the command signal, the fluctuation of the generated drive force is remarkably reduced. So the acoustic noise and the vibration of the disk are reduced remarkably. Furthermore, since at least one of the power transistors executes high-frequency switching operation responding with the switching pulse signal of the switching operation means, the slew-rate switching signal is produced easily. Still further, at least one of the first N-channel FET power transistors is caused to follow the slew-rate switching signal, and supplies the drive voltage signal to one of the windings. Hence, the drive voltage signal to the winding becomes a high-frequency voltage signal which has adequate voltage slopes responding with the slew-rate switching signal. So the high-frequency noise due to the high-frequency switching operation of the first N-channel FET power transistor is reduced significantly. Furthermore, N-channel FET power transistors attain high-frequency switching operation with a low resistance during the ON period. Still further, the N-channel FET power transistors are easily integrated with other resistors and transistors on a small semiconductor chip. Therefore, a high-performance disk drive apparatus with a low power consumption, a low error rate of the reproduction signal, a low acoustic noise and a small vibration is realized.

A disk drive apparatus in accordance with still another aspect of the present invention comprises:

head means for reproducing a signal from a disk;

processing means for processing an output signal from said head means and outputting a processed signal;

a rotor, having a field part which generates field fluxes, for driving said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said disk; and switching operation means for causing at least one of said Q first power transistors and said Q second power transistors to perform high-frequency switching responding with said command signal; and that said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces two slew-rate switching signals which responds with said switching pulse signal at control terminal sides of two of said Q first power transistors, each of said two slew-rate switching signals having a smoothed voltage slope in at least one of rising and falling slopes, and causes said two of said Q first power transistors to perform high-frequency switching substantially simultaneously responding with said two slew-rate switching signals, when said two of said Q first power transistors alter current paths to said Q-phase windings while at least one of said Q second power transistors remains ON without ON-OFF switching.

With this configuration, since at least one of the Q first power transistors and the Q second power transistors performs high-frequency switching operation, the power losses of the power transistors are very small. In other words, the heat generation of the power transistors is very low, and a disk drive apparatus with a low power consumption is realized. In addition, since each of the active periods of the power transistors is larger than the period of 360/Q degrees and the composed current to the Q-phase windings is controlled responding with the command signal, the fluctuation of the generated drive force is remarkably reduced. In particular, when the two of the first power transistors alter current paths to the Q-phase windings, the two of the first power transistors are caused to perform high-frequency switching operation substantially simultaneously responding with the switching pulse signal, whereby the alteration of current paths is smoothened. Hence, the acoustic noise and the vibration of the disk are reduced greatly. Furthermore, since the two slew-rate switching signals which responds with the switching pulse signal of the switching operation means are produced at the control terminal sides of the two of the first power transistors, the two of the first power transistors execute high-frequency switching operation responding with the two slew-rate switching signals. Hence, the drive voltage signals to the windings become high-frequency voltage signals each of which have adequate voltage slopes responding with each of the two slew-rate switching signals. So the high-frequency noise due to the high-frequency switching operation of the power transistors is reduced significantly. As a result, bit errors of the reproduction signal in the disk drive apparatus are reduced significantly. Therefore, a high-performance disk drive apparatus with a low power consumption, a low error rate of the reproduction signal, a low acoustic noise and a small vibration is realized.

Still further, since the heat generation of the power transistors is very low, the power transistors can be integrated easily with other semiconductor elements (resistors and transistors) on a small one-chip silicon substrate. In particular, an N-channel FET power transistor can realize a high-performance power transistor in a smaller chip area than a P-channel FET power transistor, and the N-channel FET power transistor is suitable to a power transistor. As a result, a low-cost disk drive apparatus is realized.

Still further, in case that the switching control means produces a single switching pulse signal which responds with the comparison result between the current detection signal and the command signal, the slew-rate switching signals responding with the single switching pulse signal are produced easily, and one or two of the first power transistors are caused to perform high-frequency switching operation substantially simultaneously responding with the slew-rate switching signal. Hence, while the high-frequency drive voltage signals to the windings have adequate voltage slopes in at least one of the rising and falling slopes, the composed current to the windings is controlled accurately responding with the command signal. As a result, a high-performance disk drive apparatus with a low current ripple, a small vibration, a low acoustic noise and a low power consumption is realized.

In addition, in case that the position detecting means produces position signals responding with the terminal voltages of the Q-phase windings, it is unnecessary to use position detecting elements for detecting the rotational position. Furthermore, in case that the commanding means produces a command signal responding with the rotational speed of the disk by using a detected pulse signal (a position signal) which responds with the terminal voltages of the windings, no speed detecting element is required. Therefore, a low-cost disk drive apparatus with reduced components is realized.

In addition, the position detecting means stops the detection operation of the terminal voltages of the windings during stop periods which include at least one of the rising and falling slopes of the slew-rate switching signal, and the position detecting means carries out the detection operation of the terminal voltages of the windings during the rest periods except the stop periods. This eliminates the influence of the high-frequency voltage noise due to the high-frequency switching drive voltage signals which have slew-rate slopes, whereby the position detecting means can accurately detect the terminal voltages of the windings, such as the zero-crossing point of a back electromotive force. In particular, in case that a noise eliminating signal is produced by responding with the switching pulse signal, it is possible to produce accurately the noise eliminating signal which is synchronized with the slew-rate switching signal. Then the influence of the high-frequency noise due to the high-frequency switching operation can be eliminated easily. Hence, the alteration of current paths to the windings can be stabilized, and the rotation of the disk can be stable. Furthermore, the position detecting means produces the detected pulse signal (the position signal) at accurate timing, whereby the rotational speed of the disk can be controlled accurately by using the detected pulse signal. As a result, the disk drive apparatus can accurately record and/or reproduce a signal on/from a high-density disk.

A motor in accordance with the present invention comprises:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said rotor; and switching operation means for causing at least one of said Q first power transistors and said Q second power transistors to perform high-frequency switching responding with said command signal; and that said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces at least a slew-rate switching signal which responds with said switching pulse signal at a control terminal side of at least one power transistor among said Q first power transistors and said Q second power transistors, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

With this configuration, since at least one of the Q first power transistors and the Q second power transistors performs high-frequency switching operation, the power losses of the power transistors are very small. In other words, the heat generation of the power transistors is very low, and a motor with a low power consumption is realized. In addition, since each of the active periods of the power transistors is larger than the period of 360/Q degrees and the composed current to the Q-phase windings is controlled responding with the command signal, the fluctuation of the generated drive force is remarkably reduced. So the acoustic noise and the vibration of the rotor are reduced remarkably. Furthermore, since at least one of the power transistors executes high-frequency switching operation responding with the switching pulse signal of the switching operation means, the slew-rate switching signal is produced easily. Still further, the power transistor is caused to follow the slew-rate switching signal, and supplies the drive voltage signal to one of the windings. Hence, the drive voltage signal to the winding becomes a high-frequency voltage signal which has adequate voltage slopes responding with the slew-rate switching signal. So the high-frequency noise due to the high-frequency switching operation of the power transistor is reduced significantly. Therefore, a high-performance motor with a low power consumption, a low acoustic noise and a small vibration is realized.

A motor in accordance with another aspect of the present invention comprises:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said rotor; and switching operation means for causing at least one of said Q first power transistors and said Q second power transistors to perform high-frequency switching responding with said command signal; and that each of said Q first power transistors is a first NMOS-FET power transistor for forming a current path from the positive terminal side of said voltage supplying means to one of said Q-phase windings, each of said Q second power transistors is a second NMOS-FET power transistor for forming a current path from the negative terminal side of said voltage supplying means to one of said Q-phase windings, said switching operation means includes:
  current detecting means for producing a current detection signal which responds with or corresponds to a composed current to said Q-phase windings from said voltage supplying means, and
  switching control means for producing a switching pulse signal which responds with said current detection signal and said command signal, and
  said activation operation means produces at least a slew-rate switching signal at a control terminal side of at least one power transistor among said first NMOS-FET power transistors responding with said switching pulse signal, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

With this configuration, since at least one of the Q first power transistors and the Q second power transistors performs high-frequency switching operation, the power losses of the power transistors are very small. In other words, the heat generation of the power transistors is very low, and a motor with a low power consumption is realized. In addition, since each of the active periods of the power transistors is larger than the period of 360/Q electrical degrees and the composed current to the Q-phase windings is controlled responding with the command signal, the fluctuation of the generated drive force is remarkably reduced. So the acoustic noise and the vibration of the rotor are reduced remarkably. Furthermore, since at least one of the power transistors executes high-frequency switching operation responding with the switching pulse signal of the switching operation means, the slew-rate switching signal is produced easily. Still further, at least one of the first N-channel FET power transistors is caused to follow the slew-rate switching signal, and supplies the drive voltage signal to one of the windings. Hence, the drive voltage signal to the winding becomes a high-frequency voltage signal which has adequate voltage slopes responding with the slew-rate switching signal. So the high-frequency noise due to the high-frequency switching operation of the first N-channel FET power transistor is reduced significantly. Furthermore, N-channel FET power transistors attain high-frequency switching operation with a low resistance during the ON period. Still further, the N-channel FET power transistors are easily integrated with other resistors and transistors on a small semiconductor chip. Therefore, a high-performance motor with a low power consumption, a low acoustic noise and a small vibration is realized.

A motor in accordance with still another aspect of the present invention comprises:
  a rotor having a field part which generates field fluxes;
  Q-phase windings (Q is an integer of 3 or more);
  voltage supplying means, including two output terminals, for supplying a DC voltage;
  power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
  position detecting means for producing a position signal which responds with the rotation of said rotor;
  activation operation means for controlling active periods of said Q first power transistors and said Q second power transistors responding with an output signal of said position detecting means, each of said active periods being larger than the period of 360/Q electrical degrees;
  commanding means for producing a command signal which responds with a rotational speed of said rotor; and
  switching operation means for causing at least one of said Q first power transistors and said Q second power transistors to perform high-frequency switching responding with said command signal; and that
  said switching operation means includes:
    current detecting means for producing a current detection signal which responds with or corresponds to a composed current to said Q-phase windings from said voltage supplying means, and
    switching control means for producing a switching pulse signal which responds with said current detection signal and said command signal, and
    said activation operation means produces two slew-rate switching signals which responds with said switching pulse signal at control terminal sides of two of said Q first power transistors, each of said two slew-rate switching signals having a smoothed voltage slope in at least one of rising and falling slopes, and causes said two of said Q first power transistors to perform high-frequency switching substantially simultaneously responding with said two slew-rate switching signals, when said two of said Q first power transistors alter current paths to said Q-phase windings while at least one of said Q second power transistors remains ON without ON-OFF switching.

With this configuration, since at least one of the Q first power transistors and the Q second power transistors performs high-frequency switching operation, the power losses of the power transistors are very small. In other words, the heat generation of the power transistors is very low, and a motor with a low power consumption is realized. In addition, since each of the active periods of the power transistors is larger than the period of 360/Q degrees and the composed current to the Q-phase windings is controlled responding with the command signal, the fluctuation of the generated drive force is remarkably reduced. In particular, when the two of the first power transistors alter current paths to the Q-phase windings, the two of the first power transistors are caused to perform high-frequency switching operation substantially simultaneously responding with the switching pulse signal, whereby the alteration of current paths is smoothened. Hence, the acoustic noise and the vibration of the rotor are reduced greatly. Furthermore, since the two slew-rate switching signals which responds with the switching pulse signal of the switching operation means are produced at the control terminal sides of the two of the first power transistors, the two of the first power transistors execute high-frequency switching operation responding with the two slew-rate switching signals. Hence, the drive voltage signals to the windings become high-frequency voltage signals each of which have adequate voltage slopes responding with each of the two slew-rate switching signals. So the high-frequency noise due to the high-frequency switching operation of the power transistors is reduced significantly. Therefore, a high-performance motor with a low power consumption, a low acoustic noise and a small vibration is realized.

Still further, since the heat generation of the power transistors is very low, the power transistors can be integrated easily with other semiconductor elements (resistors and transistors) on a small one-chip silicon substrate. In particular, an N-channel FET power transistor can realize a high-performance power transistor in a smaller chip area than a P-channel FET power transistor, and the N-channel FET power transistor is suitable to a power transistor. As a result, a low-cost motor is realized.

Still further, in case that the switching control means produces a single switching pulse signal which responds with the comparison result between the current detection signal and the command signal, the slew-rate switching signals responding with the single switching pulse signal are produced easily, and one or two of the first power transistors are caused to perform high-frequency switching operation substantially simultaneously responding with the slew-rate switching signal. Hence, while the high-frequency drive voltage signals to the windings have adequate voltage slopes in at least one of the rising and falling slopes, the composed current to the windings is controlled accurately responding with the command signal. As a result, a high-performance motor with a low current ripple, a small vibration, a low acoustic noise and a low power consumption is realized.

In addition, in case that the position detecting means produces position signals responding with the terminal voltages of the Q-phase windings, it is unnecessary to use position detecting elements for detecting the rotational position. Furthermore, in case that the commanding means produces a command signal responding with the rotational speed of the rotor by using a detected pulse signal (a position signal) which responds with the terminal voltages of the windings, no speed detecting element is required. Therefore, a low-cost motor with reduced components is realized.

In addition, the position detecting means stops the detection operation of the terminal voltages of the windings during stop periods which include at least one of the rising and falling slopes of the slew-rate switching signal, and the position detecting means carries out the detection operation of the terminal voltages of the windings during the rest periods except the stop periods. This eliminates the influence of the high-frequency voltage noise due to the high-frequency switching drive voltage signals which have slew-rate slopes, whereby the position detecting means can accurately detect the terminal voltages of the windings, such as the zero-crossing point of a back electromotive force. In particular, in case that a noise eliminating signal is produced by responding with the switching pulse signal, it is possible to produce accurately the noise eliminating signal which is synchronized with the slew-rate switching signal. Then the influence of the high-frequency noise due to the high-frequency switching operation can be eliminated easily. Hence, the alteration of current paths to the windings can be stabilized, and the rotation of the rotor can be stable. Furthermore, the position detecting means produces the detected pulse signal (the position signal) at accurate timing, whereby the rotational speed of the rotor can be controlled accurately by using the detected pulse signal. As a result, the motor can accurately control the rotational speed.

These and other configurations and operations will be described in detail in the explanations of embodiments.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 2 is a diagram showing a comprehensive configuration of a disk drive apparatus in accordance with the embodiment 1 of the present invention;

FIG. 4 is a diagram showing a configuration of a position detecting part 30 in accordance with the embodiment 1;

Figure 1:
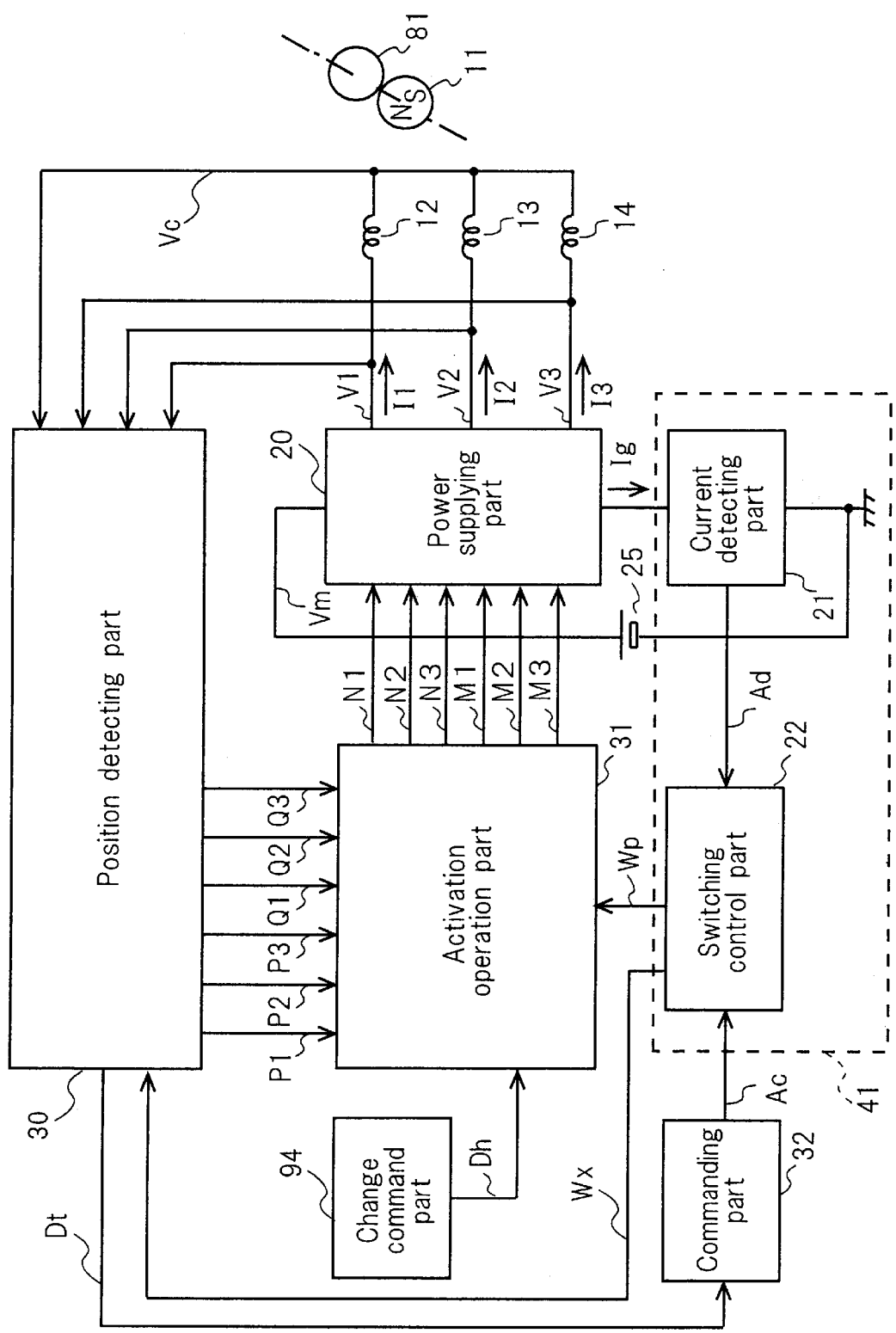
FIG. 1 is a diagram showing a comprehensive configuration of a motor in accordance with embodiment 1 of the present invention.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments in accordance with the present invention will be described below referring to the accompanying drawings.

<<Embodiment 1>>

FIGS. 1 to 14 show a disk drive apparatus including a motor in accordance with embodiment 1 of the present invention, and a motor which is suitable to use in a disk drive apparatus. FIG. 2 shows a comprehensive configuration of the disk drive apparatus. A disk 81 on which digital information is recorded is installed on the rotational shaft 83 of a motor actuating block 82 and rotates together with the rotational shaft 83. A head part 87 for reproducing the digital information on the disk 81 is installed to the support part 86 of a tracking actuating block 85 and positioned by the rotation and movement of the support part 86. A signal processing block 93 outputs an information output signal Eh responding with an output signal Ch from the head part 87 to reproduce the digital information on the disk 81. In addition, the output signal from the head part 87 includes information regarding the reproduction track position of the disk 81. A motor driving block 91 supplies drive voltage signals and drive current signals to the motor actuating block 82 to control the rotational speed of the disk 81. A tracking driving block 92 supplies drive voltage signals and drive current signals to the tracking actuating block 85 to control the reproduction position of the head part 87.

The motor driving block 91 carries out high-frequency switching operation to supply ON-OFF switched drive voltage signals to the motor actuating block 82. The tracking driving block 92 carries out high-frequency switching operation to supply ON-OFF switched drive voltage signals to the tracking actuating block 85.

A change command part 94 outputs a change command signal Dh. A case wherein the change command signal Dh of the change command part 94 is "L" (a low potential state) is explained first. The motor driving block 91 causes power transistors to perform slow slew-rate switching operation, and supplies a high-frequency switching drive voltage signal with low slew-rate slopes to the motor actuating block 82 so as to reduce a high-frequency noise. The tracking driving block 92 causes power transistors to perform slow slew-rate switching operation, and supplies a high-frequency switching drive voltage signal with low slew-rate slopes to the tracking actuating block 85. The signal processing block 93 carries out the circuit operation of reproducing the output signal from the head part 87 and makes the information output signal Eh effective when Dh="L".

A case wherein the change command signal Dh of the change command part 94 is "H" (a high potential state) is explained next. The motor driving block 91 causes the power transistors to perform fast slew-rate switching operation and supplies a high-frequency switching drive voltage signal with high slew-rate slopes to the motor actuating block 82. The tracking driving block 92 causes the power transistors to perform fast slew-rate switching operation and supplies a high-frequency switching drive voltage signal with high slew-rate slopes to the tracking actuating block 85 so as to reduce a switching power loss. The signal processing block 93 stops the whole or part of the circuit operation of processing the output signal from the head part 87, and makes the information output signal Eh ineffective. In other words, power supply to the signal processing block 93 is stopped wholly or partially to stop its information processing circuit operation when Dh="H".

In a hard disk drive apparatus and a floppy disk drive apparatus, the head part 87 is a magnetic head part for recording and/or reproducing a signal on/from a magnetic disk. In an optical disk drive apparatus, the head part 87 is an optical head part using a laser light for recording and/or reproducing a signal on/from an optical disk.

FIG. 1 shows configurations of the motor actuating block 82 and the motor driving block 91. The rotor 11 of the motor actuating block 82 which drives the disk 81 provides a field part which generates field fluxes by a pair of N and S poles of a permanent magnet. The field part, however, can have plural pairs of N and S poles by a permanent magnet or a group of permanent magnets. Three-phase windings 12, 13 and 14 are disposed on a stator, each displaced from the others by an electrical angle of 120 degrees or about 120 degrees with respect to the field part of the rotor 11. The angle of a pair of N and S poles in the rotor 11 corresponds to an electrical angle of 360 degrees. The three-phase windings 12, 13 and 14 are connected in common at one ends as a common terminal, and the other ends of the three-phase windings 12, 13 and 14 are connected to the output terminals of a power supplying part 20 as power supply terminals, respectively. The three-phase windings 12, 13 and 14 generate three-phase magnetic fluxes by three-phase drive current signals I1, I2 and I3. A drive force is generated by the interaction between the field part of the rotor 11 and the fluxes of the three-phase drive current signals, and the generated drive force drives the rotor 11 and the disk 81.

Figure 3:
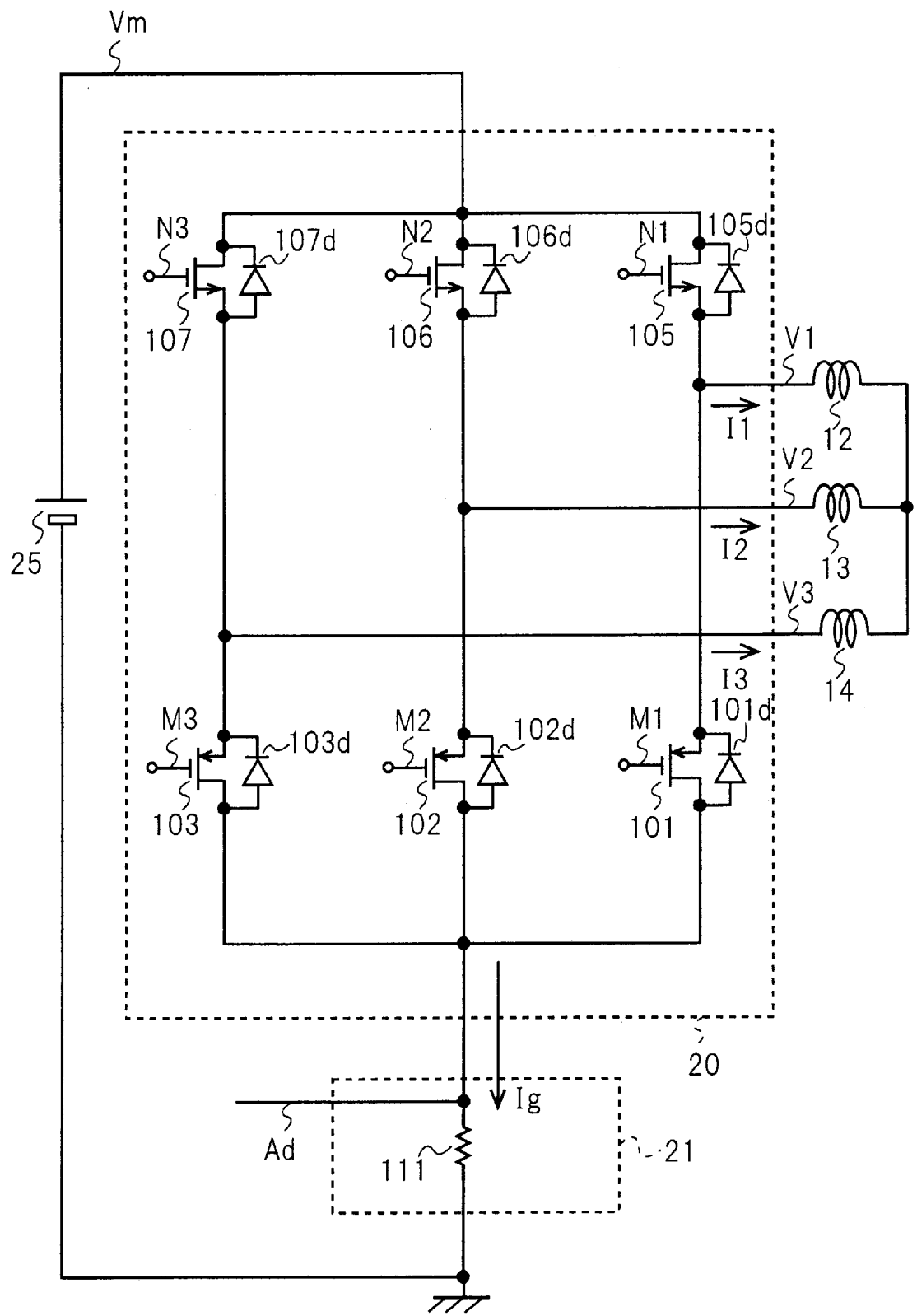
FIG. 3 is a diagram showing configurations of a power supplying part 20 and a current detecting part 21 in accordance with the embodiment 1 of the present invention.

The power supplying part 20 of FIG. 1 forms current paths to the three-phase windings 12, 13 and 14 from a voltage supplying part 25. The power supplying part 20 alters the current paths to the windings responding with the three-phase low-side activation control signals M1, M2 and M3 and three-phase high-side activation control signals N1, N2 and N3 of an activation operation part 31. Hence, the power supplying part 20 supplies a power to the windings 12, 13 and 14 from the voltage supplying part 25. FIG. 3 shows a configuration of the power supplying part 20.

The power supplying part 20 of FIG. 3 comprises three low-side power transistors 101, 102 and 103, each of which form power supply paths (current paths) between the negative output terminal (ground terminal) of the voltage supplying part 25 and each of the power supply terminals of the windings 12, 13 and 14. The power supplying part 20 further comprises three high-side power transistors 105, 106 and 107, each of which form power supply paths (current paths) between the positive output terminal (Vm) of the voltage supplying part 25 and each of the power supply terminals of the windings 12, 13 and 14. Low-side power diodes 101d, 102d and 103d are connected reversely in parallel with the low-side power transistors 101, 102 and 103, respectively. High-side power diodes 105d, 106d and 107d are also connected reversely in parallel with the high-side power transistors 105, 106 and 107, respectively. These power diodes may be connected as necessary. In this embodiment, a N-channel MOS FET power transistor is used as each of the high-side power transistors 105, 106 and 107, and a P-channel MOS FET power transistor is used as each of the low-side power transistors 101, 102 and 103. A parasitic diode of the N-channel MOS FET power transistor is connected reversely from the current flowing-out terminal to the current flowing-in terminal of the N-channel MOS FET power transistor, and is used as the low-side power diode. A parasitic diode of the P-channel MOS FET power transistor is connected reversely from the current flowing-out terminal to the current flowing-in terminal of the P-channel MOS FET power transistor, and is used as the high-side power diode.

The high-side power transistors 105, 106 and 107 carry out ON-OFF high-frequency switching operation responding with the high-side activation control signals N1, N2 and N3, respectively. The high-side power transistors 105, 106 and 107 form current paths to the windings 12, 13 and 14 for supplying the positive parts of the drive current signals I1, I2 and I3. For example, when the high-side power transistor 105 is ON, the terminal voltage V1 of the winding 12 becomes Vm or nearly Vm, and the positive part of the drive current signal I1 is supplied to the winding 12. When the high-side power transistor 105 turns OFF, the low-side power diode 101d (or the low-side power transistor 101) becomes active by the inductive action of the winding 12, and the terminal voltage V1 of the winding 12 becomes 0 V or nearly 0 V so that the positive part of the drive current signal I1 is continuously supplied to the winding 12. Hence, the terminal voltage V1 of the winding 12 becomes a high-frequency switching drive voltage signal, the level of which substantially digitally changes between nearly Vm and nearly 0 V. As a result, the terminal voltages V1, V2 and V3 of the windings 12, 13 and 14 become high-frequency switching drive voltages (PWM voltages) respectively in their respective active periods of the high-side power transistors 105, 106 and 107. A relatively high frequency from 20 kHz to 200 kHz is used as the switching frequency. Hence, the FET power transistors are suitable to execute the high-frequency switching in this configuration.

The low-side power transistors 101, 102 and 103 carries out high-frequency switching operation or ON-OFF operation responding with the low-side activation control signals M1, M2 and M3, respectively. The low-side power transistors 101, 102 and 103 form current paths to the windings 12, 13 and 14 for supplying the negative parts of the drive current signals I1, I2 and I3.

When N-channel FET transistors are used as the high-side power transistors, the high-side activation control signals N1, N2 and N3 for activating the high-side power transistors are produced by using a high potential "Hu". The high potential "Hu" is higher than the potential Vm at the positive output terminal of the voltage supplying part 25 by a predetermined value. Furthermore, when P-channel FET transistors are used as the low-side power transistors, the low-side activation control signals M1, M2 and M3 for activating the low-side power transistors are produced by using a low potential "Ld". The low potential "Ld" is lower than the potential (0 V) at the negative output terminal of the voltage supplying part 25 by a predetermined value. Therefore, the high-side power transistors and the low-side power transistors can be fully turned on. The operation of the FET power transistor has a full-ON state, a half-ON state and an OFF state. The power transistor operates in the half-ON state at slew-rate slopes of the high-frequency drive voltage signal in both the rising and falling slopes. Both the full-ON state and the half-ON state are referred to as "ON state" in the specification.

A current detecting part 21 includes a current detecting resistor 111. The current detecting part 21 outputs a current detection signal Ad which responds with a conducted current or a composed supply current Ig to the three-phase windings 12, 13 and 14 from the voltage supplying part 25 through the low-side power transistors 101, 102 and 103. In this embodiment, the current detection signal Ad is substantially proportional to the composed supply current Ig. Since the high-side power transistors perform ON-OFF high-frequency switching operation, the composed supply current Ig and the current detection signal Ad become pulse signals.

A position detecting part 30 shown in FIG. 1 detects the rotational position of the field part of the rotor 11. The position detecting part 30 outputs three-phase low-side position signals P1, P2 and P3, three-phase high-side position signals Q1, Q2 and Q3 and a detected pulse signal Dt, each of which responds with the rotational position of the rotor 11. Generally, a method using three magneto-electric devices is used widely to detect the rotational position of the field part. In other words, three magneto-electric devices, such as Hall-effect devices, are disposed on the stator, and output position signals responding with magnetic fluxes of the field part. In this embodiment, however, the position detecting part 30 detects the three-phase terminal voltages V1, V2 and V3 at the power supply terminals of the three-phase windings 12, 13 and 14, and outputs the position signals responding with the rotational position of the field part. Thus magneto-electric devices (position detecting elements) are unnecessary. FIG. 4 shows a configuration of the position detecting part 30.

Figure 5:
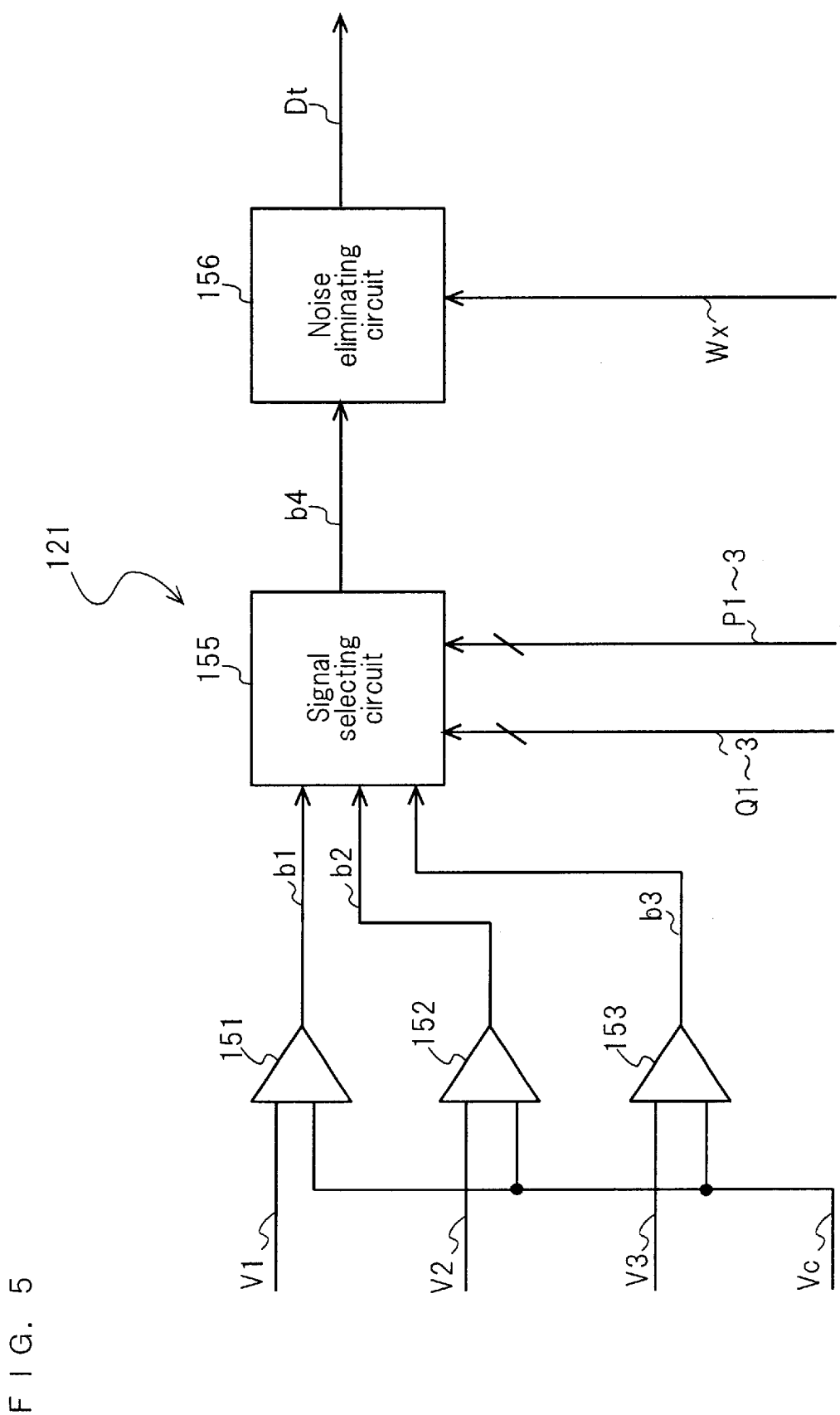
FIG. 5 is a diagram showing a configuration of a voltage detecting part 121 in accordance with the embodiment 1.
Figure 6:
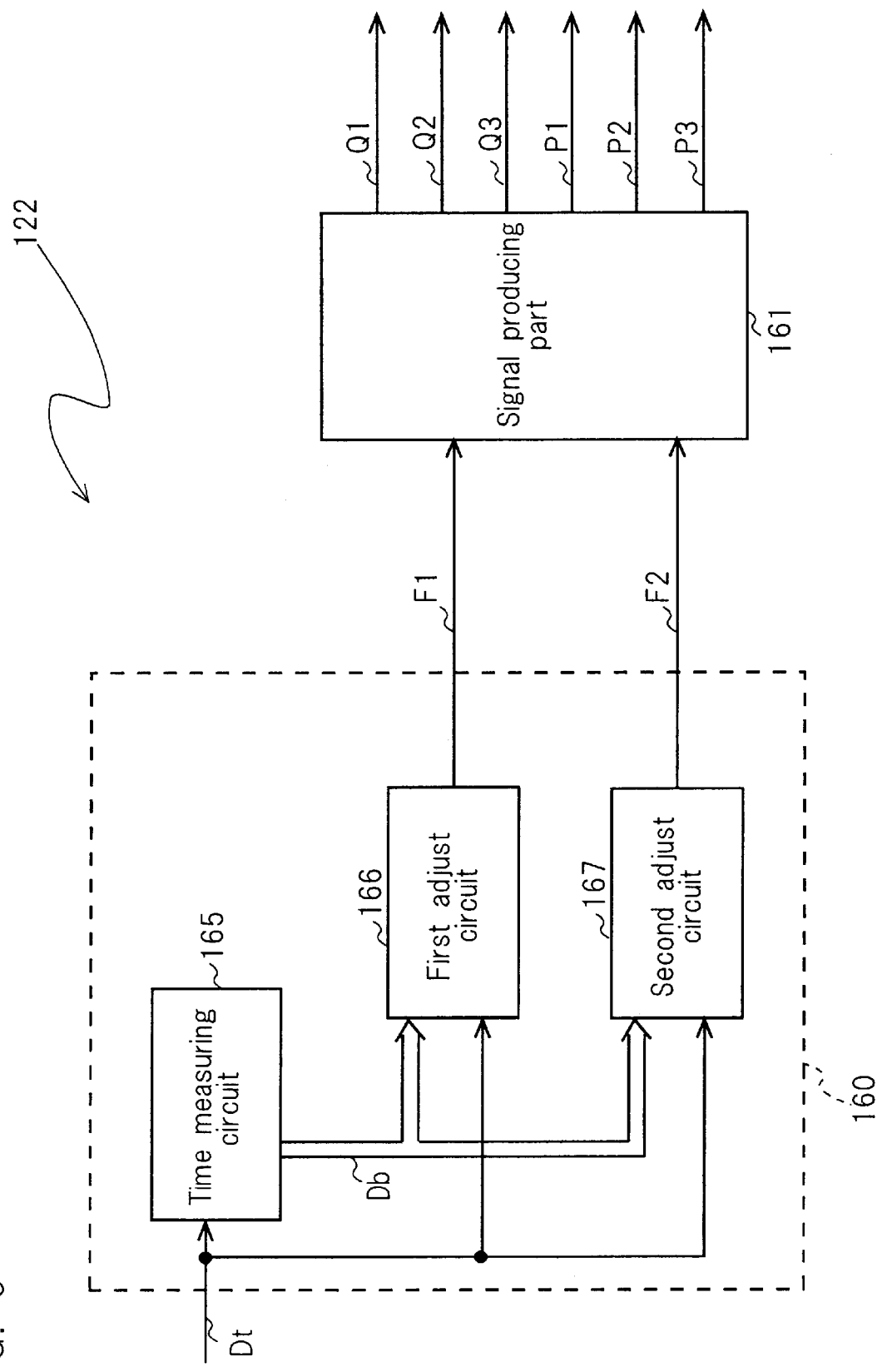
FIG. 6 is a diagram showing a configuration of a position producing part 122 in accordance with the embodiment 1.

The position detecting part 30 of FIG. 4 comprises a voltage detecting part 121 and a position producing part 122. The voltage detecting part 121 receives the three-phase terminal voltages V1, V2 and V3 at the terminals of the three-phase windings 12, 13 and 14 and a common terminal voltage Vc at the common terminal of the windings 12, 13 and 14. The position detecting part 30 outputs the detected pulse signal Dt responding with the comparison result of them. The position producing part 122 shifts its holding state responding with the generation of the detected pulse signal Dt. The position producing part 122 outputs the low-side position signals P1, P2 and P3 and the high-side position signals Q1, Q2 and Q3 responding with the holding state. FIG. 5 shows a configuration of the voltage detecting part 121, and FIG. 6 shows a configuration of the position producing part 122.

The three comparator circuits 151, 152 and 153 of the voltage detecting part 121 of FIG. 5 compare the three-phase terminal voltages V1, V2 and V3 with the common terminal voltage Vc, and output three-phase compared pulse signals b1, b2 and b3, respectively. A signal selecting circuit 155 selects one of the rising edges and the falling edges of the compared pulse signals b1, b2 and b3 in accordance with the low-side position signals P1, P2 and P3 and the high-side position signals Q1, Q2 and Q3. The signal selecting circuit 155 then outputs a detected pulse signal b4 responding with the selected edge. A noise eliminating circuit 156 eliminates switching noise in the detected pulse signal b4 due to the high-frequency switching operation of the power transistors by using a noise eliminating signal Wx from a switching control part 22 described later. The noise eliminating circuit 156 then outputs the accurate detected pulse signal Dt. Besides, a composed common voltage which is obtained by composing the three power supply terminal voltages V1, V2 and V3 with resistors can be used as the actual common terminal voltage Vc at the common terminal.

Figure 10:
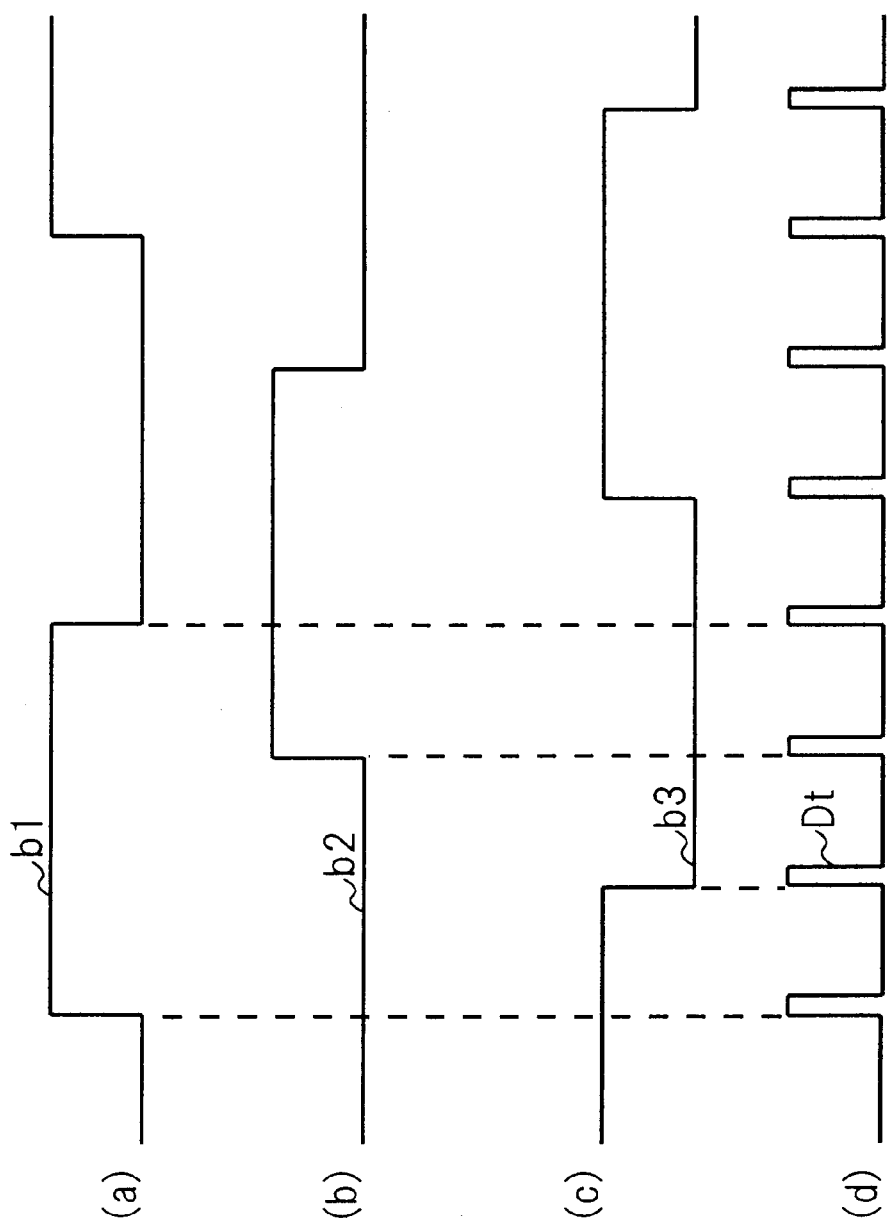
FIG. 10 is a waveform diagram illustrating the operation of the voltage detecting part 121 in accordance with the embodiment 1.

Parts (a) to (d) of FIG. 10 show waveforms for illustrating the operation of the voltage detecting part 121. The detected pulse signal Dt is produced by selectively detecting and composing the edges of the three-phase compared pulse signals b1, b2 and b3 shown in the parts (a), (b) and (c) of FIG. 10 (see the part (d) of FIG. 10). The abscissa of FIG. 10 represents time. Switching noise caused by the switching operation of the power transistors of the power supplying part 20 is not shown.

The position producing part 122 comprises an adjust part 160 and a signal producing part 161. The adjust part 160 outputs a first timing signal F1 delayed by a first adjust time T1 and a second timing signal F2 delayed by a second adjust time T2 (T2>T1) from every occurrence of the rising edges of the detected pulse signal Dt of the voltage detecting part 121. The signal producing part 161 shifts its holding state from a first state to a second state responding with the first timing signal F1 after the first adjust time T1 from the detected pulse signal Dt. In addition, the signal producing part 161 shifts its holding state from the second state to a third state responding with the second timing signal F2 after the second adjust time T2 from the detected pulse signal Dt. In other words, the signal producing part 161 shifts its holding state responding with the occurrence of the first timing signal F1 and the second timing signal F2 of the adjust part 160. The signal producing part 161 then outputs the three-phase low-side position signals P1, P2 and P3 and the three-phase high-side position signals Q1, Q2 and Q3 responding with the holding state.

The adjust part 160 of FIG. 6 comprises a time measuring circuit 165, a first adjust circuit 166 and a second adjust circuit 167. The time measuring circuit 165 measures the time interval T0 of the rising edges of the detected pulse signal Dt and outputs a measured data signal Db responding with the time interval T0. The first adjust circuit 166 receives the measured data signal Db at the occurrence of the rising edge of the detected pulse signal Dt. The first adjust circuit 166 then outputs the first timing signal F1 delayed from the occurrence of the detected pulse signal Dt by the first adjust time T1. The first adjust time T1 is proportional or nearly proportional to the measured data signal Db. Similarly, the second adjust circuit 167 receives the measured data signal Db at the occurrence of the rising edge of the detected pulse signal Dt. The second adjust circuit 167 then outputs the second timing signal F2 delayed from the occurrence of the detected pulse signal Dt by the second adjust time T2. The second adjust time T2 is proportional or nearly proportional to the measured data signal Db.

The time measuring circuit 165 comprises an up-counter and a holding circuit, for example. At every occurrence of the detected pulse signal Dt, the holding circuit receives the content of the up-counter as the measured data signal Db, and the up-counter is reset. Then the up-counter counts pulses of a clock signal upward. The first adjust circuit 166 comprises a first down-counter, for example. At the occurrence of the detected pulse signal Dt, the measured data signal Db is input to the first down-counter. Then the first down-counter counts downward pulses of a first clock pulse signal. When the content of the first down-counter reaches zero (a predetermined value), the first adjust circuit 166 outputs the first timing signal F1. Thus the first adjust time T1 is substantially proportional to the time interval T0.

The second adjust circuit 167 comprises a second down-counter, for example. At the occurrence of the detected pulse signal Dt, the measured data signal Db is input to the second down-counter. Then the second down-counter counts downward pulses of a second clock pulse signal. When the content of the second down-counter reaches zero (a predetermined value), the second adjust circuit 167 outputs the second timing signal F2. Thus the first adjust time T1 is substantially proportional to the time interval T0. Furthermore, by making the frequency of the first clock pulse signal higher than that of the second clock pulse signal, the first adjust time T1 is made shorter than the second adjust time T2.

Figure 11:
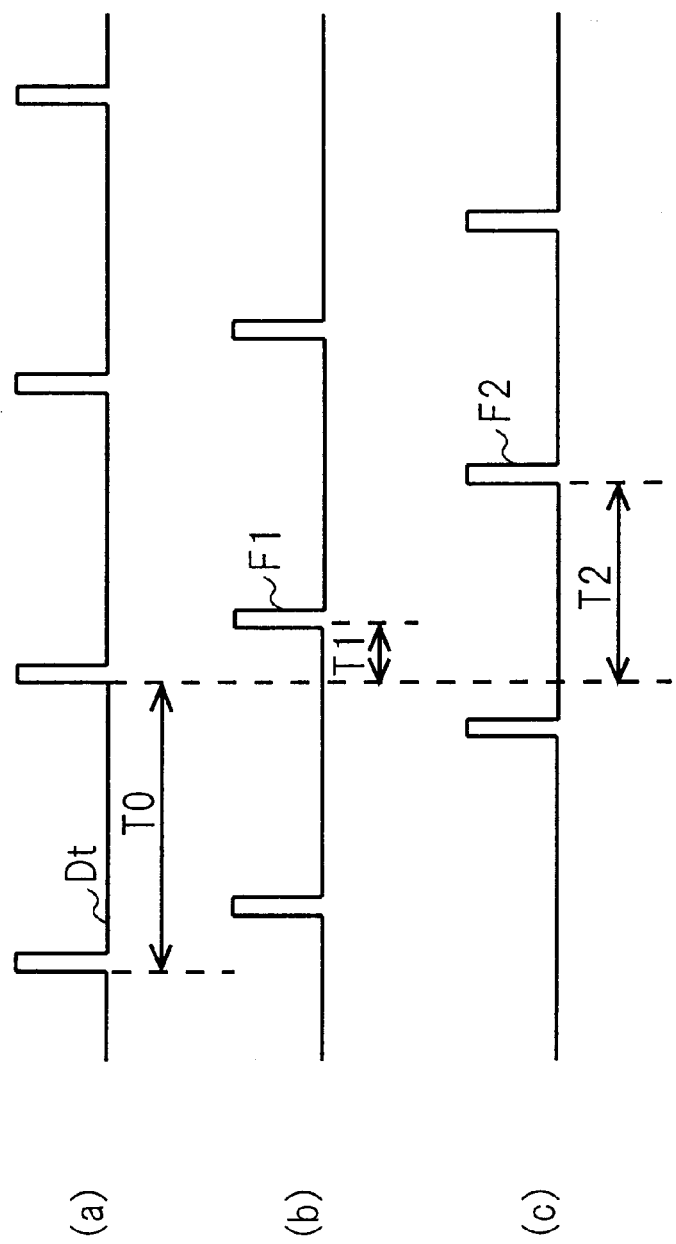
FIG. 11 is a waveform diagram illustrating the operation of an adjust part 160 in accordance with the embodiment 1.

Parts (a), (b) and (c) of FIG. 11 show the relationship among the waveforms of these signals. The time measuring circuit 165 measures the time interval T0 between the successive rising edges of the detected pulse signal Dt shown in the part (a) of FIG. 11 and outputs a count value as the measured data signal Db which responds with the time interval T0. The first adjust circuit 166 outputs the first timing signal F1 (see the part (b) of FIG. 11) delayed by the first adjust time T1 (T1<T0), the first adjust time T1 being substantially proportional to the time interval T0. In other words, the first timing signal F1 becomes a pulse signal delayed by the first adjust time T1 from the occurrence of the rising edge of the detected pulse signal Dt. The second adjust circuit 167 outputs the second timing signal F2 (see the part (c) of FIG. 11) delayed by the second adjust time T2 (T2<T0), the second adjust time T2 being substantially proportional to the time interval T0. In other words, the second timing signal F2 becomes a pulse signal delayed by the second adjust time T2 (T1<T2<T0) from the occurrence of the rising edge of the detected pulse signal Dt. The abscissa of FIG. 11 represents time.

The signal producing part 161 of FIG. 6 includes a state holding circuit that shifts its holding state responding with the occurrence of the first timing signal F1 and the second timing signal F2 of the adjust part 160 and holds the holding state. The signal producing part 161 shifts its holding state from a first state to a second state responding with the occurrence of the first timing signal F1, and further shifts the holding state from the second state to a third state responding with the occurrence of the second timing signal F2. The signal producing part 161 produces the three-phase low-side position signals P1, P2 and P3 and the three-phase high-side position signals Q1, Q2 and Q3 responding with the holding state. In other words, one of the low-side position signals P1, P2 and P3 and the high-side position signals Q1, Q2 and Q3 is changed from "L" (a low potential state) to "H" (a high potential state) at the occurrence of the first timing signal F1, and one of the power transistors corresponding thereto is activated. Furthermore, one of the low-side position signals P1, P2 and P3 and the high-side position signals Q1, Q2 and Q3 is changed from "H" to "L" at the occurrence of the second timing signal F2, and one of the power transistors corresponding thereto is deactivated.

The periods during which the low-side position signals P1, P2 and P3 of the signal producing part 161 become the "H" state correspond to the active periods of the low-side power transistors 101, 102 and 103 of the power supplying part 20, respectively. Each of the low-side power transistors 101, 102 and 103 is activated during each of the active periods, and supplies each of the negative parts of the drive current signals I1, I2 and I3 to the windings 12, 13 and 14. The periods during which the high-side position signals Q1, Q2 and Q3 of the signal producing part 161 become the "H" state correspond to the active periods of the high-side power transistors 105, 106 and 107 of the power supplying part 20, respectively. Each of the high-side power transistors 105, 106 and 107 is activated during each of the active periods, and supplies each of the positive parts of the drive current signals I1, I2 and I3 to the windings 12, 13 and 14.

Figure 12:
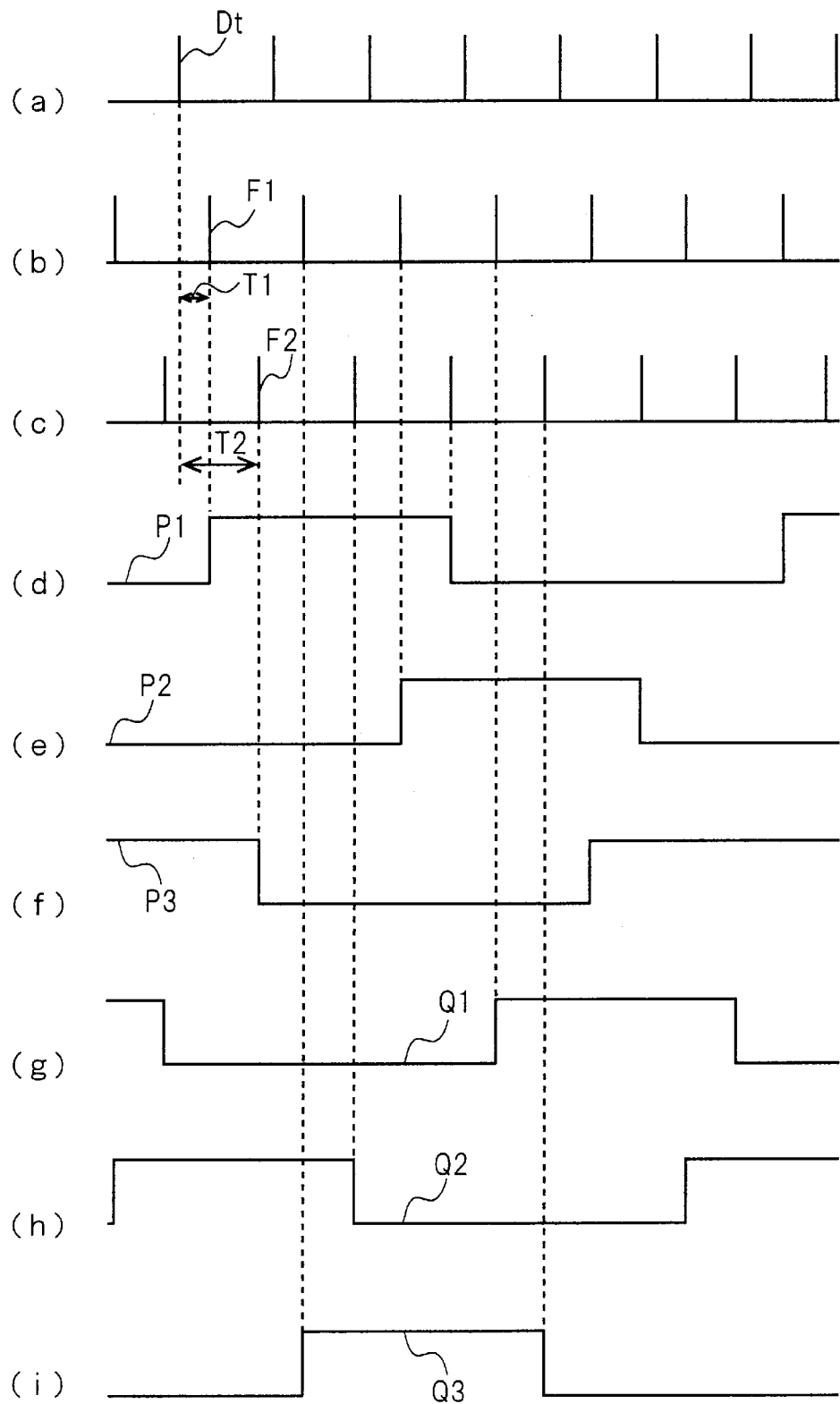
FIG. 12 is a waveform diagram illustrating the operation of the position producing part 122 in accordance with the embodiment 1.

FIG. 12 shows the relationship among the waveforms of these signals. The abscissa of FIG. 12 represents time. The first timing signal F1 (see the part (b) of FIG. 12) is a pulse signal delayed by the first adjust time T1 from the detected pulse signal Dt shown in the part (a) of FIG. 12). The second timing signal F2 (see the part (c) of FIG. 12) is a pulse signal delayed by the second adjust time T2. The signal producing part 161 shifts its holding state at every occurrence of the first timing signal F1 and the second timing signal F2, whereby 12 states in total are repeated cyclically. The signal producing part 161 produces the three-phase low-side position signals P1, P2 and P3 shown in parts (d), (e) and (f) of FIG. 12 and the three-phase high-side position signals Q1, Q2 and Q3 shown in the parts (g), (h) and (i) of FIG. 12. For example, the low-side position signal P1 changes from "L" to "H" at the occurrence of the first timing signal F1, and then the low-side power transistor 101 is activated. The low-side position signal P3 changes from "H" to "L" at the occurrence of the second timing signal F2, and then the low-side power transistor 103 is deactivated. The high-side position signal Q3 changes from "L" to "H" at the occurrence of the next first timing signal F1, and then the high-side power transistor 107 is activated. The high-side position signal Q2 changes from "H" to "L" at the occurrence of the next second timing signal F2, and then the high-side power transistor 106 is deactivated. Furthermore, the low-side position signal P2 changes from "L" to "H" at the occurrence of the next first timing signal F1, and then the low-side power transistor 102 is activated. The low-side position signal P1 changes from "H" to "L" at the occurrence of the second timing signal F2, and then the low-side power transistor 101 is deactivated. In addition, the high-side position signal Q1 changes from "L" to "H" at the occurrence of the next first timing signal F1, and then the high-side power transistor 105 is activated. The high-side position signal Q3 changes from "H" to "L" at the occurrence of the next second timing signal F2, and then the high-side power transistor 107 is deactivated. In this way, the signal producing part 161 outputs the three-phase low-side position signals P1, P2 and P3 and the three-phase high-side position signals Q1, Q2 and Q3 which determine the active periods of the low-side power transistors 101, 102 and 103 and the high-side power transistors 105, 106 and 107 of the power supplying part 20. As understood by referring to FIG. 12, in this embodiment, one power transistor is activated responding with the first timing signal F1, and another power transistor is deactivated responding with the second timing signal F2.

As a result, the low-side position signals P1, P2 and P3 become three-phase signals, each of which has an "H" period (active period) larger than the period of 120 electrical degrees (see the parts (d) to (f) of FIG. 12). More specifically, each active period of the low-side position signals P1, P2 and P3 is about 150 degrees. An electrical angle of 360 degrees corresponds to the rotation angle of a pair of the N and S poles of the rotor. In a similar way, the high-side position signals Q1, Q2 and Q3 become three-phase signals, each of which has an "H" period (active period) larger than the period of 120 electrical degrees (see the parts (g) to (l) of FIG. 12). More specifically, each active period of the high-side position signals Q1, Q2 and Q3 is about 150 degrees. Furthermore, since the second adjust time T2 is longer than the first adjust time T1, the activation to two of the three-phase windings and the activation to all of the three-phase windings are alternated in accordance with the rotation of the motor, thereby reducing ripple in the drive current signals.

A commanding part 32 shown in FIG. 1 comprises a speed control circuit for controlling the rotational speed of the disk 81 and the rotor 11 at a predetermined speed, for example. The commanding part 32 detects the rotational speed of the disk 81 and the rotor 11 by using the detected pulse signal Dt of the position detecting part 30 and outputs the command signal Ac responding with the difference between a detected rotational speed and an aimed speed. In this embodiment, the command signal Ac is a voltage signal produced by the speed control circuit.

Figure 7:
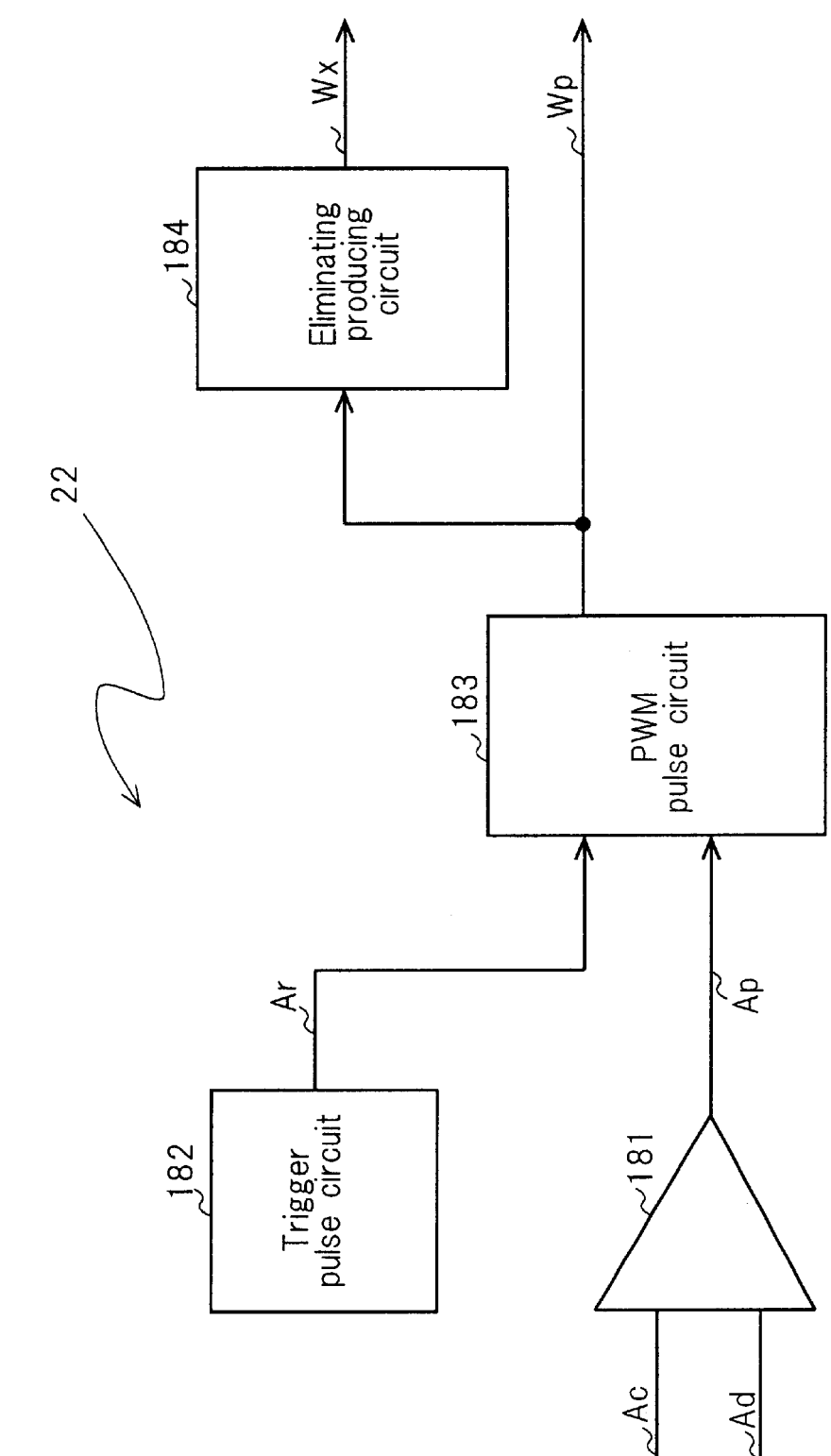
FIG. 7 is a diagram showing a configuration of a switching control part 22 in accordance with the embodiment 1.

The switching control part 22 of a switching control block 41 shown in FIG. 1 compares the current detection signal Ad of the current detecting part 21 with the command signal Ac of the commanding part 32. The switching control part 22 outputs a single switching pulse signal Wp responding with the comparison result. FIG. 7 shows a configuration of the switching control part 22. The current detecting part 21 and the switching control part 22 constitute the switching control block 41 for producing the high-frequency switching pulse signal Wp responding with the command signal Ac of the commanding part 32. The switching control block 41 causes at least one of the power transistors of the power supplying part 20 to perform high-frequency switching operation.

The switching control part 22 of FIG. 7 comprises a compare circuit 181, a trigger pulse circuit 182, a PWM pulse circuit 183 and an eliminating producing circuit 184. The compare circuit 181 compares the command signal Ac with the current detection signal Ad and changes its compared signal Ap to "H" when the current detection signal Ad becomes larger than the command signal Ac. The trigger pulse circuit 182 comprises a dividing circuit, for example, and produces a trigger pulse signal Ar at every predetermined time interval by counting pulses of a clock signal with the dividing circuit. The trigger pulse signal Ar is a pulse signal that becomes "H" in a predetermined short time.

The PWM pulse circuit 183 includes a flip-flop circuit, for example. The holding state of the flip-flop circuit becomes "H" at the occurrence of the rising edge of the trigger pulse signal Ar and becomes "L" at the occurrence of the rising edge of the compared signal Ap. The switching pulse signal Wp of the PWM pulse circuit 183 changes responding with the holding state of the flip-flop circuit. So the switching pulse signal Wp changes to "H" at the falling edge of the trigger pulse signal Ar and changes to "L" at the rising edge of the compared signal Ap. Furthermore, the eliminating producing circuit 184 comprises a mono-stable circuit triggered by both edges of the switching pulse signal Wp, for example. The eliminating producing circuit 184 produces the noise eliminating signal Wx that becomes "L" in a predetermined time by triggering the rising and falling edges of the switching pulse signal Wp.

Figure 13:
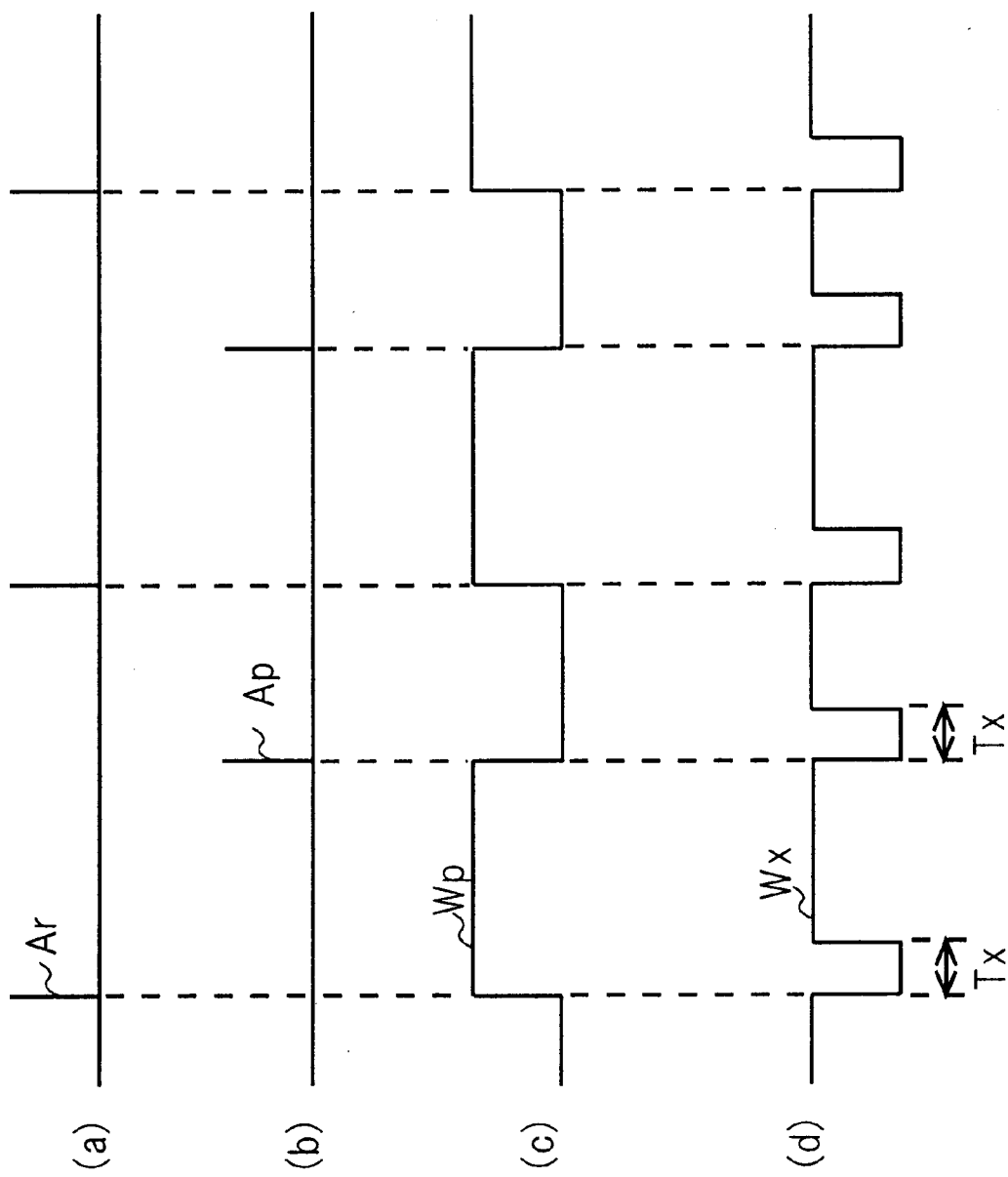
FIG. 13 is a waveform diagram illustrating the operation of the switching control part 22 in accordance with the embodiment 1.

Parts (a) to (d) of FIG. 13 show the relationship among the trigger pulse signal Ar, the compared signal Ap, the switching pulse signal Wp and the noise eliminating signal Wx. The abscissa of FIG. 13 represents time. The switching pulse signal Wp becomes "H" at the occurrence of the rising edge of the trigger pulse signal Ar and becomes "L" at the occurrence of the rising edge of the compared signal Ap. Hence, the switching pulse signal Wp becomes a PWM signal responding with the comparison result between the current detection signal Ad and the command signal Ac. Furthermore, the noise eliminating signal Wx becomes "L" in a predetermined time Tx from the occurrence of the rising edge and the falling edge of the switching pulse signal Wp. The frequency of the switching pulse signal Wp is determined by the frequency of the trigger pulse signal Ar, and is preferably a frequency of 20 kHz to 200 kHz. Hence, the frequency of the high-frequency switching operation becomes stable, whereby the switching pulse signal Wp and the noise eliminating signal Wx can be produced easily.

The activation operation part 31 of FIG. 1 produces the low-side activation control signals M1, M2 and M3 which respond with the low-side position signals P1, P2 and P3 of the position detecting part 30, the switching pulse signal Wp of the switching control part 22 and the change command signal Dh of the change command part 94. The activation operation part 31 also produces the high-side activation control signals N1, N2 and N3 which respond with the high-side position signals Q1, Q2 and Q3 of the position detecting part 30, the switching pulse signal Wp of the switching control part 22 and the change command signal Dh of the change command part 94. Hence, the active periods of the low-side power transistors 101, 102 and 103 are determined by the low-side position signals P1, P2 and P3, respectively. The active periods of the high-side power transistors 105, 106 and 107 are determined by the high-side position signals Q1, Q2 and Q3, respectively. In addition, the activation operation part 31 makes the high-side activation control signals N1, N2 and N3 high-frequency switching pulse signals which respond with the switching pulse signal Wp of the switching control part 22. The activation operation part 31 makes the low-side activation control signals M1, M2 and M3 high-frequency switching pulse signals which respond with the switching pulse signal Wp, when necessary.

Figure 8:
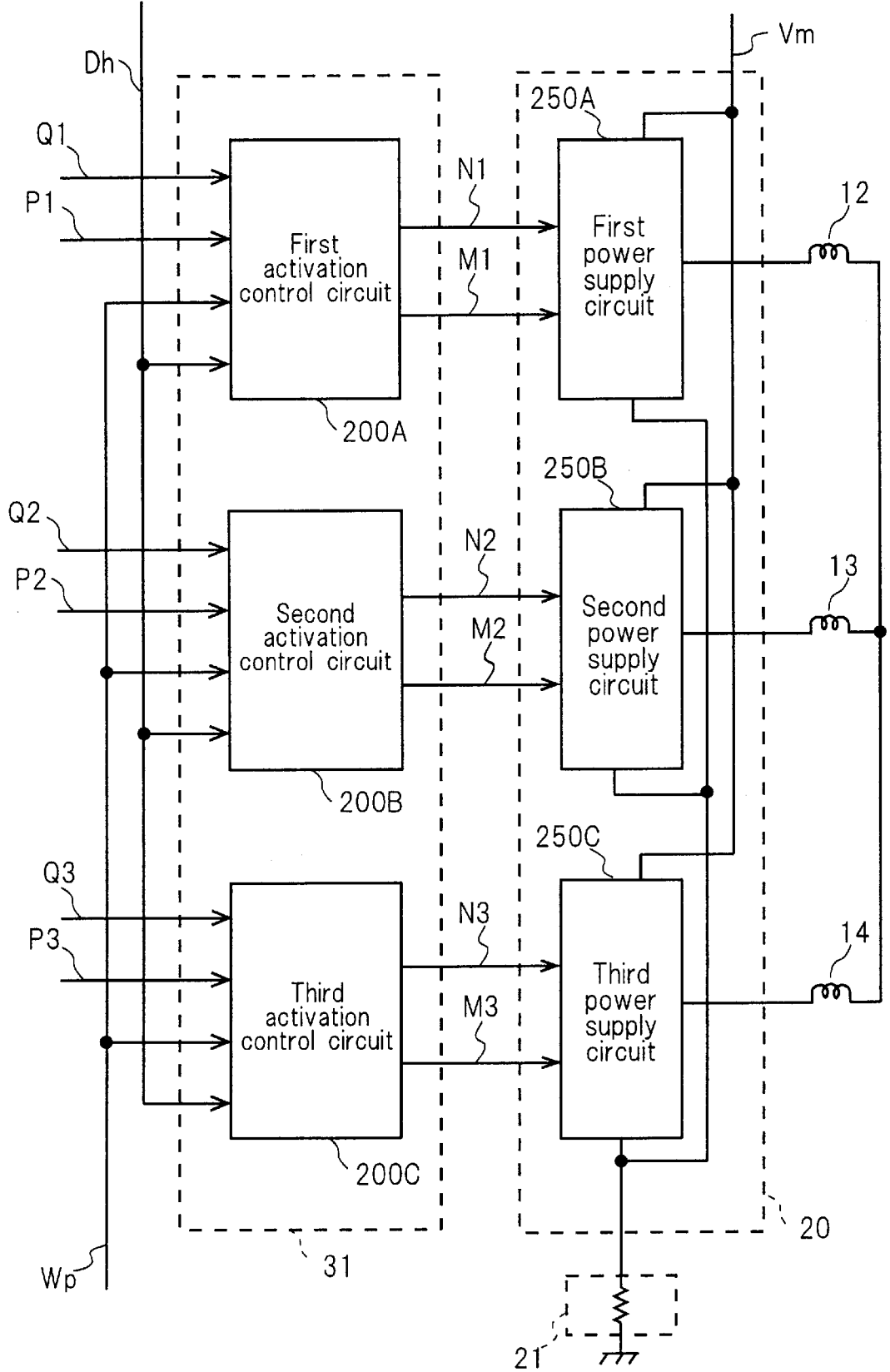
FIG. 8 is a diagram showing configurations of an activation operation part 31 and a power supplying part 20 in accordance with the embodiment 1.

FIG. 8 shows a specific configuration of the activation operation part 31 and the power supplying part 20. The activation operation part 31 of FIG. 8 comprises a first activation control circuit 200A, a second activation control circuit 200B and a third activation control circuit 200C. The first activation control circuit 200A receives the low-side position signal P1, the high-side position signals Q1, the switching pulse signal Wp and the change command signal Dh, and produces the low-side activation control signal M1 and the high-side activation control signal N1. In a similar way, the second activation control circuit 200B receives the low-side position signal P2, the high-side position signals Q2, the switching pulse signal Wp and the change command signal Dh, and produces the low-side activation control signal M2 and the high-side activation control signal N2. Similarly, the third activation control circuit 200C receives the low-side position signal P3, the high-side position signals Q3, the switching pulse signal Wp and the change command signal Dh, and produces the low-side activation control signal M3 and the high-side activation control signal N3.

The power supplying part 20 of FIG. 8 comprises a first power supply circuit 250A, a second power supply circuit 250B and a third power supply circuit 250C. The first power supply circuit 250A comprises the high-side power transistor 105, the low-side power transistor 101, the high-side power diode 105d and the low-side power diode 101d, and supplies the drive voltage signal V1 and the drive current signal I1 to the power supplying terminal of the winding 12 in response to the low-side activation control signal M1 and the high-side activation control signal N1 of the first activation control circuit 200A. In a similar way, the second power supply circuit 250B comprises the high-side power transistor 106, the low-side power transistor 102, the high-side power diode 106d and the low-side power diode 102d, and supplies the drive voltage signal V2 and the drive current signal I2 to the power supplying terminal of the winding 13 in response to the low-side activation control signal M2 and the high-side activation control signal N2 of the first activation control circuit 200B. Similarly, the third power supply circuit 250C comprises the high-side power transistor 107, the low-side power transistor 103, the high-side power diode 107d and the low-side power diode 103d, and supplies the drive voltage signal V3 and the drive current signal I3 to the power supplying terminal of the winding 14 in response to the low-side activation control signal M3 and the high-side activation control signal N3 of the first activation control circuit 200C.

Figure 9:
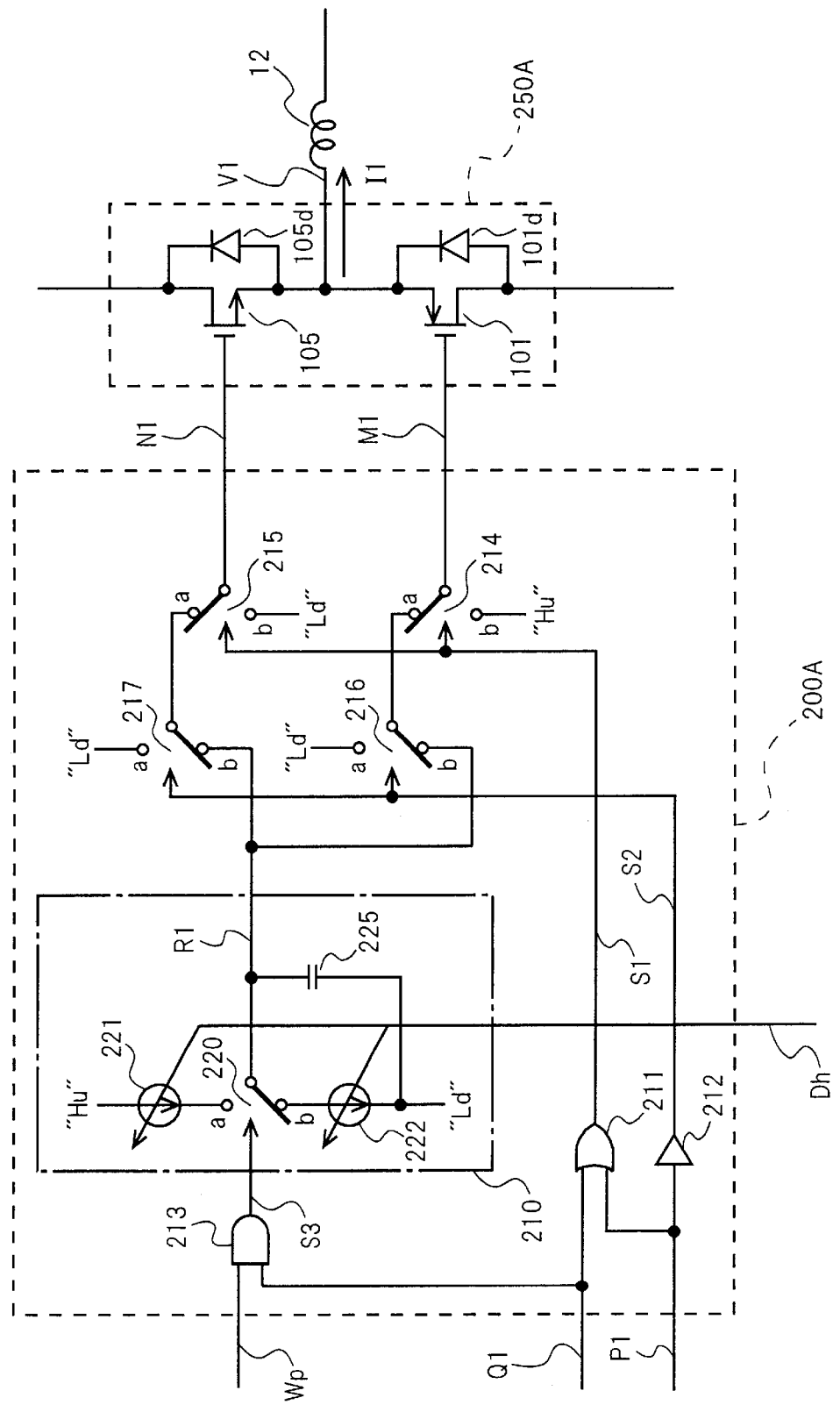
FIG. 9 is a diagram showing configurations of a first activation control circuit 200A and a first power supply circuit 250A in accordance with the embodiment 1.

FIG. 9 shows configurations of the first activation control circuit 200A and the first power supply circuit 250A. The first power supply circuit 250A comprises the low-side power transistor 101, the high-side power transistor 105, the low-side power diode 101d and the high-side power diode 105d. The first power supply circuit 250A supplies the drive voltage signal V1 and the drive current signal I1 to the winding 12 responding with the low-side activation control signal M1 and the high-side activation control signal N1.

The first activation control circuit 200A comprises a slew-rate circuit 210, an OR circuit 211, a buffer circuit 212, an AND circuit 213, a first switch circuit 214, a second switch circuit 215, a third switch circuit 216 and a fourth switch circuit 217. The OR circuit 211 receives the low-side position signal P1 and the high-side position signals Q1, and produces a first switch change signal S1. The first switch circuit 214 makes connection to its contact a when the first switch change signal S1 is "H" (a high potential state), and makes connection to its contact b when the first switch change signal S1 is "L" (a low potential state). The output point of the third switch circuit 216 is connected to the contact a of the first switch circuit 214, and a high-potential point "Hu" is connected to the contact b of the first switch circuit 214. The second switch circuit 215 makes connection to its contact a when the first switch change signal S1 is "H", and makes connection to its contact b when the first switch change signal S1 is "L." The output point of the fourth switch circuit 217 is connected to the contact a of the second switch circuit 215, and a low-potential point "Ld" is connected to the contact b of the second switch circuit 215.

The high-potential point "Hu" has a potential higher than the potential Vm of the positive output terminal of the voltage supplying part 25 by a predetermined value. The low-potential point "Ld" has a potential lower than the potential (0 V) of the negative output terminal of the voltage supplying part 25 by a predetermined value.

The buffer circuit 212 buffers the low-side position signal P1, and outputs a second switch change signal S2. The third switch circuit 216 makes connection to its contact a when the second switch change signal S2 is "H", and makes connection to its contact b when the second switch change signal S2 is "L." The low-potential point "Ld" is connected to the contact a of the third switch circuit 216. The output point of the slew-rate circuit 210 is connected to the contact b of the third switch circuit 216. The fourth switch circuit 217 makes connection to its contact a when the second switch change signal S2 is "H", and makes connection to its contact b when the second switch change signal S2 is "L." The low-potential point "Ld" is connected to the contact a of the fourth switch circuit 217. The output point of the slew-rate circuit 210 is connected to the contact b of the fourth switch circuit 217. The AND circuit 213 executes a logical AND operation of the high-side position signal Q1 and the switching pulse signal Wp, and outputs a third switch change signal S3 to the slew-rate circuit 210.

The slew-rate circuit 210 comprises a fifth switch circuit 220, a charge-current circuit 221, a discharge-current circuit 222 and a capacitor 225. The fifth switch circuit 220 makes connection to its contact a when the third switch change signal S3 is "H", and makes connection to its contact b when the third switch change signal S3 is "L." The charge-current circuit 221, the current of which flows from the high-potential point "Hu," is connected to the contact a of the fifth switch circuit 220. The discharge-current circuit 222, the current of which flows into the low-potential point "Ld," is connected to the contact b of the fifth switch circuit 220. The capacitor 225 is connected to the output point of the fifth switch circuit 220. When the fifth switch circuit 220 makes connection to its contact a, the capacitor 225 is charged by the output current of the charge-current circuit 221, and the terminal voltage of the capacitor 225 rises gradually to the high potential "Hu." When the fifth switch circuit 220 makes connection to its contact b, the capacitor 225 is discharged by the output current of the discharge-current circuit 222, and the terminal voltage of the capacitor 225 falls gradually to the low potential "Ld." As a result, the terminal voltage signal R1 of the capacitor 225 changes in response to the single switching pulse signal Wp, and becomes a slew-rate switching signal which has adequate voltage slopes at its rising and falling edges.

The current values of the charge-current circuit 221 and the discharge-current circuit 222 are switched in response to the change command signal Dh. When the change command signal Dh is "L," the current values of the charge-current circuit 221 and the discharge-current circuit 222 become small. The slew-rate switching signal R1 of the capacitor 225 becomes a slow slew-rate-switching signal R1$a$ which has moderate voltage slopes. When the change command signal Dh is "H," the current values of the charge-current circuit 221 and the discharge-current circuit 222 become large. The slew-rate switching signal R1 of the capacitor 225 becomes a fast slew-rate switching signal R1$b$ which has steep voltage slopes.

Figure 14:
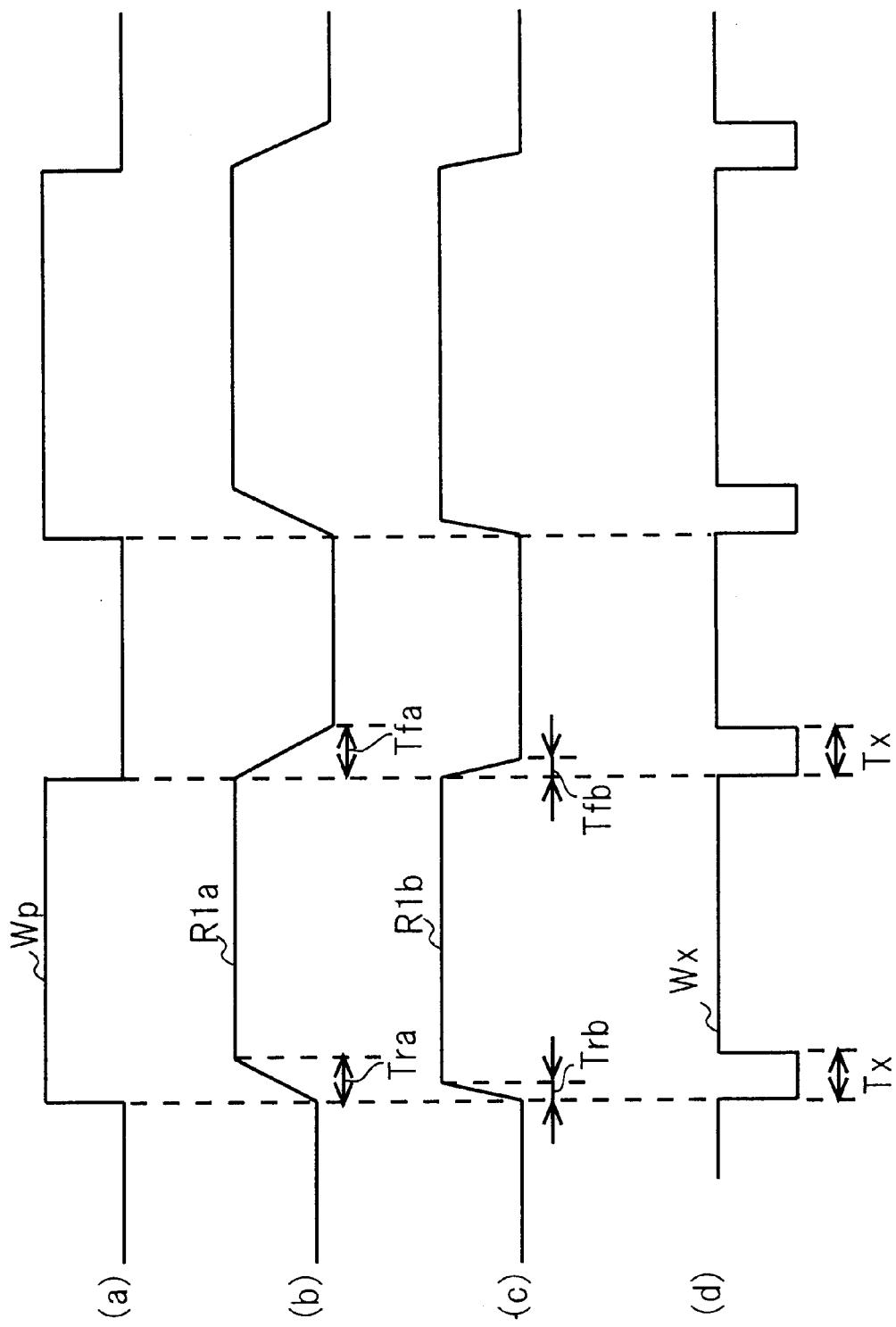
FIG. 14 is a waveform diagram illustrating the relationship among a switching pulse signal Wp, a slow slew-rate switching signal R1$a$, a fast slew-rate switching signal R1$b$ and a noise eliminating signal Wx in accordance with the embodiment 1.

Parts (a), (b) and (c) of FIG. 14 show the relationship among the switching pulse signal Wp, the slow slew-rate switching signal R1$a$ and the fast slew-rate switching signal R1$b$ (the abscissa represents time). The slow slew-rate switching signal R1$a$ and the fast slew-rate switching signal R1$b$ change in response to the change of the switching pulse signal Wp. The rising time Tra and the falling time Tfa of the slow slew-rate switching signal R1$a$ are made long. The rising time Trb and the falling time Tfb of the fast slew-rate switching signal R1$b$ are made short.

First, when the low-side position signal P1 is "L" and when the high-side position signal Q1 is "L," the first switch change signal S1 becomes "L." The first switch circuit 214 makes connection to the contact b, and the second switch circuit 215 makes connection to the contact b. Hence, the low-side activation control signal M1 becomes "Hu" (high potential), whereby the low-side power transistor 101 of the first power supply circuit 250A turns OFF. The high-side activation control signal N1 becomes "Ld" (low potential), whereby the high-side power transistor 105 of the first power supply circuit 250A turns OFF. As a result, in the case of P1="L" and Q1="L," the first power supply circuit 250A does not supply power to the winding 12.

Since the rotor 11 rotates by the generated drive force, the low-side position signal P1 becomes "H" and the high-side position signal Q1 is still "L". The first switch change signal S1 becomes "H," the first switch circuit 214 makes connection to the contact a, and the second switch circuit 215 makes connection to the contact a. The second switch change signal S2 becomes "H," the third switch circuit 216 makes connection to the contact a, and the fourth switch circuit 217 makes connection to the contact a. Hence, the low-side activation control signal M1 becomes "Ld" (low potential), whereby the low-side power transistor 101 of the first power supply circuit 250A turns ON. The high-side activation control signal N1 becomes "Ld" (low potential), whereby the high-side power transistor 105 of the first power supply circuit 250A is still OFF. As a result, in the case of P1="H" and Q1="L," the first power supply circuit 250A supplies the negative part of the drive current signal I1 to the winding 12 through the low-side power transistor 101.

Since the rotor 11 further rotates by the generated drive force, the low-side position signal P1 becomes "L" and the high-side position signal Q1 is still "L". Then the high-side power transistor 105 turns OFF and the low-side power transistor 101 is still OFF. Hence, the first power supply circuit 250A does not supply power to the winding 12.

Since the rotor 11 further rotates by the generated drive force, the low-side position signal P1 is still "L" and the high-side position signal Q1 becomes "H". The first switch change signal S1 becomes "H," the first switch circuit 214 makes connection to its contact a, and the second switch circuit 215 makes connection to its contact a. The second switch change signal S2 becomes "L," the third switch circuit 216 makes connection to its contact b, and the fourth switch circuit 217 makes connection to its contact b. Hence, the low-side activation control signal M1 and the high-side activation control signal N1 are same as the output signal of the slew-rate circuit 210. As a result, in the case of P1="L" and Q1="H," the low-side power transistor 101 (and the high-side power transistor 105) of the first power supply circuit 250A performs high-frequency switching operation responding with the slew-rate switching signal R1 of the slew-rate circuit 210. The first power supply circuit 250A supplies the positive part of the drive current signal I1 to the winding 12. Furthermore, since the high-side position signal Q1 is "H," the third switch change signal S3 of the AND circuit 213 coincides with the switching pulse signal Wp.

The high-side power transistor 105 of the first power supply circuit 250A is formed of an N-channel FET power transistor, and its source terminal is connected to the winding 12. Hence, the high-side power transistor 105 performs source-follower operation. Therefore, in response to the high-side activation control signal N1 at the control terminal (the gate terminal), the high-side power transistor 105 supplies the high-frequency switching drive voltage signal V1 to the winding 12. The high-frequency switching drive voltage signal V1 has slew-rate slopes in the rising and falling slopes, similar to the high-side activation control signal N1 at the control terminal. In this configuration, the low-side power transistor 101 is not required to perform follower operation, since the high-side power transistor 105 supplies the positive part of the drive current signal I1 to the winding 12 while performing high-frequency switching operation.

When the change command signal Dh is "L," the slow slew-rate switching signal R1a is output as the output signal of the slew-rate circuit 210. Hence, when Dh="L," the high-side power transistor 105 of the first power supply circuit 250A performs high-frequency switching operation responding with the slow slew-rate switching signal R1a, and the terminal voltage V1 becomes a high-frequency switching voltage signal which has low slew-rate slopes. Parts (a) and (b) of FIG. 14 show the relationship between the switching pulse signal Wp and the slow slew-rate switching signal R1a. The slow slew-rate switching signal R1a has the long rising time Tra and the long falling time Tfa, thereby being a switching signal having a low slew rate, that is, having moderate voltage slopes. When the slow slew-rate switching signal R1a becomes small, the high-side power transistor 105 turns OFF, and the low-side power transistor 101 or the low-side power diode 101d turns ON complementarily. Hence, the positive part of the drive current signal I1 is continuously supplied to the winding 12.

When the change command signal Dh is "H," the fast slew-rate switching signal R1b is output as the output signal of the slew-rate circuit 210. Hence, when Dh="H," the high-side power transistor 105 of the first power supply circuit 250A performs high-frequency switching operation responding with the fast slew-rate switching signal R1b, and the terminal voltage V1 becomes a high-frequency switching voltage signal which has high slew-rate slopes. The parts (a) and (c) of FIG. 14 show the relationship between the switching pulse signal Wp and the fast slew-rate switching signal R1b. The fast slew-rate switching signal R1b has the short rising time Trb and the short falling time Tfb, thereby being a switching signal having a high slew rate, that is, having steep voltage slopes. When the fast slew-rate switching signal R1b becomes small, the high-side power transistor 105 turns OFF, and the low-side power transistor 101 or the low-side power diode 101d turns ON complementarily. Hence, the positive part of the drive current signal I1 is continuously supplied to the winding 12.

In addition, the part (d) in FIG. 14 shows the noise eliminating signal Wx. The noise eliminating signal Wx has a noise eliminating period in which the signal becomes "L" in a required time Tx from the change timing of the switching pulse signal Wp. This noise eliminating period Tx is made longer than Tra, Tfa, Trb and Tfb (Tx>Tra, Tx>Tfa, Tx>Trb and Tx>Tfb). The noise eliminating signal Wx becomes "L" in the noise eliminating period including the rising and falling periods of the slow slew-rate switching signal R1a. Hence, the voltage detecting part 121 of the position detecting part 30 prevents improper detection due to switching noise occurring at the terminal voltages, and obtains the detected pulse signal Dt that changes at accurate timing.

The configurations and operations of the first activation control circuit 200A and the first power supply circuit 250A are described above. The configurations and operations of the second activation control circuit 200B, the third activation control circuit 200C, the second power supply circuit 250B and the third power supply circuit 250C are similar to those described above. Each of the slew-rate circuits included in the first activation control circuit 200A, the second activation control circuit 200B and the third activation control circuit 200C of the activation operation part 31 has a selection operation function which achieves that the power transistors selectively execute the slow slew-rate switching operation or the fast slew-rate switching operation in response to the change command signal. Furthermore, the second switch circuit 215 and the fourth switch circuit 217 have an operation control function which achieves that the second switch circuit 215 and the fourth switch circuit 217 supply the slew-rate switching signal R1 of the slew-rate circuit 210 to the activation control terminal of the high-side power transistor and the high-side power transistor is caused to follow the slew-rate switching signal.

Next, the comprehensive operation of the above-mentioned disk drive apparatus and motor is described below. First, the operation in the case of the change command signal Dh="L" is described. The motor driving block 91 subjects at least one of the power transistors to slow slew-rate switching operation, and supplies a high-frequency switching drive voltage signal having low switching noise and a low slew rate to the motor actuating block 82. The tracking driving block 92 subjects one of the power transistors to slow slew-rate switching operation, and supplies a high-frequency switching drive voltage signal having low switching noise and a low slew rate to the tracking actuating block 85. The signal processing block 93 allows the signal processing circuit to perform its circuit operation for reproducing the output signal from the head part 87, and makes the information output signal Eh effective.

The operation of the motor driving block 91 in the case of the change command signal Dh="L" is described below. The rotor 11 drives the disk 81. The position detecting part 30 detects the terminal voltages V1, V2 and V3 of the three-phase windings 12, 13 and 14. The terminal voltages V1, V2 and V3 change in response to the three-phase back electromotive forces of the three-phase windings 12, 13 and 14. The terminal voltages are detected selectively on the basis of the position signals which determines the activation state to the windings. The selected terminal voltage is compared with the common terminal voltage Vc, and the detected pulse signal Dt is produced in response to the comparison result. The low-side position signals P1, P2 and P3 and the high-side position signals Q1, Q2 and Q3 are changed at the first adjust time T1 and the second adjust time T2 after the detection timing of the detected pulse signal Dt. The commanding part 32 detects the rotational speed of the disk 81 by using the detected pulse signal Dt (the output pulse signal) of the position detecting part 30. The switching control part 22 compares the command signal Ac of the commanding part 32 with the current detection signal Ad of the current detecting part 21, and outputs the single switching pulse signal Wp responding with the comparison result. The activation operation part 31 selectively activates one or two high-side power transistors among the high-side power transistors 105, 106 and 107 of the power supplying part 20 responding with the three-phase high-side position signals Q1, Q2 and Q3. The activation operation part 31 produces the slew-rate switching signals at the control terminals of the high-side power transistors responding with the switching pulse signal Wp. The activation operation part 31 causes one or two of the high-side power transistors to perform high-frequency switching operation substantially simultaneously responding with the slew-rate switching signals, thereby supplying the positive parts of the drive current signals to the three-phase windings. Furthermore, the activation operation part 31 selectively activates one or two of the low-side power transistors 101, 102 and 103 of the power supplying part 20 responding with the three-phase low-side position signals P1, P2 and P3, thereby supplying the negative parts of the drive current signals to the three-phase windings.

Since the switching pulse signal Wp is directly produced by the result of the comparison between the command signal Ac and the current detection signal Ad, the composed supply current Ig to the three-phase windings is controlled responding with the command signal Ac. Each of the activation control circuit 200A, 200B and 200C of the activation operation part 31 produces the slow slew-rate switching signal R1a which has a moderate rising slope and a moderate falling slope in response to the single switching pulse signal Wp. One or two of the high-side power transistors of the power supplying part 20 perform slow slew-rate high-frequency switching operation responding with the slow slew-rate switching signals. Hence, the high-frequency switching noise due to the high-frequency switching operation of the power transistors is reduced significantly. As a result, the entry of switching noise into the head part 87 is reduced significantly, bit errors of the information output signal Eh of the signal processing block 93 is reduced to zero or reduced extremely.

Furthermore, the noise eliminating signal Wx of the switching control part 22 has noise eliminating periods which cover the rising slope period and the falling slope period of the slow slew-rate switching signal R1a. The noise eliminating signal Wx inhibits the pulse signal b4 which responds to the terminal voltages in the noise eliminating circuit 156 of the position detecting part 30. So the noise eliminating signal Wx can eliminate the influence of the switching noise which enters the terminal voltages due to the slow slew-rate switching operation. In other words, the voltage detecting part 121 can accurately detect the zero-crossing point of the terminal voltage. The detected pulse signal Dt becomes an accurate timing signal which corresponds to the rotational position of the rotor 11, whereby it is possible to produce accurate high-side position signals and low-side position signals. In addition, the commanding part 32 can accurately control the rotational speed of the disk 81 and the rotor 11 on the basis of the detected pulse signal Dt. In other words, an improper detection of the detected pulse signal Dt due to switching is prevented, and the fluctuation of the rotational speed of the disk 81 can be reduced remarkably.

Furthermore, in the tracking driving block 92, power transistors are subjected to slow slew-rate switching operation, whereby a high-frequency switching drive voltage signal having low switching noise and a low slew rate is supplied to the tracking actuating block 85. Hence, the occurrence of radiant noise by the tracking driving block 92 is reduced. As a result, the entry of noise into the head part 87 is reduced significantly, and bit errors of the information output signal Eh of the signal processing block 93 can be reduced to zero or reduced extremely. The configuration of the tracking driving block 92 is identical with or similar to that of the above-mentioned motor driving block, and its detailed explanation is omitted.

Next, the operation in the case of the change command signal Dh="H" is explained. The motor driving block 91 causes the power transistors to perform fast slew-rate switching operation, and supplies a high-frequency switching drive voltage signal having a low switching loss and a high slew rate to the motor actuating block 82. The tracking driving block 92 causes the power transistors to perform fast slew-rate switching operation, and supplies a high-frequency switching drive voltage signal having a low switching loss and a high slew rate to the tracking actuating block 85. The signal processing block 93 stops the whole or part of the circuit operation of the signal processing circuit, and makes the information output signal Eh ineffective.

The operation of the motor driving block 91 in the case of the change command signal Dh="H" is described below. The position detecting part 30 detects the terminal voltages V1, V2 and V3 of the three-phase windings 12, 13 and 14, and produces the detected pulse signal Dt responding with the comparison result between the terminal voltages of the three-phase windings and the common terminal voltage Vc. The three-phase low-side position signals P1, P2 and P3 and the three-phase high-side position signals Q1, Q2 and Q3 are changed responding with the detected pulse signal Dt. The commanding part 32 detects the period of the detected pulse signal Dt, and produces the command signal Ac which corresponds to the rotational speed of the disk 81. The switching control part 22 compares the command signal Ac of the commanding part 32 with the current detection signal Ad of the current detecting part 21, and outputs the single switching pulse signal Wp responding with the comparison result. The activation operation part 31 selectively activates one or two of the three high-side power transistors 105, 106 and 107 of the power supplying part 20 in response to the three-phase high-side position signals Q1, Q2 and Q3. The activation operation part 31 produces the fast slew-rate switching signals responding with the switching pulse signal Wp, and causes one or two of the high-side power transistors to perform high-frequency switching operation substantially simultaneously responding with the fast slew-rate switching signals. The activation operation part 31 supplies the positive parts of the drive current signals to the three-phase windings. Furthermore, the activation operation part 31 selectively activates one or two of the low-side power transistors 101, 102 and 103 of the power supplying part 20 in response to the three-phase low-side position signals P1, P2 and P3. The activation operation part 31 supplies the negative parts of the drive current signals to the three-phase windings.

Since the switching pulse signal Wp is directly produced by the result of the comparison between the command signal Ac and the current detection signal Ad, the composed supply current Ig to the three-phase windings is controlled by the command signal Ac. Each of the activation control circuits 200A, 200B and 200C of the activation operation part 31 produces the fast slew-rate switching signal R1b responding with the single switching pulse signal Wp. One or two of the high-side power transistors are subjected to fast slew-rate high-frequency switching operation responding with the fast slew-rate switching signals. Hence, the switching loss due to the high slew-rate switching operation of the power transistors is made lower significantly than that in the case of the slow slew-rate switching operation. Furthermore, the information output signal Eh of the signal processing block 93 is made ineffective. Hence, even if high-frequency noise enters the head part 87 owing to the high-frequency switching of the power transistors, no influence of the noise occurs in the output signal of the signal processing block 93.

Furthermore, the noise eliminating signal Wx of the switching control part 22 has noise eliminating periods which cover the rising and falling edges of the fast slew-rate switching signal R1b. Hence, in the noise eliminating circuit 156 of the position detecting part 30, it is possible to eliminate the influence of switching noise in the terminal voltages. The detected pulse signal Dt becomes a timing signal which accurately corresponds to the rotational position of the rotor 11, thereby producing accurate high-side and low-side position signals. In addition, the commanding part 32 can accurately control the rotational speeds of the disk 81 and the rotor 11 on the basis of the detected pulse signal Dt.

Furthermore, even in the tracking driving block 92, the power transistors are subjected to fast slew-rate switching operation, and a high-frequency switching drive voltage signal is supplied to the tracking actuating block 85. This reduces switching power losses of the power transistors of the tracking driving block 92.

In this embodiment, the power consumption of the disk drive apparatus can be reduced remarkably. First, when the disk drive apparatus reproduces a signal from the disk 81, the change command signal Dh of the change command part 94 is set at "L." The high-frequency drive voltage signals with the slow slew-rate are supplied to the three-phase windings so as to rotate the disk 81 at a predetermined rotational speed. In addition, the high-frequency drive voltage signals with the slow slew-rate are supplied to the tracking actuating block 85 so as to place the head part 87 at a predetermined tracking position. Furthermore, the signal processing block 93 carries out signal processing operation, and outputs the information output signal Eh responding with the reproduction signal Ch of the head part 87. At this time, the information output signal Eh of the signal processing block 93 is made effective.

The activation operation part produces at least a slow slew-rate switching signal at the control terminal of at least one of the three high-side power transistors. The slow slew-rate switching signal changes responding with the single switching pulse signal Wp, and has moderate voltage slopes in at least one of the rising and falling edges. Hence, the at least one of the three high-side power transistors follows the slow slew-rate switching signal. Therefore, the terminal voltages at the power supply terminal of the three-phase windings become high-frequency switching drive voltage signals, each of which has moderate voltage slopes similar to the slow slew-rate switching signal. As a result, switching noise due to the high-frequency switching operation of the power transistors is reduced remarkably. Furthermore, since the power transistors perform high-frequency switching operation, the power losses of the power transistors are reduced remarkably. In other words, power consumption at the motor driving block 91 and the motor actuating block 82 is reduced, and the occurrence of switching noise is also reduced. Similarly, power consumption at the tracking driving block 92 and the tracking actuating block 85 is reduced, and the occurrence of switching noise is also reduced. As a result, switching noise entry to the head part 87 is reduced remarkably, and the disk drive apparatus can output the information output signal Eh that has few errors and high reliability.

Next, when the disk drive apparatus does not require signal reproduction in a standby state, the change command signal Dh of the change command part 94 is set at "H." The high-frequency drive voltage signals with the fast slew-rate are supplied to the three-phase windings so as to rotate the disk 81 at a predetermined rotational speed, whereby the power consumption of the disk drive apparatus is reduced further. In addition, the high-frequency drive voltage signals with the fast slew-rate are supplied to the tracking actuating block 85 so as to hold or replace the head part 87 at a tracking position, whereby the power consumption is reduced further. Furthermore, the signal processing block 93 stops the whole or part of the signal processing operation by shut off a power supply voltage, whereby the power consumption is reduced further. At this time, the information output signal Eh of the signal processing block 93 is made ineffective. Hence, the power consumption of the disk drive apparatus in the standby state can be reduced remarkably. Still further, although relatively large switching noise is caused by the switching operations of the motor driving block 91 and the tracking driving block 92, the information output signal Eh is not affected by the switching noise since the signal processing block 93 stops signal processing.

In addition, in this embodiment, each of the high-side power transistors is formed of an N-channel FET power transistor. Its drain terminal is connected to the positive output terminal of the power supplying part, and its source terminal is connected to one of the power supply terminals of the three-phase windings, whereby the high-side power transistor follow the slew-rate switching signal at its control terminal. In other words, since the slew-rate switching signal is produced at the control terminal of the high-side power transistor, the high-side power transistor supplies the slow slew-rate switching drive voltage signal to one of the power supply terminals of the three-phase windings. As a result, the slow slew-rate switching drive voltage signal has moderate voltage slopes responding with the slew-rate switching signal, and the switching noise can be reduced remarkably.

Furthermore, in this embodiment, each of the active periods of the three high-side power transistors responding with the three-phase high-side position signals Q1, Q2 and Q3 is made considerably longer than the electrical angle of 360/3=120 degrees. Hence, one or two of the high-side power transistors are subjected to high-frequency switching operation substantially simultaneously to supply the positive parts of the drive current signals to one or two of the three-phase windings. Still further, each of the active periods of the three low-side power transistors responding with the three-phase low-side position signals P1, P2 and P3 is made considerably longer than the electrical angle of 360/3=120 degrees. Hence, one or two of the low-side power transistors are activated substantially simultaneously to supply the negative parts of the drive current signals to one or two of the three-phase windings. Still further, the current detecting part detects the composed supply current Ig to the three-phase windings from the voltage supplying part, and produces the current detection signal Ad. The switching control part produces the single switching pulse signal Wp in response to the current detection signal Ad and the command signal Ac. The slew-rate switching pulse signals are produced responding with this single switching pulse signal Wp. The high-side power transistors are subjected to high-frequency switching operation substantially simultaneously responding with the slew-rate switching signals. In reality, one or two of the high-side power transistors selected by the high-side position signals are subjected to switching operation substantially simultaneously responding with one or two of the slew-rate switching signals. Hence, the accurate composed supply current Ig responding with the command signal Ac can be supplied to the three-phase windings, and the generated drive force can be controlled accurately by the command signal Ac. As a result, the current paths to the three-phase windings are altered smoothly, and accurate drive current signals responding with the command signal are supplied to the three-phase windings. Therefore, the fluctuation of the generated drive force is reduced remarkably. In other words, a disk drive apparatus with a low acoustic noise and a small vibration is realized. It is preferable that each of the active periods of these power transistors is in the range from 125 to 170 electrical degrees. Still further, since the slew-rate switching signals are produced responding with the single switching pulse signal Wp, the high-side power transistors should only be subjected to high-frequency switching operation simultaneously. Hence, the configuration to control the drive current signals becomes very simple. Still further, since the high-side power transistors perform high-frequency switching in response to the single switching pulse signal Wp, the current detecting part can easily detect the composed supply current although the switching drive voltage signals have slew-rate slopes. In particular, when the active periods of the power transistor are longer than the period of 360/3=120 electrical degrees, the high-side power transistors should only be subjected to high-frequency switching operation substantially simultaneously responding with the slew-rate switching signals. The configuration can thus be simplified. In the three activation control circuits 200A, 200B and 200C of FIG. 8, the slew-rate switching signals are produced at the control terminals of the high-side power transistors. However, the present invention is not limited to such a case, but various modifications are possible. For example, a single slew-rate switching signal responding with the single switching pulse signal Wp can be formed, and the slew-rate switching signal can be supplied to the control terminals of the power transistors responding with the high-side and low-side position signals.

In addition, in this embodiment, the slew-rate circuit comprises the capacitor and the charge-discharge circuit, and the charge-discharge circuit has the constant current circuits. The charge-discharge circuit charges or discharges the capacitor, and produces the slew-rate switching signal. Furthermore, the slow slew-rate switching signal and the fast slew-rate switching signal are switched by changing the current values of the constant current circuits. However, the present invention is not limited to such a case, but the single switching pulse signal Wp can be directly used as the fast slew-rate switching signal.

In addition, in the disk drive apparatus and the motor of this embodiment, the terminal voltages of the windings are detected so as to produce the position signals. Hence, position detecting elements for detecting the rotational position of the rotor 11 are unnecessary, whereby the number of components disposed near the windings is reduced remarkably and the configuration is thus simplified. Furthermore, since the switching control part produces the slow slew-rate switching signal and the noise eliminating signal Wx responding with the single switching pulse signal, the noise eliminating signal Wx has noise eliminating periods which includes the rising slope period and the falling slope period of the slow slew-rate switching signal R1a. The noise eliminating circuit of the position detecting part logically composes the detected signal b4 of the terminal voltages and the noise eliminating signal Wx. So the operation for detecting the terminal voltages of the windings is stopped during the noise eliminating periods and carried out during the rest periods except the noise eliminating periods. In other words, the detecting operation is stopped when the noise eliminating signal Wx is "L," and the detecting operation is carried out when the noise eliminating signal Wx is "H." As a result, the noise eliminating signal Wx prevents the influence of the switching noise entering the terminal voltages of the windings due to the slow slew-rate switching operation. The detected pulse signal Dt of the voltage detecting part 121 becomes a timing signal which accurately responds with the rotational position of the rotor 11. Therefore, the high-side and low-side position signals can be produced accurately responding with the detected pulse signal Dt. Furthermore, the rotational speeds of the disk 81 and the rotor 11 can be controlled accurately by using an output pulse signal of the position detecting part, the detected pulse signal Dt, for example. In other words, an improper detection of the output pulse signals of the position detecting part is prevented, and the fluctuation of the rotational speed of the disk 81 is reduced remarkably. In particular, the influence of switching noise occurring during the slew-rate slope periods is eliminated in the slow slew-rate switching operation in which the information output signal Eh of the signal processing block 93 is effective. As a result, a high-performance disk speed control with reduced fluctuation can be attained, whereby it is possible to reproduce a signal from a high density disk. Still further, the high-side power transistors (or the low-side power transistors) are subjected to high-frequency switching operation substantially simultaneously by the slew-rate switching signals which respond with the single switching pulse signal Wp. Hence, the effective noise eliminating operation can be carried out by the single noise eliminating signal Wx which responds with the single switching pulse signal Wp.

Figure 15:
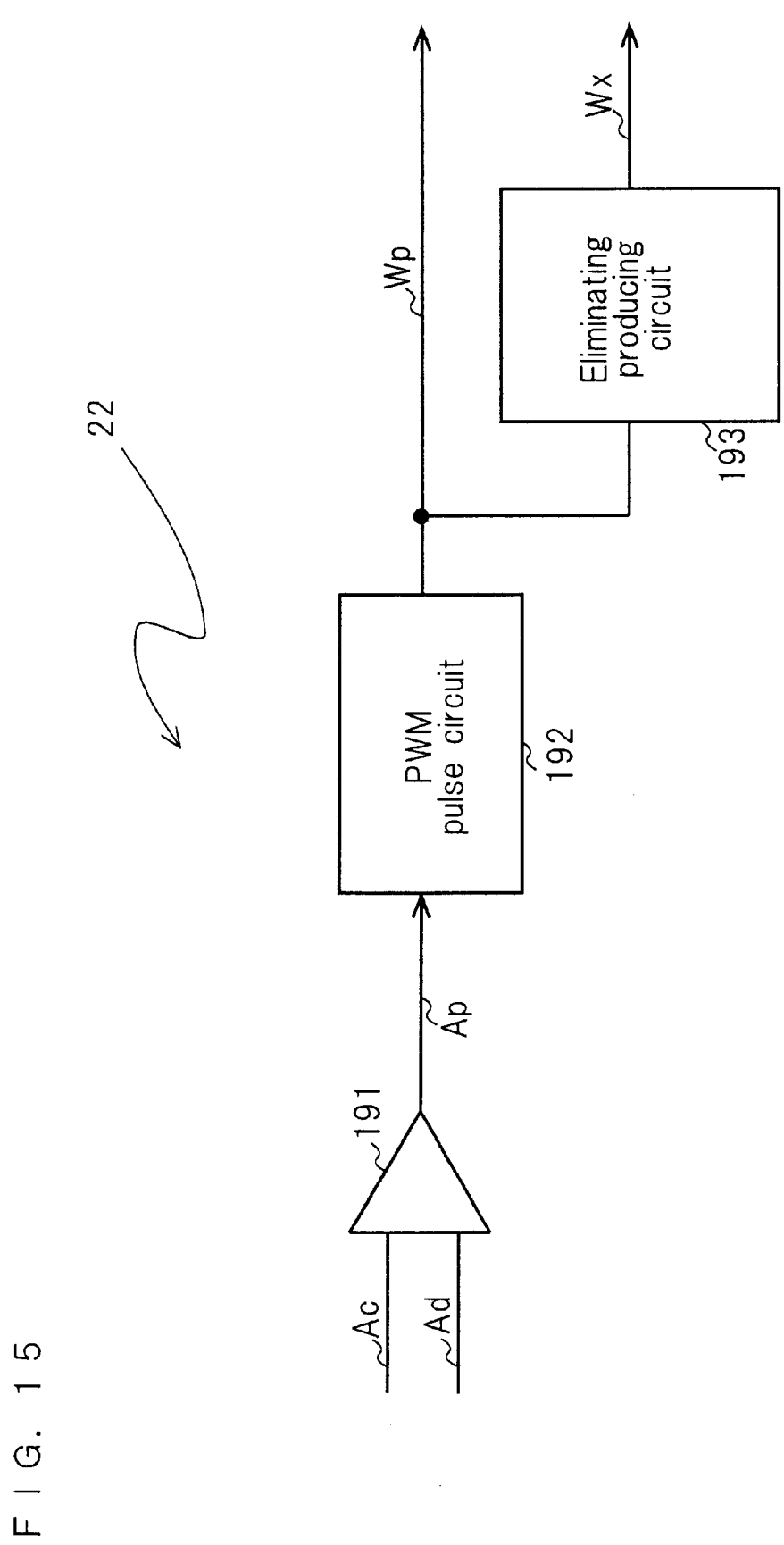
FIG. 15 is a diagram showing another configuration of the switching control part 22 in accordance with the embodiment 1.
Figure 16:
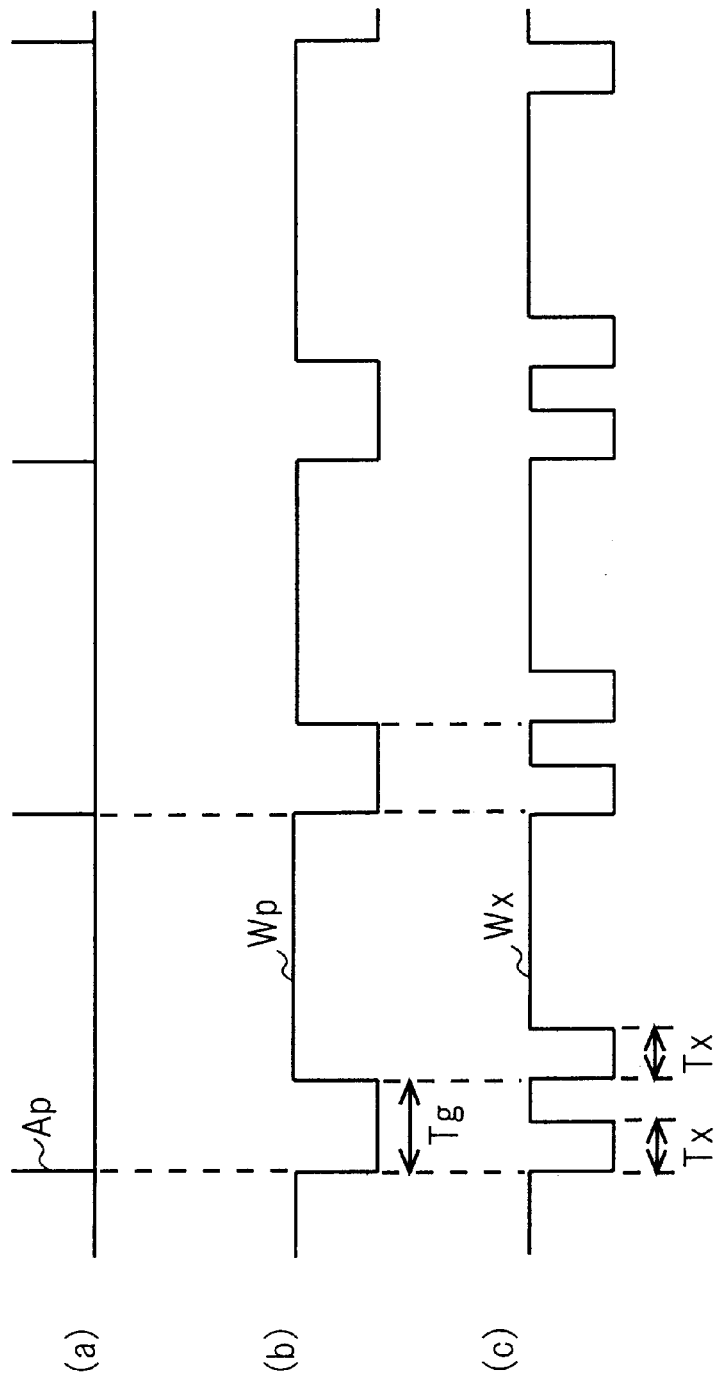
FIG. 16 is a waveform diagram illustrating the operation of the switching control part 22 of FIG. 15 in accordance with the embodiment 1.

In addition, in the disk drive apparatus and the motor of this embodiment, the switching control part shown in FIG. 7 is used, the trigger pulse signal Ar triggers at every predetermined time, and the frequency of the switching pulse signal Wp is constant or nearly constant. However, the present invention is not limited to such a case, but various modifications are possible. For example, a different configuration shown in FIG. 15 can be used as the switching control part. The switching control part of FIG. 15 comprises a compare circuit 191, a PWM pulse circuit 192 and an elimination producing circuit 193. The compare circuit 191 compares the command signal Ac with the current detection signal Ad. When the current detection signal Ad becomes larger than the command signal Ac, the compared signal Ap is changed to "H." The switching pulse signal Wp of the PWM pulse circuit 192 becomes "L" in a predetermined period Tg from the occurrence of the rising edge of the output signal Ap of the compare circuit 191 and becomes "H" after the predetermined period Tg. The eliminating producing circuit 193 outputs the noise eliminating signal Wx that becomes "L" in the predetermined period Tx from the change timing of the rising and falling edges of the switching pulse signal Wp. Parts (a), (b) and (c) of FIG. 16 show the waveforms of the compared signal Ap, the switching pulse signal Wp and the noise eliminating signal Wx. The abscissa of FIG. 16 represents time. The operation of the disk drive apparatus and the motor incorporating this switching control part is similar to that of the above-mentioned embodiment, and its explanation is omitted.

<<Embodiment 2>>

FIGS. 17 to 20 show a disk drive apparatus including a motor in accordance with embodiment 2 of the present invention, and a motor which is suitable for use in a disk drive apparatus. In this embodiment, the activation operation part and the power supplying part in the above-mentioned embodiment 1 are changed, and N-channel FET power transistors are used for the three high-side power transistors and the three low-side power transistors. The parts or circuits similar to those of the above-mentioned embodiment 1 are designated by the same numerals, and their explanations are omitted. In addition, the comprehensive configuration of the disk drive apparatus in accordance with this embodiment is similar to that shown in FIG. 2, and its explanation is omitted.

Figure 17:
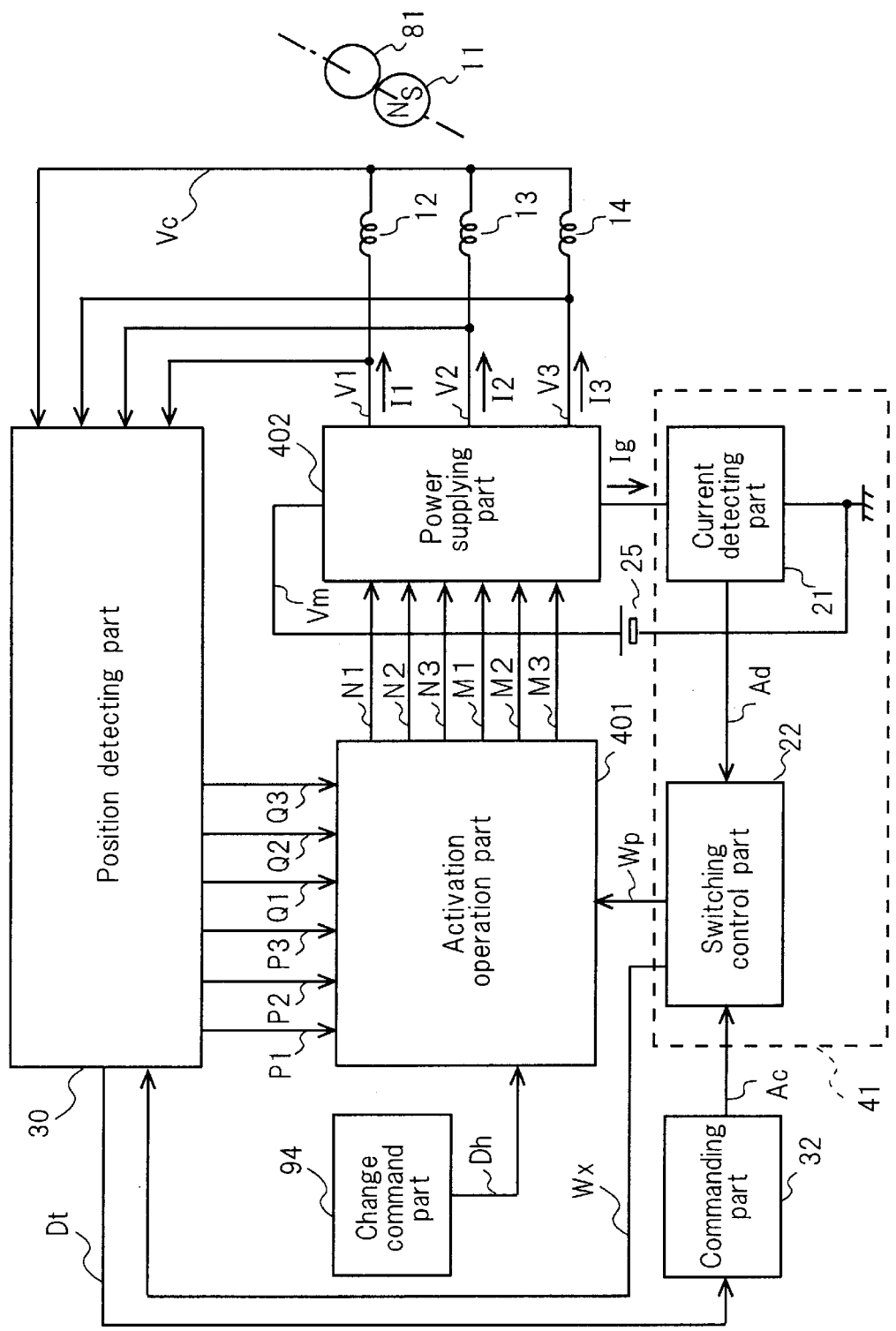
FIG. 17 is a diagram showing a comprehensive configuration of a motor in accordance with embodiment 2 of the present invention.

FIG. 17 shows configurations of the motor actuating block and the motor driving block. The rotor 11 of the motor actuating block which drives the disk 81 provides a field part which generates field fluxes by a permanent magnet. The three-phase windings 12, 13 and 14 are disposed on the stator, each displaced from the others by an electrical angle of about 120 degrees with respect to the field part of the rotor 11. The three-phase windings 12, 13 and 14 generate three-phase magnetic fluxes by the three-phase drive current signals I1, I2 and I3, and also generates a drive force by the interaction between the drive current signals and the field part of the rotor 11. The generated drive force drives the rotor 11 and the disk 81.

A power supplying part 402 forms current paths from the voltage supplying part 25 to the three-phase windings 12, 13 and 14 in response to the three-phase low-side activation control signals M1, M2 and M3 and the three-phase high-side activation control signals N1, N2 and N3 of an activation operation part 401. Hence, the power supplying part 402 supplies a power to the three-phase windings 12, 13 and 14. Configurations of the power supplying part 402 and the activation operation part 401 will be described later.

The current detecting part 21 outputs the current detection signal Ad which responds with the composed supply current Ig to the three-phase windings 12, 13 and 14 from the voltage supplying part 25. Since the power transistors of the power supplying part 402 perform ON-OFF high-frequency switching operation, the composed supply current Ig and the current detection signal Ad become pulse signals.

The position detecting part 30 detects the rotational position of the field part of the rotor 11, and produces the low-side position signals P1, P2 and P3, the high-side position signals Q1, Q2 and Q3 and the detected pulse signal Dt in response to the detected position. In this embodiment, the position detecting part 30 detects the three-phase terminal voltages V1, V2 and V3 and the common terminal voltage Vc at the terminals of the three-phase windings 12, 13 and 14, and produces the position signals in accordance with the comparison result of the terminal voltages. A configuration of the position detecting part 30 is similar to that shown in FIG. 4. The position detecting part 30 produces the three-phase low-side position signals P1, P2 and P3 and the three-phase high-side position signals Q1, Q2 and Q3. Each of the three-phase low-side position signals P1, P2 and P3 has an "H" period (active period) larger than the period of 120 electrical degrees, and each of the three-phase high-side position signals Q1, Q2 and Q3 has an "H" period (active period) larger than the period of 120 electrical degrees.

The commanding part 32 comprises a speed control circuit for controlling the rotational speed of the disk 81 and the rotor 11 at a predetermined value. The commanding part 32 detects the rotational speed of the disk 81 and the rotor 11 by using an output pulse signal (the detected pulse signal Dt) of the position detecting part 30, and produces the command signal Ac which responds with the difference between the detected rotational speed and an aimed speed.

The switching control part 22 produces the single switching pulse signal Wp responding with the current detection signal Ad of the current detecting part 21 and the command signal Ac of the commanding part 32. The configuration of the switching control part 22 is similar to that shown in FIG. 7.

Figure 18:
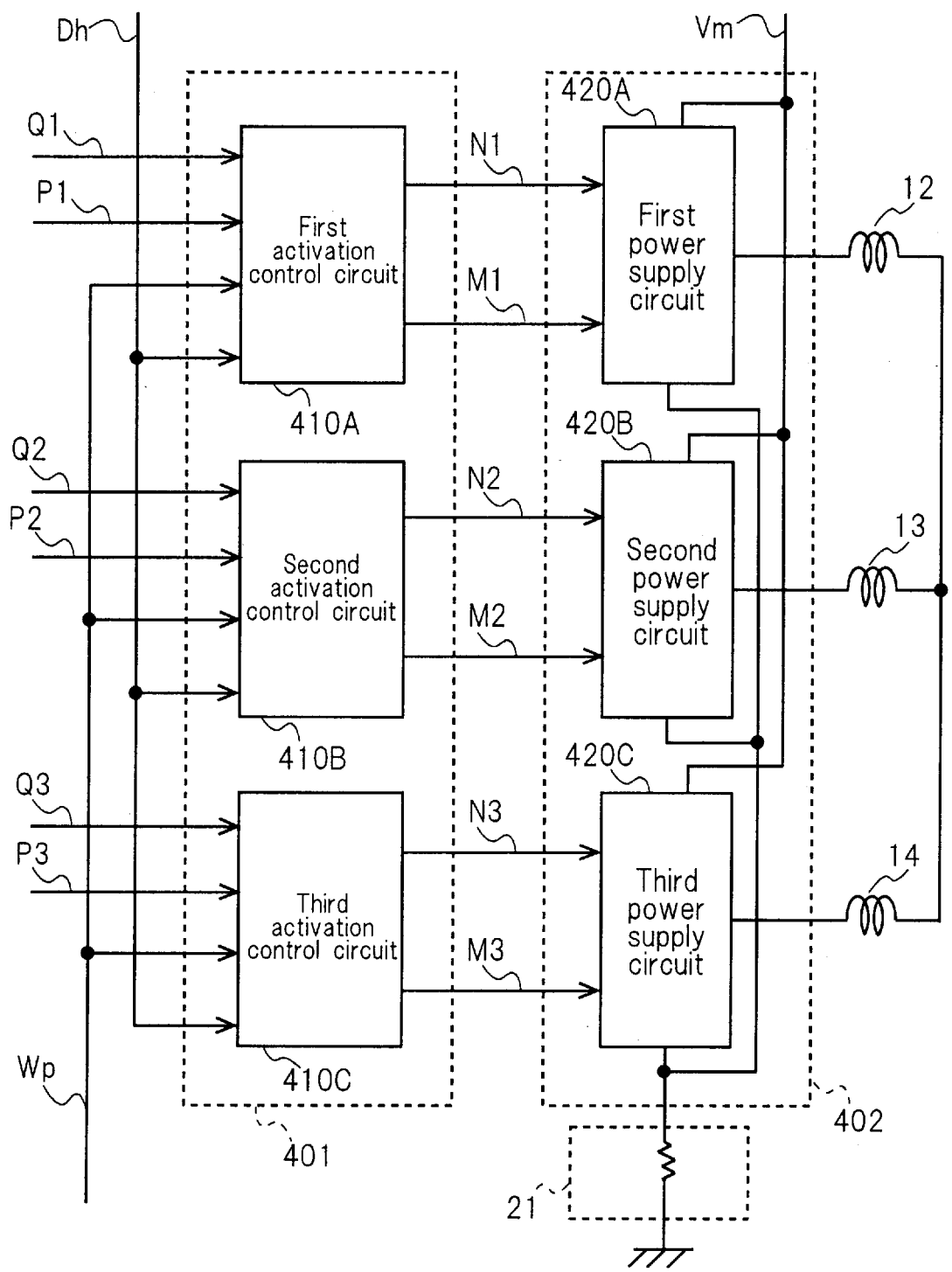
FIG. 18 is a diagram showing configurations of an activation operation part 401 and a power supplying part 402 in accordance with the embodiment 2.

The activation operation part 401 produces the three-phase high-side activation control signals N1, N2 and N3 responding with the three-phase high-side position signals Q1, Q2 and Q3 of the position detecting part 30 and the switching pulse signal Wp of the switching control part 22. The activation operation part 401 produces the three-phase low-side activation control signals M1, M2 and M3 responding with the three-phase low-side position signals P1, P2 and P3 of the position detecting part 30. Hence, the active periods of the high-side power transistors of the power supplying part 402 are determined by the high-side position signals, and the active periods of the low-side power transistors of the power supplying part 402 are determined by the low-side position signals. In addition, the high-side activation control signals N1, N2 and N3 of the activation operation part 401 are switching pulse signals responding with the switching pulse signal Wp. FIG. 18 shows specific configurations of the activation operation part 401 and the power supplying part 402.

The activation operation part 401 of FIG. 18 comprises a first activation control circuit 410A, a second activation control circuit 410B and a third activation control circuit 410C. The first activation control circuit 410A receives the low-side position signal P1, the high-side position signal Q1, the switching pulse signal Wp and the change command signal Dh and outputs the low-side activation control signal M1 and the high-side activation control signal N1. The second activation control circuit 410B receives the low-side position signal P2, the high-side position signal Q2, the switching pulse signal Wp and the change command signal Dh and outputs the low-side activation control signal M2 and the high-side activation control signal N2. The third activation control circuit 410C receives the low-side position signal P3, the high-side position signal Q3, the switching pulse signal Wp and the change command signal Dh and outputs the low-side activation control signal M3 and the high-side activation control signal N3.

The power supplying part 402 of FIG. 18 comprises a first power supply circuit 420A, a second power supply circuit 420B and a third power supply circuit 420C. The first power supply circuit 420A receives the low-side activation control signal M1 and the high-side activation control signal N1 of the first activation control circuit 410A and carries out activation to the power supply terminal of the winding 12. The second power supply circuit 420B receives the low-side activation control signal M2 and the high-side activation control signal N2 of the second activation control circuit 410B and carries out activation to the power supply terminal of the winding 13. The third power supply circuit 420C receives the low-side activation control signal M3 and the high-side activation control signal N3 of the third activation control circuit 410C and carries out activation to the power supply terminal of the winding 14.

Figure 19:
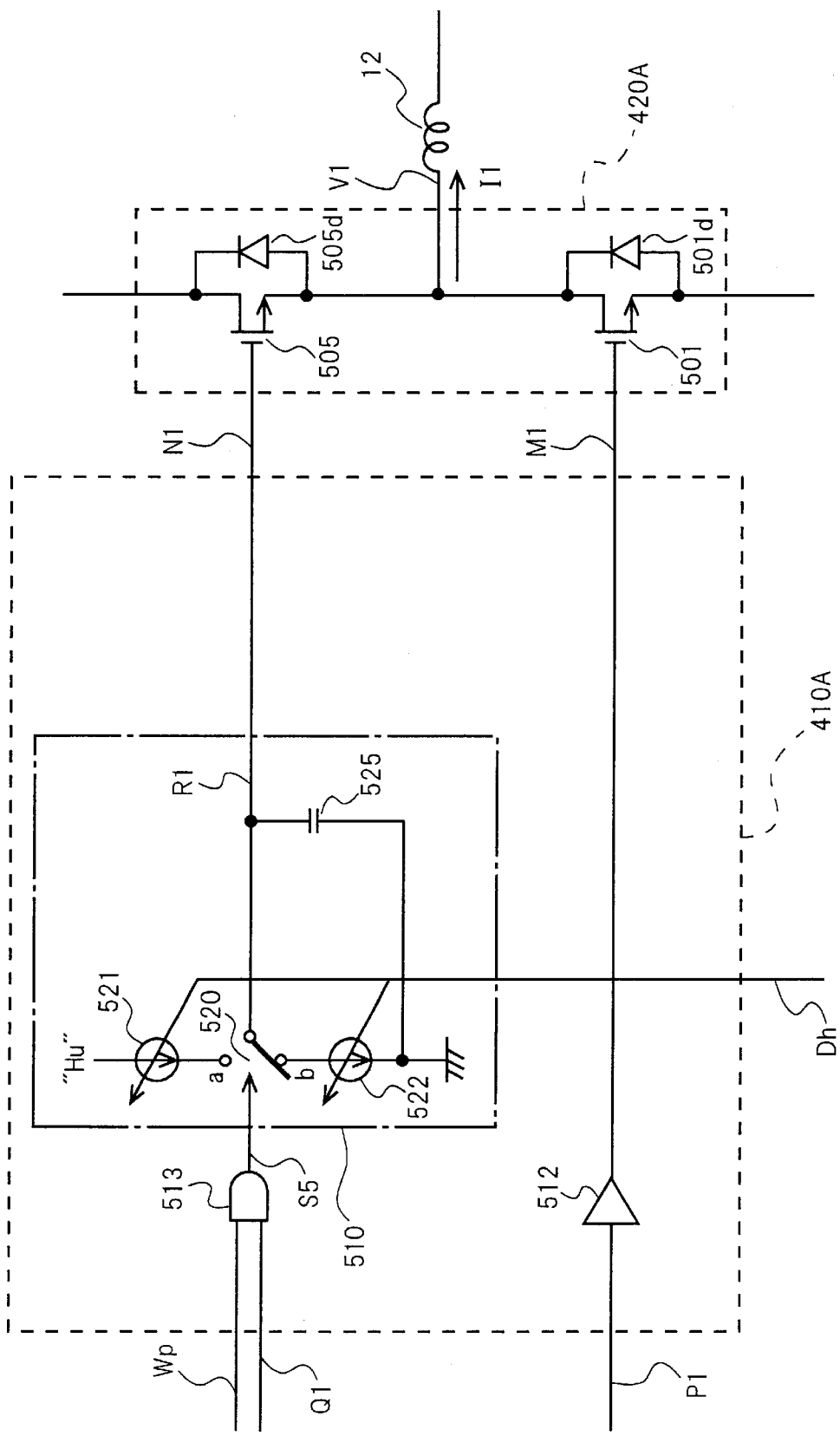
FIG. 19 is a diagram showing configurations of a first activation control circuit 410A and a first power supply circuit 420A in accordance with the embodiment 2.

FIG. 19 shows configurations of the first activation control circuit 410A and the first power supply circuit 420A. The first power supply circuit 420A comprises a low-side power transistor 501, a high-side power transistor 505, a low-side power diode 501d and a high-side power diode 505d. The first power supply circuit 420A supplies the drive voltage signal V1 and the drive current signal I1 to the winding 12 in response to the low-side activation control signal M1 and the high-side activation control signal N1. The high-side power transistor 505 is formed of an N-channel FET power transistor. The high-side power diode 505d is formed of a parasitic diode of the N-channel FET power transistor which is connected reversely to this FET power transistor. The low-side power transistor 501 is formed of an N-channel FET power transistor. The low-side power diode 501d is formed of a parasitic diode of the N-channel FET power transistor which is connected reversely to this FET power transistor. The high-side power transistor 505 forms a current path from the positive output terminal of the voltage supplying part 25 to the power supply terminal of the winding 12. The low-side power transistor 501 forms a current path from the negative output terminal of the voltage supplying part 25 to the power supply terminal of the winding 12.

The first-activation control circuit 410A comprises a slew-rate circuit 510, a buffer circuit 512 and an AND circuit 513. The buffer circuit 512 buffers the low-side position signal P1 and outputs the low-side activation control signal M1 to the control terminal of the low-side power transistor 501. The AND circuit 513 performs a logical AND operation between the high-side position signal Q1 and the switching pulse signal Wp so as to produce a switch change signal S5. The AND circuit 513 outputs the switch change signal S5 to the slew-rate circuit 510.

The slew-rate circuit 510 comprises a switch circuit 520, constant current circuits 521, 522 and a capacitor 525. The switch circuit 520 makes connection to its contact a when the switch change signal S5 is "H" and makes connection to its contact b when the switch change signal S5 is "L." The constant current circuit 521, the current of which flows from the high-potential point "Hu," is connected to the contact a of the switch circuit 520. The constant current circuit 522, the current of which flows into the ground potential point (0 V), is connected to the contact b of the switch circuit 520. The capacitor 525 is connected to the output point of the switch circuit 520. When the switch circuit 520 makes connection to its contact a, the capacitor 525 is charged by the output current of the constant current circuit 521, and the terminal voltage rises gradually to the high potential "Hu." When the switch circuit 520 makes connection to its contact b, the capacitor 525 is discharged by the output current of the constant current circuit 522, and the terminal voltage lowers gradually to the ground potential (0 V). As a result, the terminal voltage signal R1 of the capacitor 525 changes responding with the single switching pulse signal Wp and becomes a slew-rate switching signal which has required voltage slopes at its rising and falling edges. The output terminal of the slew-rate circuit 510 is connected directly to the control terminal of the high-side power transistor 505, and the slew-rate switching signal R1 is produced at the control terminal of the high-side power transistor 505. The ground potential (0 V) coincides with the potential at the negative output terminal of the voltage supplying part 25. In addition, in case that the slew-rate switching signal is produced directly at the control terminal of the FET power transistor 505, the input gate capacitance (parasitic capacitance) of the FET power transistor 505 can be used as the capacitor 525. In this case, the capacitor 525 is not necessary, because the input gate capacitance of the FET power transistor 505 is used as the capacitance for the slew-rate circuit.

The current values of the constant current circuits 521 and 522 are switched by the change command signal Dh of the change command part 94. When the change command signal Dh is "L," the current values of the constant current circuits 521 and 522 become relatively small. The slew-rate switching signal R1 at the capacitor 525 becomes a slow slew-rate switching signal R1a which has moderate voltage slopes. When the change command signal Dh is "H," the current values of the constant current circuits 521 and 522 become relatively large. The slew-rate switching signal R1 at the capacitor 525 becomes a fast slew-rate switching signal R1b which has steep voltage slopes. The relationship among the switching pulse signal Wp, the slow slew-rate switching signal R1a and the fast slew-rate switching signal R1b is similar to that shown in the parts (a), (b) and (c) of FIG. 14. The slew-rate switching signal R1 (the slow slew-rate switching signal R1a or the fast slew-rate switching signal R1b) changes responding with the switching pulse signal Wp. The rising time Tra and the falling time Tfa of the slow slew-rate switching signal R1a are made long. The rising time Trb and the falling time Tfb of the fast slew-rate switching signal R1b are made short.

First, when the low-side position signal P1 is "L" and the high-side position signal Q1 is "L," the output of the buffer circuit 512 is "L" and the output of the AND circuit 513 is "L." So the low-side activation control signal M1 is "L," and the low-side power transistor 501 of the first power supply circuit 420A is OFF. The switch change signal S5 is "L", and then the slew-rate switching signal R1 of the slew-rate circuit 510 which coincides with the high-side activation control signal N1 is the ground potential (0 V), whereby the high-side power transistor 505 of the first power supply circuit 420A is OFF. As a result, in the case of P1="L" and Q1="L," the first power-supply circuit 420A does not supply a power to the winding 12.

Since the rotor 11 rotates by the generated drive force, the low-side position signal P1 becomes "H" and the high-side position signal Q1 is still "L." The low-side activation control signal M1 becomes "H", whereby the low-side power transistor 501 of the first power supply circuit 420A turns ON. The high-side activation control signal N1 (the slew-rate switching signal of the slew-rate circuit 510) is the ground potential (0 V), whereby the high-side power transistor 505 of the first power supply circuit 420A is still OFF. As a result, in the case of P1="H" and Q1="L," the first power supply circuit 420A supplies the negative part of the drive current signal I1 to the winding 12.

Since the rotor 11 further rotates by the generated drive force, the low-side position signal P1 becomes "L" and the high-side position signal Q1 is still "L." The high-side activation control signal N1 becomes the ground potential, and the low-side activation control signal M1 is still the ground potential. Hence, the high-side power transistor 505 and the low-side power transistor 501 turn OFF. In other words, the first power supply circuit 420A does not supply a power to the winding 12.

Since the rotor 11 further rotates by the generated drive force, the low-side position signal P1 is "L" and the high-side position signal Q1 becomes "H." The low-side activation control signal M1 is "L," and the low-side power transistor 501 of the first power supply circuit 420A is OFF. The switch change signal S5 which is the output of the AND circuit 513 coincides with the switching pulse signal Wp which is a high-frequency switching signal. The switch circuit 520 of the slew-rate circuit 510 is switched responding with the switching pulse signal Wp, the slew-rate switching circuit produces the slew-rate switching signal R1 at the terminal of the capacitor 525. Since the high-side activation control signal N1 is the slew-rate switching signal R1, the high-side power transistor 505 of the first power supply circuit 420A performs high-frequency switching operation responding with the slew-rate switching signal R1 of the slew-rate circuit 510. As a result, in the case of P1="L" and Q1="H," the first power supply circuit 420A supplies the high-frequency switching drive voltage V1 to the power supply terminal of the winding 12. During the OFF period of the high-side power transistor 505, the low-side power diode 501d is activated by the inductive reaction of the winding 12. Hence, the positive part of the drive current signal I1 is continuously supplied to the winding 12. Thus the first power supply circuit 420A supplies the positive part of the drive current signal I1 to the winding 12.

The high-side power transistor 505 of the first power supply circuit 420A is formed of an N-channel FET power transistor, and its source terminal is connected to the winding 12. Hence, the high-side power transistor 505 performs source-follower operation. Therefore, the high-side power transistor 505 supplies the high-frequency switching drive voltage signal V1 to the power supply terminal of the winding 12 in response to the slew-rate switching signal R1 which is produced at the control terminal of the high-side power transistor 505. The high-frequency switching follower operation of the high-side power transistor 505 can be realized even when the low-side power transistor 501 of the first power supply circuit 420A holds its OFF state.

When the change command signal Dh is "L," the current values of the constant current circuits 521 and 522 become small, and the slow slew-rate switching signal R1a is output from the slew-rate circuit 510. Hence, when Dh="L," the high-side power transistor 505 of the first power supply circuit 420A performs high-frequency switching operation responding with the slow slew-rate switching signal R1a, and the terminal voltage V1 becomes a high-frequency switching drive voltage signal which has low slew-rate slopes.

When the change command signal Dh is "H," the current values of the constant current circuits 521 and 522 become large, and the fast slew-rate switching signal R1b is output from the slew-rate circuit 510. Hence, when Dh="H," the high-side power transistor 505 of the first power supply circuit 420A performs high-frequency switching operation responding with the fast slew-rate switching signal R1b, and the terminal voltage V1 becomes a high-frequency switching drive voltage signal which has high slew-rate slopes.

The configurations and operations of the first activation control circuit 410A and the first power supply circuit 420A are described above. The configurations and operations of the second activation control circuit 410B, the second power supply circuit 420B, the third activation control circuit 410C and the third power supply circuit 420C are similar to those described above, and their explanations are omitted.

Each of the activation control circuits 410A, 410B and 410C produces each of the slew-rate switching signals at the control terminal of each of the high-side power transistors. Each of the slew-rate switching signal responds with the single switching pulse signal. Hence, when two high-side power transistors alter current paths to the three-phase windings from the voltage supplying part, the two high-side power transistors execute high-frequency switching operation substantially simultaneously responding with the two slew-rate switching signals which are produced from the single switching pulse signal.

The waveform of the noise eliminating signal Wx is similar to that shown in the part (d) of FIG. 14. The noise eliminating signal Wx becomes "L" during the noise eliminating period Tx from the change timing of the switching pulse signal Wp, and becomes "H" during the rest period except the noise eliminating period. This noise eliminating period Tx is made longer than Tra and Tfa (Tx>Tra, Tx>Tfa). Thus the noise eliminating signal Wx becomes "L" in the noise eliminating periods which include the rising and falling periods of the slow slew-rate switching signal R1a.

This embodiment can also obtain the actions and effects similar to those of the above-mentioned embodiment 1.

Furthermore, in this embodiment, the high-side and low-side power transistors are formed of N-channel FET power transistors. Hence, it is not necessary to use a potential point lower than the potential (the ground potential) of the negative output terminal of the power supplying part, thereby simplifying power supply. Still further, when integrated into an IC, an N-channel FET power transistor can be made smaller and have a lower resistance during its ON period than a P-channel FET power transistor. The size of a chip can thus be made smaller. It is therefore possible to realize a high-performance disk drive apparatus and a high-performance motor at low cost. In addition, this embodiment has various advantages similar to those of the above-mentioned embodiment 1.

Figure 20:
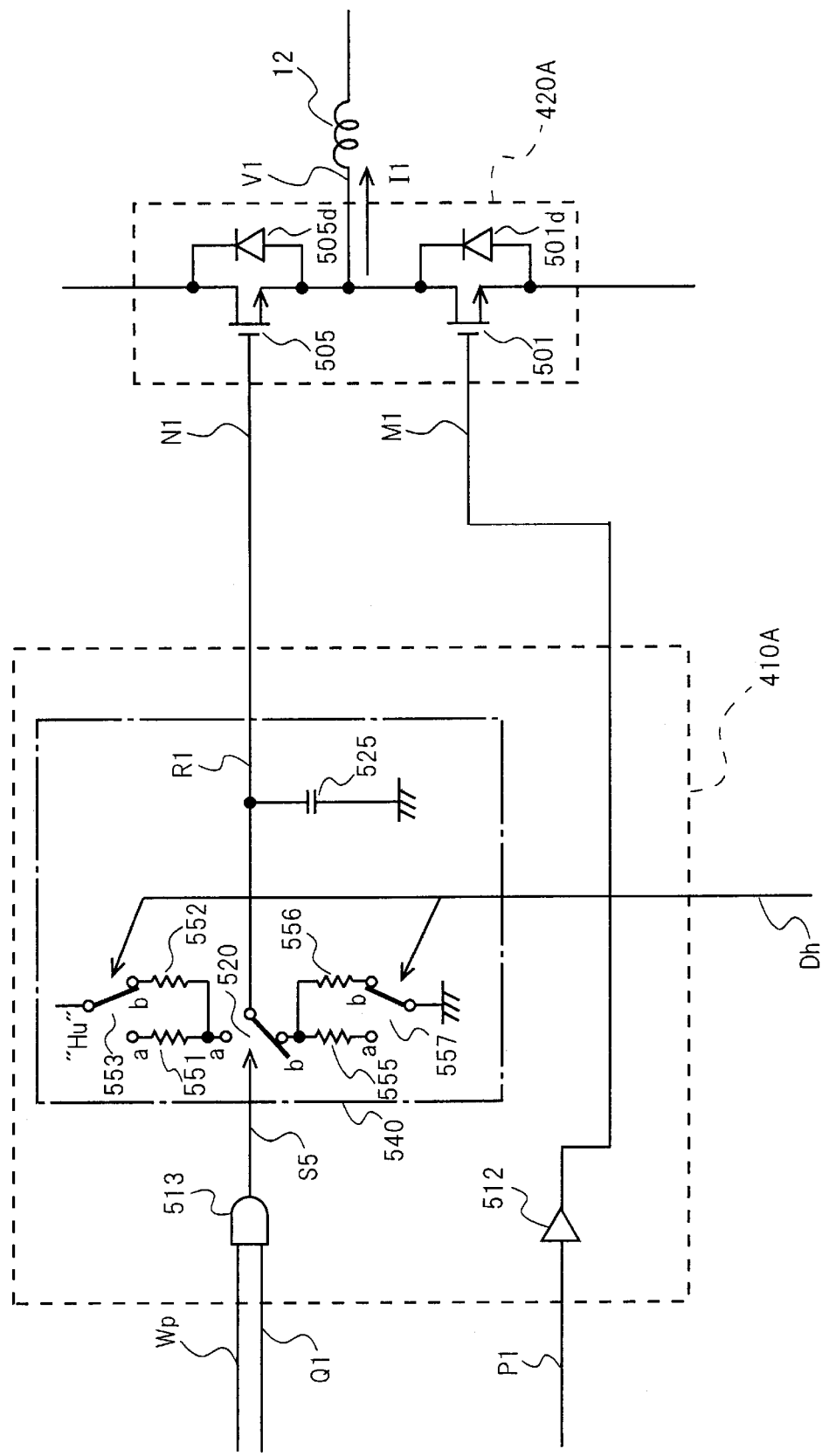
FIG. 20 is a diagram showing another configuration of the first activation control circuit 410A in accordance with the embodiment 2.

In the activation control circuit 410A of FIG. 19, the capacitor is charged and discharged by the charge and discharge circuits having constant current circuits, and the slew-rate switching signal is produced responding with the switching pulse signal at the activation control terminal of the FET power transistor. However, the present invention is not limited to such a case. FIG. 20 shows another configuration of the activation control circuit 410A. The slew-rate circuit 540 of the activation control circuit 410A comprises a capacitor 525, charge resistors 551 and 552, a charge change switch 553, discharge resistors 555 and 556, and a discharge change switch 557. Each of the charge change switch 553 and the discharge change switch 557 makes connection to its contact a or contact b responding with the change command signal Dh. The resistance of the charge resistor 551 is made sufficiently larger than that of the charge resistor 552, and the resistance of the discharge resistor 555 is made sufficiently larger than that of the discharge resistor 556.

When the change command signal Dh is "L," the charge change switch 553 and the discharge change switch 557 make connection to their contacts a, and the capacitor 525 is charged or discharged through the large charge resistor 551 or the large discharge resistor 555. Hence, a slow slew-rate switching signal is produced at the control terminal of the high-side FET power transistor 505. The high-side FET power transistor 505 follows the slow slew-rate switching signal, and performs high-frequency switching operation. Thus the drive voltage signal V1 to the winding 12 has moderate voltage slopes responding with this slow slew-rate switching signal.

When the change command signal Dh is "H," the charge change switch 553 and the discharge change switch 557 make connection to their contacts b, and the capacitor 525 is charged or discharged through the small charge resistor 552 or the small discharge resistor 556. Hence, a fast slew-rate switching signal is produced at the control terminal of the high-side FET power transistor 505. The high-side FET power transistor 505 follows the fast slew-rate switching signal, and performs high-frequency switching operation. Thus the drive voltage signal V1 to the winding 12 has steep voltage slopes responding with this slow slew-rate switching signal.

In addition, in case that the slew-rate switching signal is produced directly at the control terminal of the FET power transistor 505, the input gate capacitance (parasitic capacitance) of the FET power transistor 505 can be used as the capacitor 525. In this case, the capacitor 525 is not necessary, because the input gate capacitance of the FET power transistor 505 is used as the capacitance for the slew-rate circuit.

<<Embodiment 3>>

FIGS. 21 to 27 show a disk drive apparatus including a motor in accordance with embodiment 3 of the present invention, and the motor which is suitable for use in a disk drive apparatus. In this embodiment, the activation operation part and the switching control part in the above-mentioned embodiment 2 are changed, and N-channel FET power transistors are used for the high-side and low-side power transistors. While a high-side power transistor of a phase executes ON-OFF high-frequency switching operation responding with a switching pulse signal, and a low-side power transistor of the same phase executes complementarily auxiliary OFF-ON high-frequency switching operation responding with an auxiliary switching pulse signal. The parts or circuits similar to those of the above-mentioned embodiments 1 and 2 are designated by the same numerals, and their explanations are omitted. In addition, the comprehensive configuration of the disk drive apparatus in accordance with this embodiment is similar to that shown in FIG. 2, and its explanation is omitted.

Figure 21:
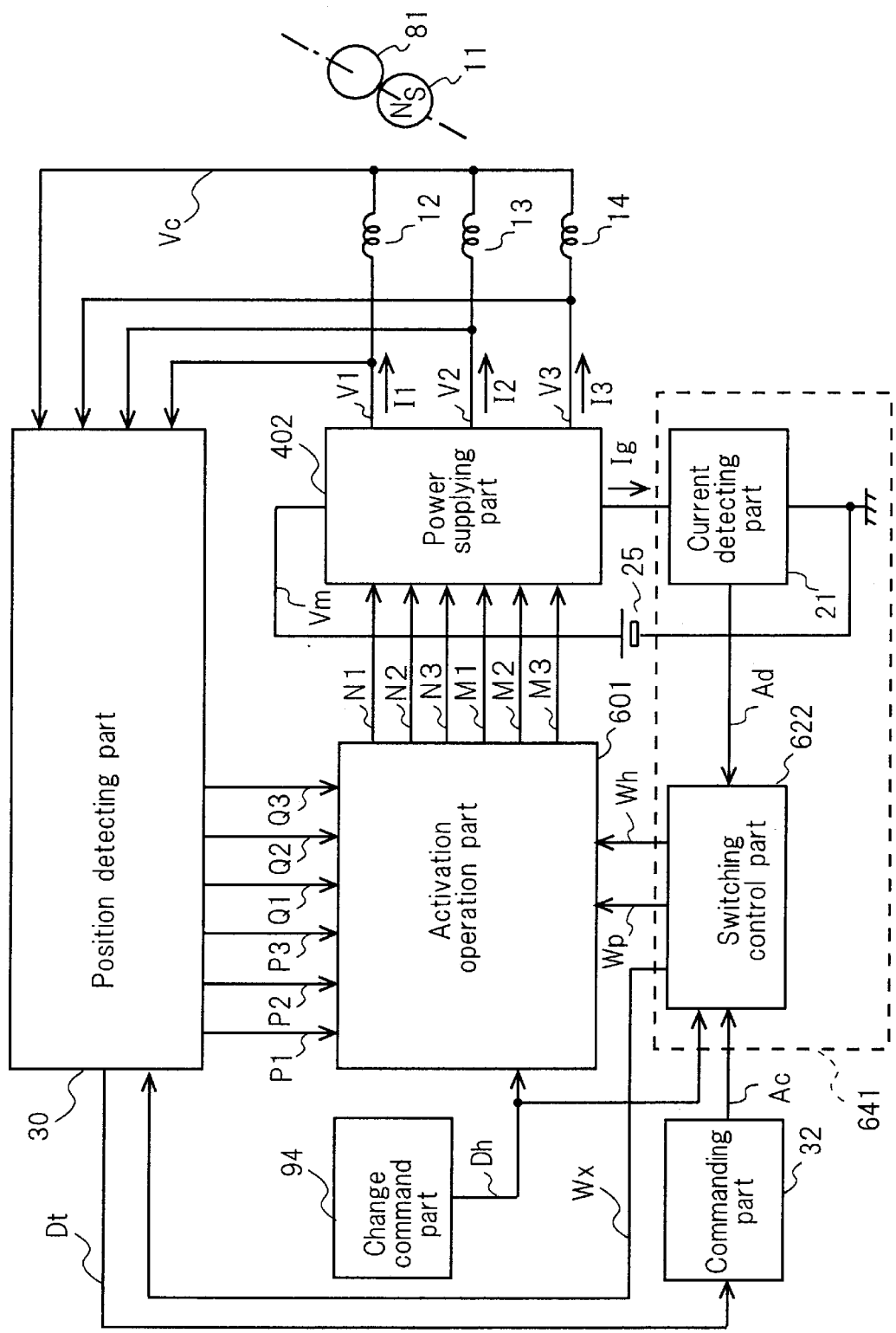
FIG. 21 is a diagram showing a comprehensive configuration of a motor in accordance with embodiment 3 of the present invention.

FIG. 21 shows configurations of the motor actuating block and the motor driving block. The rotor 11 of the motor actuating block which drives the disk 81 provides a field part which generates field fluxes from a number of magnetic poles. The three-phase windings 12, 13 and 14 are disposed on the stator, each displaced from the others by an electrical angle of about 120 degrees with respect to the field part of the rotor 11. The three-phase windings 12, 13 and 14 generate three-phase magnetic fluxes by the three-phase drive current signals I1, I2 and I3, and also generates a drive force by the interaction between the drive current signals and the field part of the rotor 11. The generated drive force drives the rotor 11 and the disk 81.

The power supplying part 402 forms current paths from the voltage supplying part 25 to the three-phase windings 12, 13 and 14 responding with the low-side activation control signals M1, M2 and M3 and the high-side activation control signals N1, N2 and N3 of an activation operation part 601. The power supplying part 402 thus supplies a power to the windings 12, 13 and 14. A configurations of the activation operation part 601 will be described later.

The current detecting part 21 outputs the current detection signal Ad which responds with the conducted current or the composed supply current Ig from the voltage supplying part 25 to the three-phase windings 12, 13 and 14. Since the power transistors of the power supplying part 402 perform ON-OFF high-frequency switching operation, the composed supply current Ig and the current detection signal Ad become pulse signals.

The position detecting part 30 detects the rotational position of the field part of the rotor 11, and produces the low-side position signals P1, P2 and P3, the high-side position signals Q1, Q2 and Q3 and the detected pulse signal Dt in response to the detected position. In this embodiment, the position detecting part 30 detects the three-phase terminal voltages V1, V2 and V3 and the common terminal voltage Vc at the terminals of the three-phase windings 12, 13 and 14, and produces the position signals in accordance with the comparison result of the terminal voltages. A configuration of the position detecting part 30 is similar to that shown in FIG. 4. The position detecting part 30 produces the three-phase low-side position signals P1, P2 and P3 and the three-phase high-side position signals Q1, Q2 and Q3. Each of the three-phase low-side position signals P1, P2 and P3 has an "H" period (active period) larger than the period of 120 electrical degrees. Each of the three-phase high-side position signals Q1, Q2 and Q3 has an "H" period (active period) larger than the period of 120 electrical degrees.

The commanding part 32 comprises a speed control circuit for controlling the rotational speed of the disk 81 and the rotor 11 at a predetermined value. The commanding part 32 detects the rotational speed of the disk 81 and the rotor 11 by using the output pulse signal (the detected pulse signal Dt) of the position detecting part 30. The commanding part 32 produces the command signal Ac which responds with the difference between a detected rotational speed and an aimed speed.

A switching control part 622 compares the current detection signal Ad of the current detecting part 21 with the command signal Ac of the commanding part 32, and produces a switching pulse signal Wp, an auxiliary switching pulse signal Wh and a noise eliminating signal Wx in response to the comparison result. The auxiliary switching pulse signal Wh changes substantially complementarily to the switching pulse signal Wp. The auxiliary switching pulse signal Wh and the switching pulse signal Wp can be produced simultaneously, and the auxiliary switching pulse signal Wh can change in synchronization with the switching pulse signal Wp. Even in this kind of case, it is expressed that the auxiliary switching pulse signal Wh responds with the switching pulse signal Wp.

Figure 25:
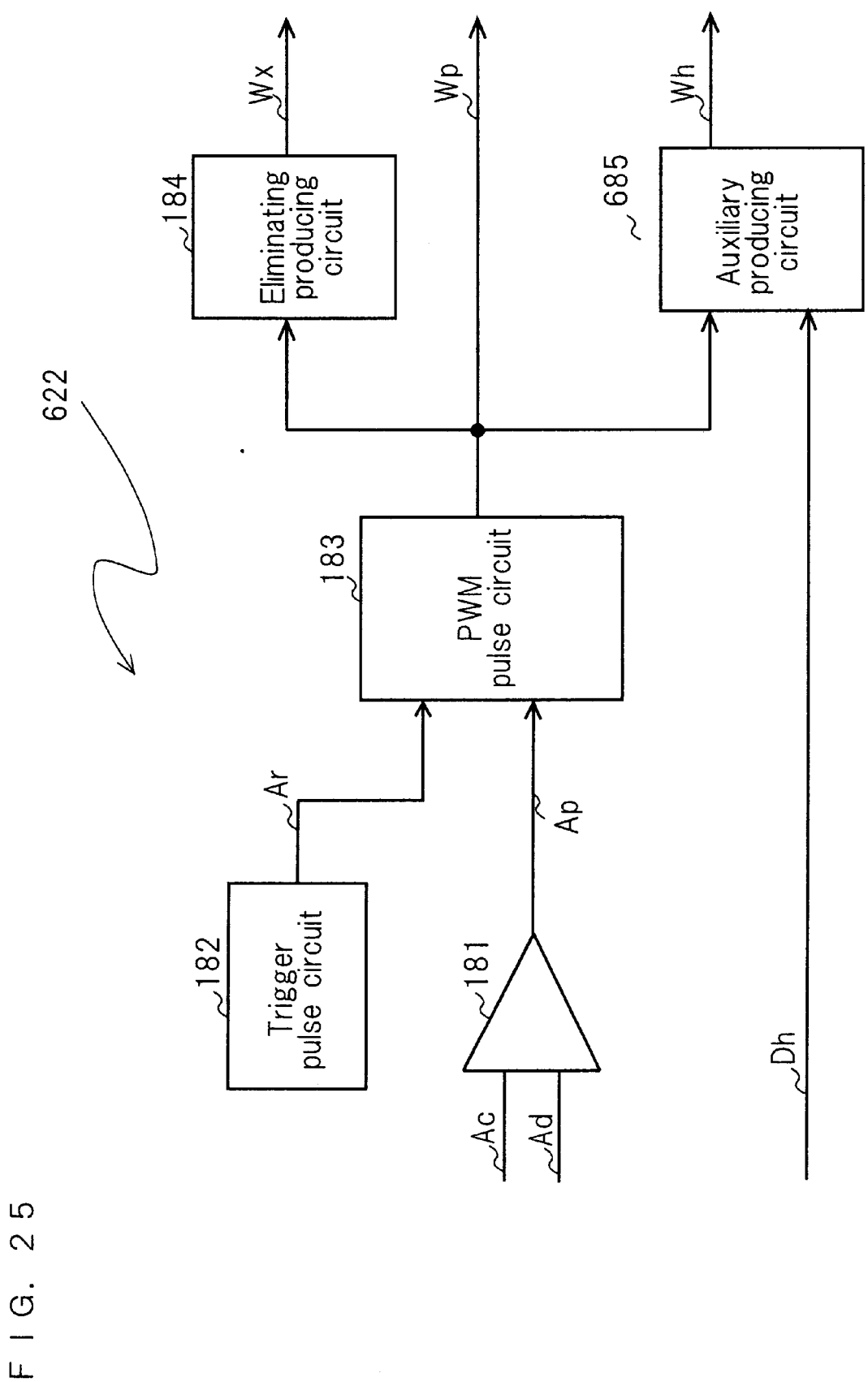
FIG. 25 is a diagram showing a configuration of a switching control part 622 in accordance with the embodiment 3.

An opening time Th is provided between one change edge (rising edge) of the auxiliary switching pulse signal Wh and one change edge (falling edge) of the switching pulse signal Wp. Furthermore, the opening time Th is changed responding with the change command signal Dh of the change command part 94. FIG. 25 shows a configuration of the switching control part 622.

The switching control part of FIG. 25 comprises the compare circuit 181, the trigger pulse circuit 182, the PWM pulse circuit 183, the eliminating producing circuit 184 and an auxiliary producing circuit 685. The compare circuit 181 compares the command signal Ac with the current detection signal Ad and changes its compared signal Ap to "H" when the current detection signal Ad becomes larger than the command signal Ac. The trigger pulse circuit 182 outputs the trigger pulse signal Ar at every predetermined time interval. The trigger pulse signal Ar is a pulse signal that becomes "H" in a predetermined short time.

The PWM pulse circuit 183 includes a flip-flop circuit. The holding state of the flip-flop circuit becomes "H" at the occurrence of the rising edge of the trigger pulse signal Ar and becomes "L" at the occurrence of the rising edge of the compared signal Ap. The switching pulse signal Wp of the PWM pulse circuit 183 changes responding with the holding state of the flip-flop circuit, and thus changes to "H" at the falling edge of the trigger pulse signal Ar and changes to "L" at the rising edge of the compared signal Ap. The eliminating producing circuit 184 comprises a mono-stable circuit triggered by both edges, and outputs the noise eliminating signal Wx that becomes "L" in a predetermined time from the rising and falling edges of the switching pulse signal Wp.

The auxiliary producing circuit 685 produces the auxiliary switching pulse signal Wh which responds with the switching pulse signal Wp. The rising edge of the auxiliary switching pulse signal Wh changes after the opening time Th from the falling edge of the switching pulse signal Wp. Furthermore, the falling edge of the auxiliary switching pulse signal Wh coincides with or nearly coincides with the rising edge of the switching pulse signal Wp. The opening time Th from the falling edge of the switching pulse signal Wp to the rising edge of the auxiliary switching pulse signal Wh is changed responding with the change command signal Dh.

Figure 26:
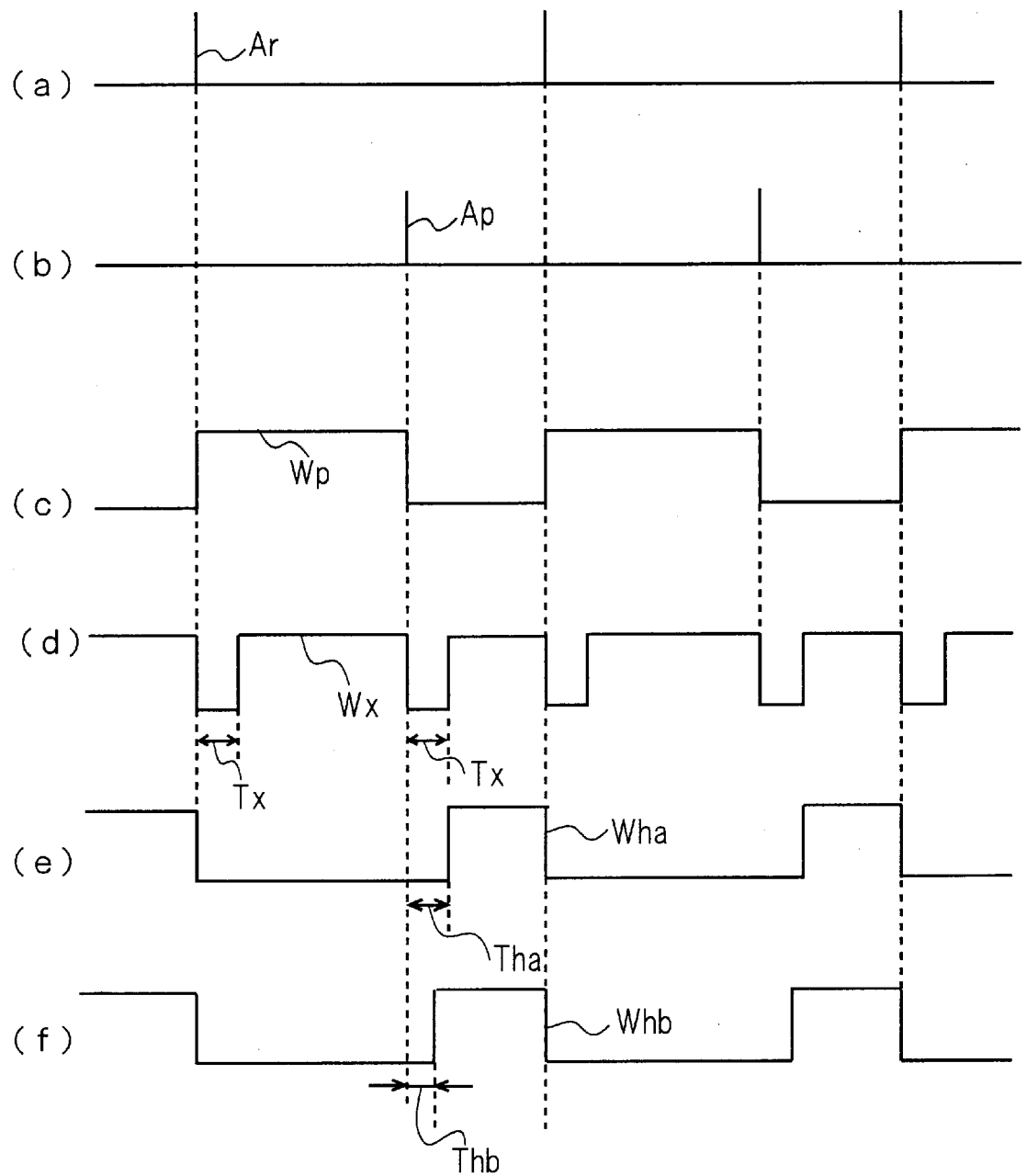
FIG. 26 is a waveform diagram illustrating the operation of the switching control part 622 in accordance with the embodiment 3.

Parts (a) to (f) in FIG. 26 show the relationship among the trigger pulse signal Ar, the compared signal Ap, the switching pulse signal Wp, the noise eliminating signal Wx and the auxiliary switching pulse signal Wh. The switching pulse signal Wp becomes "H" at the rising edge of the trigger pulse signal Ar and becomes "L" at the rising edge of the compared signal Ap. Hence, the switching pulse signal Wp becomes a PWM signal responding with the comparison result between the current detection signal Ad and the command signal Ac (see the parts (a) to (c) of FIG. 26). Furthermore, the noise eliminating signal Wx becomes "L" in the predetermined time Tx from the occurrence of the edges (the rising edge and the falling edge) of the switching pulse signal Wp (see the part (d) of FIG. 26). Still further, when the change command signal Dh is "L," the rising edge of the auxiliary switching pulse signal Wha changes after a long opening time Tha from the falling edge of the switching pulse signal Wp (see the part (e) of FIG. 26). When the change command signal Dh is "H," the rising edge of the auxiliary switching pulse signal Whb changes after a short opening time Thb from the falling edge of the switching pulse signal Wp (see the part (f) in FIG. 26).

Figure 22:
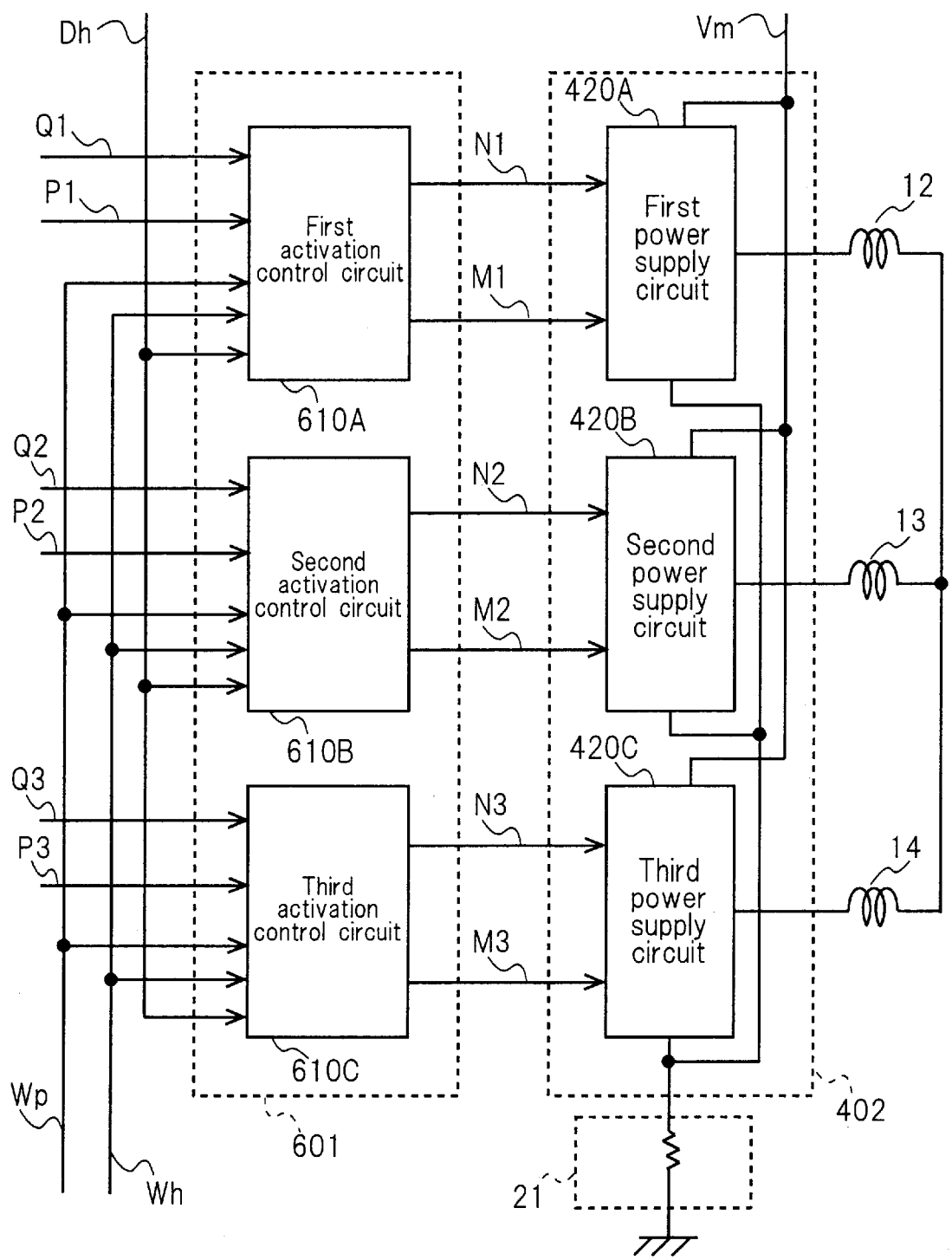
FIG. 22 is a diagram showing configurations of an activation operation part 601 and the power supplying part 402 in accordance with the embodiment 3.

The activation operation part 601 of FIG. 21 produces the high-side activation control signals N1, N2 and N3 responding with the high-side position signals Q1, Q2 and Q3 of the position detecting part 30 and the switching pulse signal Wp of the switching control part 622. The activation operation part 601 of FIG. 21 also produces the low-side activation control signals M1, M2 and M3 responding with the low-side position signals P1, P2 and P3, the high-side position signals Q1, Q2 and Q3, and the auxiliary switching pulse signal Wh. Hence, the active periods of the high-side power transistors and the low-side power transistors of the power supplying part 402 to the windings are determined by the low-side position signals and the high-side position signals. The activation operation part 601 makes each of the high-side activation control signals N1, N2 and N3 a switching pulse signal which responds with the switching pulse signal Wp in the active period of each of the high-side position signals. In addition, the activation operation part 601 makes each of the low-side activation control signals M1, M2 and M3 an ON-OFF signal in the active period of each of the low-side position signals. Furthermore, the activation operation part 601 also makes each of the low-side activation control signals M1, M2 and M3 a switching pulse signal which responds with the auxiliary switching pulse signal Wh in the active period of each of the high-side position signals. FIG. 22 shows specific configurations of the activation operation part 601 and the power supplying part 402.

The activation operation part 601 of FIG. 22 comprises a first activation control circuit 610A, a second activation control circuit 610B and a third activation control circuit 610C. The first activation control circuit 610A receives the low-side position signal P1, the high-side position signals Q1, the switching pulse signal Wp, the auxiliary switching pulse signal Wh and the change command signal Dh and outputs the low-side activation control signal M1 and the high-side activation control signal N1. The second activation control circuit 610B receives the low-side position signal P2, the high-side position signals Q2, the switching pulse signal Wp, the auxiliary switching pulse signal Wh and the change command signal Dh and outputs the low-side activation control signal M2 and the high-side activation control signal N2. The third activation control circuit 610C receives the low-side position signal P3, the high-side position signals Q3, the switching pulse signal Wp, the auxiliary switching pulse signal Wh and the change command signal Dh and outputs the low-side activation control signal M3 and the high-side activation control signal N3.

The power supplying part 402 comprises the first power supply circuit 420A, the second power supply circuit 420B and the third power supply circuit 420C. The first power supply circuit 420A receives the low-side activation control signal M1 and the high-side activation control signal N1 of the first activation control circuit 610A, and carries out activation to the power supply terminal of the winding 12. The second power supply circuit 420B receives the low-side activation control signal M2 and the high-side activation control signal N2 of the second activation control circuit 610B, and carries out activation to the power supply terminal of the winding 13. The third power supply circuit 420C receives the low-side activation control signal M3 and the high-side activation control signal N3 of the third activation control circuit 610C, and carries out activation to the power supply terminal of the winding 14.

Figure 23:
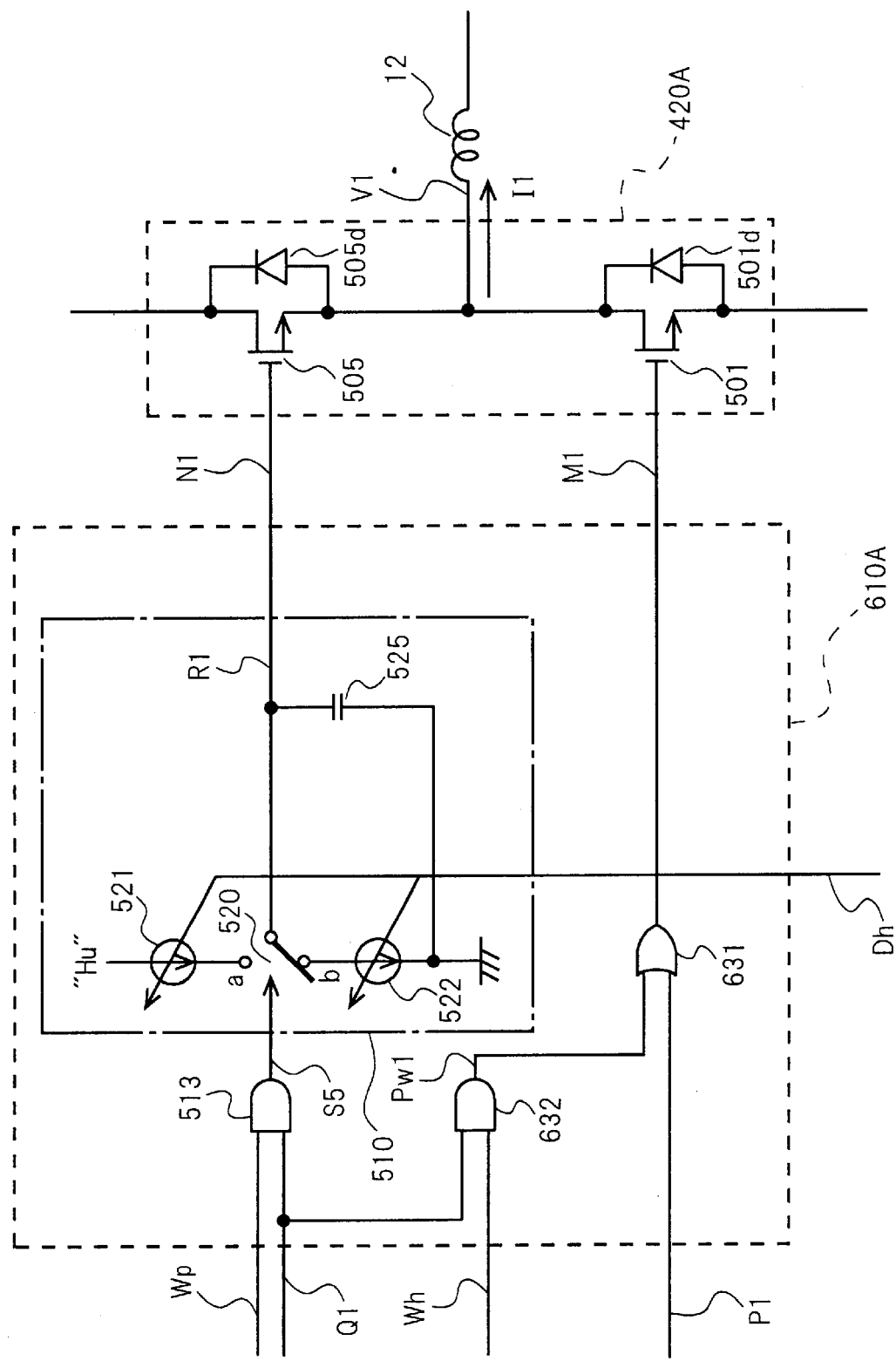
FIG. 23 is a diagram showing configurations of a first activation control circuit 610A and the first power supply circuit 420A in accordance with the embodiment 3.

FIG. 23 shows configurations of the first activation control circuit 610A and the first power supply circuit 420A. The first power supply circuit 420A comprises the low-side power transistor 501, the high-side power transistor 505, the low-side power diode 501d and the high-side power diode 505d. The first power supply circuit 420A supplies the drive voltage signal V1 and the drive current signal I1 to the power supply terminal of the winding 12 responding with the low-side activation control signal M1 and the high-side activation control signal N1. Each of the high-side power transistor 505 and the low-side power transistor 501 is formed of an N-channel FET power transistor. Each of the high-side-power diode 505d and the low-side power diode 501d is formed of a parasitic diode which is reversely connected to the FET power transistor.

The first activation control circuit 610A comprises the slew-rate circuit 510, the AND circuit 513, an AND circuit 632 and an OR circuit 631. The AND circuit 513 executes a logical AND operation of the high-side position signal Q1 and the switching pulse signal Wp, and outputs the switch change signal S5 to the slew-rate circuit 510. The AND circuit 632 executes a logical AND operation of the high-side position signal Q1 and the auxiliary switching pulse signal Wh, and outputs an auxiliary switching activation pulse signal Pw1. The OR circuit 631 executes a logical OR operation of the low-side position signal P1 and the auxiliary switching activation pulse signal Pw1, and outputs the low-side activation control signal M1. The low-side activation control signal M1 is output to the control terminal of the low-side power transistor 501.

The slew-rate circuit 510 comprises the switch circuit 520, the constant current circuits 521, 522 and the capacitor 525. The switch circuit 520 makes connection to its contact a when the switch change signal S5 is "H" and makes connection to its contact b when the switch change signal S5 is "L." When the switch circuit 520 makes connection to its contact a, the capacitor 525 is charged by the output current of the constant current circuit 521, and the terminal voltage rises gradually to the high potential "Hu." When the switch circuit 520 makes connection to its contact b, the capacitor 525 is discharged by the output current of the constant current circuit 522, and the terminal voltage lowers gradually to the ground potential (0 V). As a result, the terminal voltage signal R1 of the capacitor 525 changes responding with the switching pulse signal Wp and becomes a slew-rate switching signal which has voltage slopes at its rising and falling edges. In other words, the slew-rate circuit 510 produces the slew-rate switching signal R1 at the activation control terminal of the high-side power transistor 505, and the high-side power transistor 505 follows the slew-rate switching signal R1. Besides, the slew-rate switching signal is directly produced at the control terminal of the high-side power transistor, and the input capacitance of the high-side power transistor can be used instead of the capacitor 525.

The current values of the constant current circuit 521 and 522 are switched by the change command signal Dh of the change command part 94. As a result, when the change command signal Dh is "L," the slew-rate circuit 510 produces the slow slew-rate switching signal R1*a*. When the change command signal Dh is "H," the slew-rate circuit 510 produces the fast slew-rate switching signal R1*b*.

Figure 27:
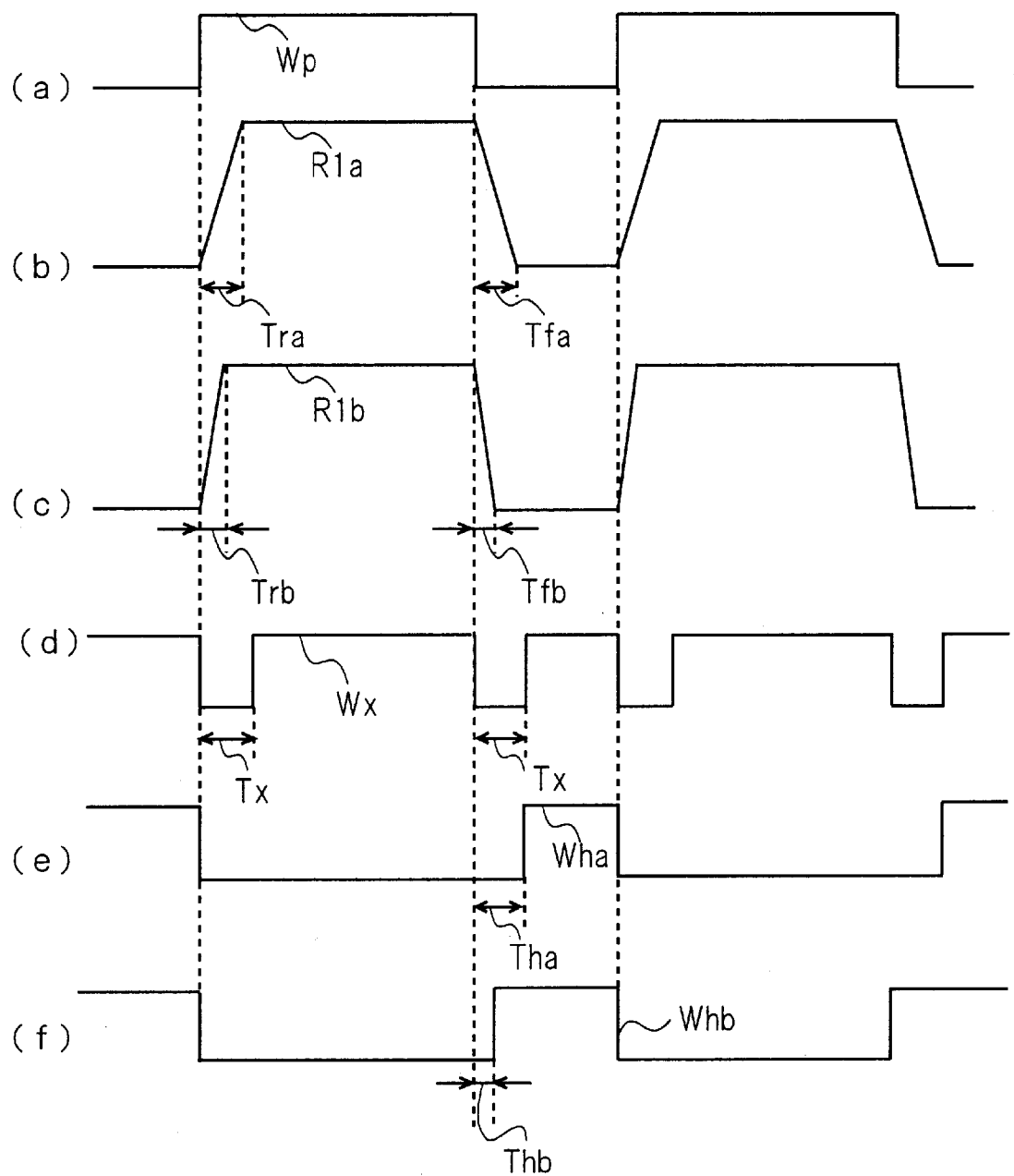
FIG. 27 is a waveform diagram illustrating the relationship among the switching pulse signal Wp, the slow slew-rate switching signal R1*a*, the fast slew-rate switching signal R1*b*, the noise eliminating signal Wx and auxiliary switching pulse signals Wha and Whb in accordance with the embodiment 3.

Parts (a) to (f) in FIG. 27 show the relationship among the switching pulse signal Wp, the slow slew-rate switching signal R1*a*, the fast slew-rate switching signal R1*b* and the auxiliary switching pulse signals Wha and Whb. When the change command signal Dh is "L," the slow slew-rate switching signal R1*a* and the auxiliary switching pulse signal Wha change responding with the single switching pulse signal Wp. The rising time Tra and the falling time Tfa of the slow slew-rate switching signal R1*a* are made long. The opening time Tha from the falling edge of the switching pulse signal Wp to the rising edge of the auxiliary switching pulse signal Wha is made long. In this case, the relationship of Tha>Tfa is established, and thus an OFF period is provided between the effective period (the period except the "L" period) of the slow slew-rate switching signal R1*a* and the effective period ("H" period) of the auxiliary switching pulse signal Wha. In a similar way, when the change command signal Dh is "H," the fast slew-rate switching signal R1*b* and the auxiliary switching pulse signal Whb change responding with the single switching pulse signal Wp. The rising time Trb and the falling time Tfb of the fast slew-rate switching signal R1*b* are made short. The opening time Thb from the falling edge of the switching pulse signal Wp to the rising edge of the auxiliary switching pulse signal Whb is made short. In this case, the relationship of Thb>Tfb is established, and thus an OFF period is provided between the effective period (the period except the "L" period) of the fast slew-rate switching signal R1*b* and the effective period ("H" period) of the auxiliary switching pulse signal Whb.

First, when the low-side position signal P1 is "L" and the high-side position signal Q1 is "L," the switch change signal S5 (the output of the AND circuit 513) is "L," the high-side activation control signal N1 (the output of the slew-rate circuit 510) is the ground potential (0 V), and then the high-side power transistor 505 of the first power supply circuit 420A is OFF. The output signal of the AND circuit 632 is "L," the low-side activation control signal M1 (the output of the OR circuit 631) is "L," and thus the low-side power transistor 501 of the first power supply circuit 420A is OFF. As a result, in the case of P1="L" and Q1="L," the first power supply circuit 420A does not supply a power to the power supply terminal of the winding 12.

Since the rotor 11 rotates by the generated drive force, the low-side position signal P1 becomes "H" and the high-side position signal Q1 is still "L." The low-side activation control signal M1 (the output of the OR circuit 631) becomes "H", whereby the low-side power transistor 501 of the first power supply circuit 420A turns ON. The switch change signal S5 of the AND circuit 513 is "L," and the high-side activation control signal N1 (the output of the slew-rate circuit 510) is the ground potential (0 V), whereby the high-side power transistor 505 of the first power supply circuit 420A is OFF. As a result, in the case of P1="H" and Q1="L," the first power supply circuit 420A supplies the negative part of the drive current signal I1 to the winding 12.

Since the rotor 11 rotates by the generated drive force, the low-side position signal P1 becomes "L" and the high-side position signal Q1 becomes "L." The high-side activation control signal N1 becomes the ground potential, and the low-side activation control signal M1 is "L." Hence, the high-side power transistor 505 and the low-side power transistor 501 are OFF. In other words, the first power supply circuit 420A does not supply a power to the winding 12.

Since the rotor 11 rotates by the generated drive force, the low-side position signal P1 is "L" and the high-side position signal Q1 becomes "H." The switch change signal S5 (the output of the AND circuit 513) coincides with the switching pulse signal Wp and becomes a high-frequency switching signal. The switch circuit 520 of the slew-rate circuit 510 is switched responding with the switching pulse signal Wp and produces the slew-rate switching signal R1 to the terminal of the capacitor 525. Hence, the high-side activation control signal N1 becomes the slew-rate switching signal of the slew-rate circuit 510, and the high-side power transistor 505 perform high-frequency switching operation responding with the slew-rate switching signal R1. Since the auxiliary switching activation pulse signal Pw1 (the output of the AND circuit 632) coincides with the auxiliary switching pulse signal Wh, the low-side activation control signal M1 (the output of the OR circuit 631) coincides with the auxiliary switching pulse signal Wh. Hence, the low-side power transistor 501 of the first power supply circuit 420A performs auxiliary high-frequency switching operation responding with the auxiliary switching pulse signal Wh. As a result, in the case of P1="L" and Q1="H," the high-side power transistor 505 performs high-frequency switching operation responding with the slew-rate switching signal R1 of the slew-rate circuit 510. Furthermore, the low-side power transistor 501 performs auxiliary high-frequency switching operation responding with the auxiliary switching pulse signal Wh. In other words, the low-side power transistor 501 or the low-side power diode 501*d* is activated during the OFF time of the high-side power transistor 505, thereby supplying continuously the positive part of the drive current signal I1 to the winding 12. Thus the first power supply circuit 420A supplies the positive part of the drive current signal I1 to the winding 12.

The high-side power transistor 505 of the power supply circuit 420A is formed of an N-channel FET power transistor, and its source terminal is connected to the power supply terminal of the winding 12. Hence, the high-side power transistor 505 performs source-follower operation. Therefore, the high-side power transistor 505 supplies the high-frequency drive voltage signal V1 to the power supply terminal to the winding 12 responding with the slew-rate switching signal R1 (the high-side activation control signal N1) at the control terminal of the power transistor. Thus the high-frequency drive voltage signal V1 has a slew-rate which is equal to that of the slew-rate switching signal. Furthermore, the low-side power transistor 501 is formed of an N-channel FET power transistor, and its drain terminal is connected to the power supply terminal of the winding 12. The high-side power transistor 505 performs ON-OFF high-frequency switching operation responding with the slew-rate switching signal R1 produced at the activation control terminal thereof. The low-side power transistor 501 performs complementarily auxiliary OFF-ON high-frequency switching operation responding with the auxiliary switching pulse signal Wh. Each of the high-side power transistor 505 and the low-side power transistor 501 has an OFF time, during which both power transistors becomes OFF, whereby these power transistors are prevented from becoming ON simultaneously.

When the change command signal Dh is "L," the current values of the constant current circuits 521 and 522 become small, and the slow slew-rate switching signal R1*a* is output from the slew-rate circuit 510. Hence, the high-side power transistor 505 of the first power supply circuit 420A performs high-frequency switching operation by following the slow slew-rate switching signal R1*a*. The terminal voltage V1 becomes a high-frequency switching drive voltage signal with a low slew rate. Furthermore, the rising edge of the auxiliary switching pulse signal Wha occurs after a delay of the opening time Tha from the falling edge of the single switching pulse signal Wp. The rising edge of the switching pulse signal Wp coincides with or nearly coincides with the falling edge of the auxiliary switching pulse signal Wha. As a result, the low-side power transistor 501 becomes OFF certainly during the ON period (effective period) of the high-side power transistor 505 that follows the slow slew-rate switching signal R1a. In other words, the high-side power transistor 505 and the low-side power transistor 501 are prevented from turning ON simultaneously.

When the change command signal Dh is "H," the current values of the constant current circuits 521 and 522 become large, and the slew-rate circuit 510 produces the fast slew-rate switching signal R1b. Hence, the high-side power transistor 505 of the first power supply circuit 420A performs high-frequency switching operation by following the fast slew-rate switching signal R1b. The terminal voltage V1 becomes a high-frequency switching drive voltage signal with a high slew rate. Furthermore, the rising edge of the auxiliary switching pulse signal Whb occurs after a delay of the opening time Thb from the falling edge of the single switching pulse signal Wp. The rising edge of the switching pulse signal Wp coincides with or nearly coincides with the falling edge of the auxiliary switching pulse signal Whb. As a result, the low-side power transistor 501 becomes OFF surely during the ON period (effective period) of the high-side power transistor 505 that follows the fast slew-rate switching signal R1b. In other words, the high-side power transistor 505 and the low-side power transistor 501 are prevented from turning ON simultaneously. Still further, immediately after the high-side power transistor 505 is turned OFF, the low-side power transistor 501 is turned ON, thereby reducing a power loss due to the low-side power diode 501d.

In addition, the waveform of the noise eliminating signal Wx is shown in the part (d) of FIG. 26. The noise eliminating signal Wx has a noise eliminating period Tx in which the signal becomes "L" from the change timing of the switching pulse signal Wp. This noise eliminating period Tx is made longer than Tra and Tfa (Tx>Tra, Tx>Tfa). The noise eliminating signal Wx becomes "L" in the noise eliminating period including the rising and falling periods of the slow slew-rate switching signal R1a. The noise eliminating period Tx can be changed responding with the state of the change command signal Dh.

The configurations and operations of the first activation control circuit 610A and the first power supply circuit 420A are described above. The configurations and operations of the second activation control circuit 610B, the third activation control circuit 610C, the second power supply circuit 420B, the third power supply circuit 420C are similar to those described above. The slew-rate circuit of the first activation control circuit produces the slew-rate switching signal at the control terminal of the high-side power transistor of the power supplying part, and causes the high-side power transistor to follow the slew-rate switching signal. Furthermore, each of the activation control circuits 610A, 610B and 610C produces each of the slew-rate switching signals responding with the single switching pulse signal. As a result, when two high-side power transistors alter current paths to the three-phase windings, the two high-side power transistors execute high-frequency switching operation substantially simultaneously responding with two slew-rate switching signals.

This embodiment can also obtain the actions and effects similar to those of the above-mentioned embodiment 1 or embodiment 2.

In this embodiment, the three high-side and three low-side power transistors are formed of N-channel FET power transistors. Hence, it is not necessary to use a potential point lower than the potential at the negative output terminal of the power supplying part, thereby simplifying power supply. Furthermore, when integrated into an IC, an N-channel FET power transistor can be made smaller and have a lower ON resistance than a P-channel FET power transistor, the size of a chip can be made smaller. Still further, while a high-side power transistor of a phase is subjected to ON-OFF high-frequency switching operation responding with the slew-rate switching signal, a low-side power transistor of the same phase is subjected to complementarily auxiliary OFF-ON high-frequency switching operation responding with the auxiliary switching pulse signal. This reduces a power loss at the low-side power diodes. In addition, when two high-side power transistors alter current paths to the three-phase windings, two slew-rate switching signals are produced at the control terminals of the two high-side power transistors, respectively, responding with the single switching pulse signal. The two high-side power transistors are subjected to high-frequency switching operation substantially simultaneously by following the slew-rate switching signals. Hence, the two low-side power transistors corresponding to the two high-side power transistors should only be subjected to auxiliary OFF-ON switching operation substantially simultaneously responding with the single auxiliary switching pulse signal. Thus the switching operation can thus be realized by a simple configuration. As a result, a high-performance disk drive apparatus with a low power consumption and a low bit error of the reproducing signal from a high-density disk can be realized at low cost.

In addition, this embodiment has various advantages similar to those of the above-mentioned embodiment 1 and embodiment 2.

Figure 24:
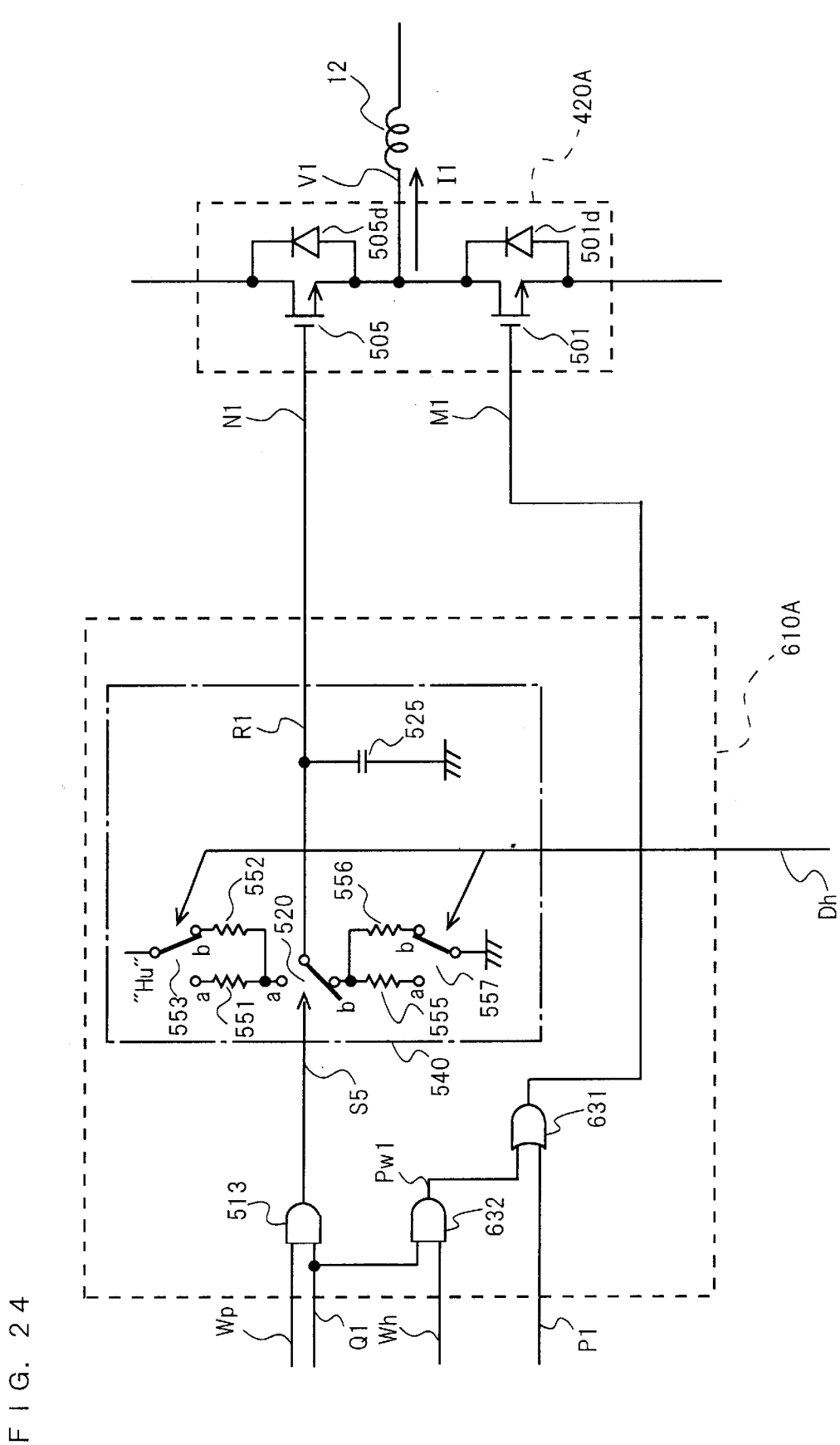
FIG. 24 is a diagram showing another configuration of the first activation control circuit 610A in accordance with the embodiment 3.

In the activation control circuit 610A of FIG. 23, the capacitor is charged and discharged by the charge and discharge circuits having constant current circuits, and the slew-rate switching signal is produced responding with the switching pulse signal at the control terminal of the FET power transistor. However, the present invention is not limited to such a case. FIG. 24 shows another configuration of the activation control circuit 610A. The slew-rate circuit 540 of the activation control circuit 610A comprises the charge resistors 551 and 552, the charge change switch 553, the discharge resistors 555 and 556, and the discharge change switch 557. Each of the charge change switch 553 and the discharge change switch 557 makes connection to its contact a or contact b responding with the change command signal Dh. The resistance of the charge resistor 551 is made sufficiently larger than that of the charge resistor 552, and the resistance of the charge resistor 555 is made sufficiently larger than that of the charge resistor 556. When the change command signal Dh is "L," the charge change switch 553 and the discharge change switch 557 make connection to their contacts a, and the capacitor 525 is charged or discharged through the large charge resistor 551 or the large discharge resistor 555. Hence, a slow slew-rate switching signal is produced at the control terminal of the high-side FET power transistor 505. The high-side FET power transistor 505 performs high-frequency switching operation having moderate voltage slopes responding with this slow slew-rate switching signal. When the change command signal Dh is "H," the charge change switch 553 and the discharge change switch 557 make connection to their contacts b, and the capacitor 525 is charged or discharged through the small charge resistor 552 or the small discharge resistor 556. Hence, a fast slew-rate switching signal is produced at the control terminal of the high-side FET power transistor 505. The high-side FET power transistor 505 performs high-frequency switching operation having steep voltage slopes responding with this fast slew-rate switching signal.

The whole operation of the disk drive apparatus using the activation control circuit 610A of FIG. 24 is same as that described above, and is omitted. Besides, the capacitor 525 of the slew-rate circuit 540 can be replaced by the input parasitic capacitance of the high-side power transistor 505.

In the embodiment 3 of the present invention, the activation operation part produces at least a slew-rate switching signal which responds with at least a switching pulse signal at a control terminal side of at least one high-side NMOS-FET power transistor among the Q high-side NMOS-FET power transistors (Q is an integer of 3 or more), each of which forms a current path between the positive output terminal side of the voltage supplying part and one of the Q-phase windings. The at least a slew-rate switching signal has a smoothed voltage slope in at least one of rising and falling slopes. The activation operation part causes the at least one high-side NMOS-FET power transistor to perform ON-OFF high-frequency switching responding with the at least a slew-rate switching signal. The activation operation part also produces at least an auxiliary switching pulse signal which responds with the at least a switching pulse signal at a control terminal side of at least one low-side NMOS-FET power transistor among the Q low-side NMOS-FET power transistors, each of which forms a current path between the negative output terminal side of the voltage supplying part and one of the Q-phase windings. The at least an auxiliary switching pulse signal is substantially complementary to the at least a slew-rate switching signal. The activation operation part causes the at least one low-side NMOS-FET power transistor to perform auxiliary OFF-ON high-frequency switching responding with the at least an auxiliary switching pulse signal. The activation operation part causes another low-side NMOS-FET power transistor among the Q low-side NMOS-FET power transistors to perform ON operation without high-frequency switching. Then the activation operation part controls the operation to supply a high-frequency switching drive voltage signal to one terminal of the Q-phase windings, the high-frequency switching drive voltage signal having smoothed voltage slopes and responding with the at least a slew-rate switching signal and the at least an auxiliary switching pulse signal, and to supply substantially the negative potential of the voltage supplying part to another terminal of the Q-phase windings. As a result, the disk drive apparatus and the motor remarkably reduce power losses of the high-side and low-side NMOS-FET power transistors, and remarkably reduce high-frequency switching noise due to the high-frequency switching operation of the high-side and low-side NMOS-FET power transistors.

Further, in the embodiment 3 of the present invention, when two of the Q high-side NMOS-FET power transistors alter current paths to the Q-phase windings (Q is an integer of 3 or more), the activation operation part produces two slew-rate switching signals at control terminal sides of the two of the Q high-side NMOS-FET power transistors, each of which forms a current path between the positive output terminal side of the voltage supplying part and one of the Q-phase windings. Each of the two slew-rate switching signals has a smoothed voltage slope in at least one of rising and falling slopes. The activation operation part causes the two of the Q high-side NMOS-FET power transistors to perform ON-OFF high-frequency switching responding with the two slew-rate switching signals, respectively. The activation operation part produces two auxiliary switching pulse signals at control terminal sides of two of the Q low-side NMOS-FET power transistors, each of which forms a current path between the negative output terminal side of the voltage supplying part and one of the Q-phase windings. Each of the two auxiliary switching pulse signals is substantially complementary to each of the two slew-rate switching signals. The activation operation part causes the two of the Q low-side NMOS-FET power transistors to perform auxiliary OFF-ON high-frequency switching responding with the two auxiliary switching pulse signals, respectively. The activation operation part causes another (the other) low-side NMOS-FET power transistor among the Q low-side NMOS-FET power transistors to perform ON operation without high-frequency switching. Then the activation operation part controls the operation to supply two high-frequency switching drive voltage signals to two terminals of the Q-phase windings, each of the high-frequency switching drive voltage signals having smoothed voltage slopes and responding with each of the two slew-rate switching signals and each of the two auxiliary switching pulse signals, and to supply substantially the negative potential of the voltage supplying part to another (the other) terminal of the Q-phase windings. As a result, the disk drive apparatus and the motor remarkably reduce power losses of the high-side and low-side NMOS-FET power transistors, remarkably reduce high-frequency switching noise due to the high-frequency switching operation of the high-side and low-side NMOS-FET power transistors, and remarkably reduce vibration and acoustic noise. Besides, it is preferable to produce the two slew-rate switching signals and the two auxiliary switching pulse signals responding with the single switching pulse signal because of the simple configuration, but the invention is not limited to such a case. Each of the two slew-rate switching signals and each of the two auxiliary switching pulse signals can be produced responding with each of two independent switching pulse signals.

Therefore, a disk drive apparatus with a low power consumption, low bit errors of a reproducing signal, a low vibration and a low acoustic noise can be realized by a simple configuration.

<<Embodiment 4>>

FIGS. 28 to 31 show a disk drive apparatus including a motor in accordance with embodiment 4 of the present invention, and a motor which is suitable for use in a disk drive apparatus. In this embodiment, the activation operation part in the above-mentioned embodiment 3 is changed. In addition, a single slew-rate switching signal responding with a single switching pulse signal is produced and supplied to the control terminals of one or two of the high-side FET power transistors responding with the position signals. The parts or circuits similar to those of the above-mentioned embodiments 1, 2 and 3 are designated by the same numerals, and their explanations are omitted. Furthermore, the comprehensive configuration of the disk drive apparatus in accordance with this embodiment is similar to that shown in FIG. 2, and its explanation is omitted.

Figure 28:
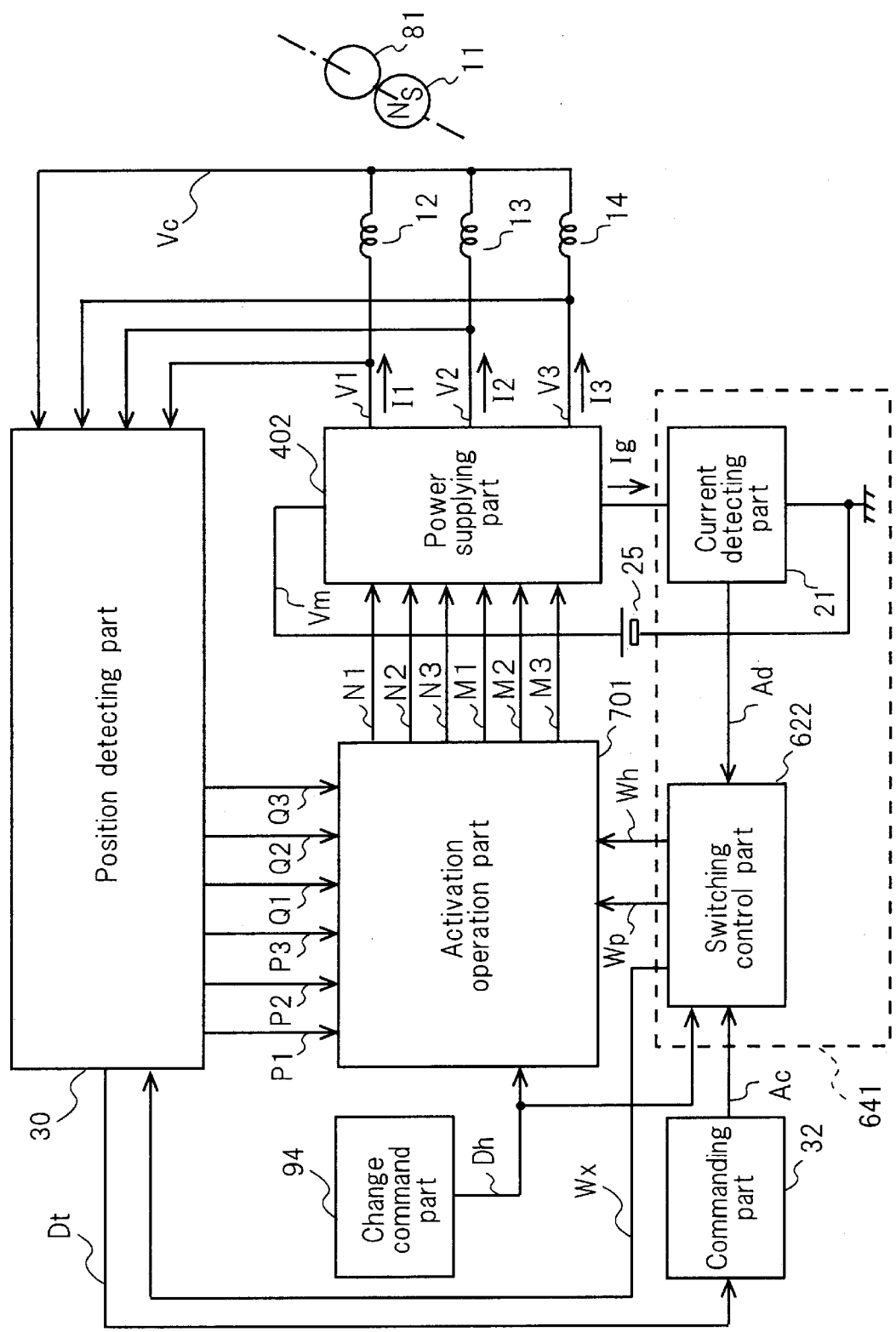
FIG. 28 is a diagram showing a comprehensive configuration of a motor in accordance with embodiment 4 of the present invention.

FIG. 28 shows configurations of the motor actuating block and the motor driving block. The rotor 11 of the motor actuating block which drives the disk 81 provides a field part which generates field fluxes from a number of magnetic poles. The three-phase windings 12, 13 and 14 are disposed on the stator, each displaced from the others by an electrical angle of about 120 degrees with respect to the field part of the rotor 11. The three-phase windings 12, 13 and 14 generate three-phase magnetic fluxes by the three-phase drive current signals I1, I2 and I3, and also generate a drive force by the interaction between the drive current signals and the field part of the rotor 11. The generated drive force drives the rotor 11 and the disk 81.

The power supplying part 402 forms current paths from the voltage supplying part 25 to the three-phase windings 12, 13 and 14 in response to the three-phase low-side activation control signals M1, M2 and M3 and the three-phase high-side activation control signals N1, N2 and N3 of an activation operation part 701. The power supplying part 402 supplies a power to the windings 12, 13 and 14. A configurations of the activation operation part 701 will be described later.

The current detecting part 21 outputs the current detection signal Ad which is proportional to the composed supply current Ig to the three-phase windings 12, 13 and 14 from the voltage supplying part 25.

The position detecting part 30 detects the rotational position of the field part of the rotor 11, and produces the low-side position signals P1, P2 and P3, the high-side position signals Q1, Q2 and Q3 and the detected pulse signal Dt in response to the detection position. A configuration of the position detecting part 30 is similar to that shown in FIG. 4. The position detecting part 30 produces the three-phase low-side position signals P1, P2 and P3 and the three-phase high-side position signals Q1, Q2 and Q3. Each of the three-phase low-side position signals P1, P2 and P3 has an "H" period larger than the period of 120 electrical degrees, and each of the three-phase high-side position signals Q1, Q2 and Q3 has an "H" period larger than the period 120 of electrical degrees.

The commanding part 32 detects the rotational speed of the disk 81 and the rotor 11 by using the detected pulse signal Dt of the position detecting part 30, and produces the command signal Ac responding with the difference between a detected rotational speed and an aimed speed.

The switching control part 622 compares the current detection signal Ad of the current detecting part 21 with the command signal Ac of the commanding part 32, and produces the single switching pulse signal Wp responding with the comparison result. In addition, the switching control part 622 produces the auxiliary switching pulse signal Wh responding with the single switching pulse signal Wp. The configuration of the switching control part 622 is similar to that shown in FIG. 25. The relationship among the trigger pulse signal Ar, the compared signal Ap, the switching pulse signal Wp, the noise eliminating signal Wx and the auxiliary switching pulse signal Wh are similar to that shown in the parts (a) to (f) of FIG. 26.

Figure 29:
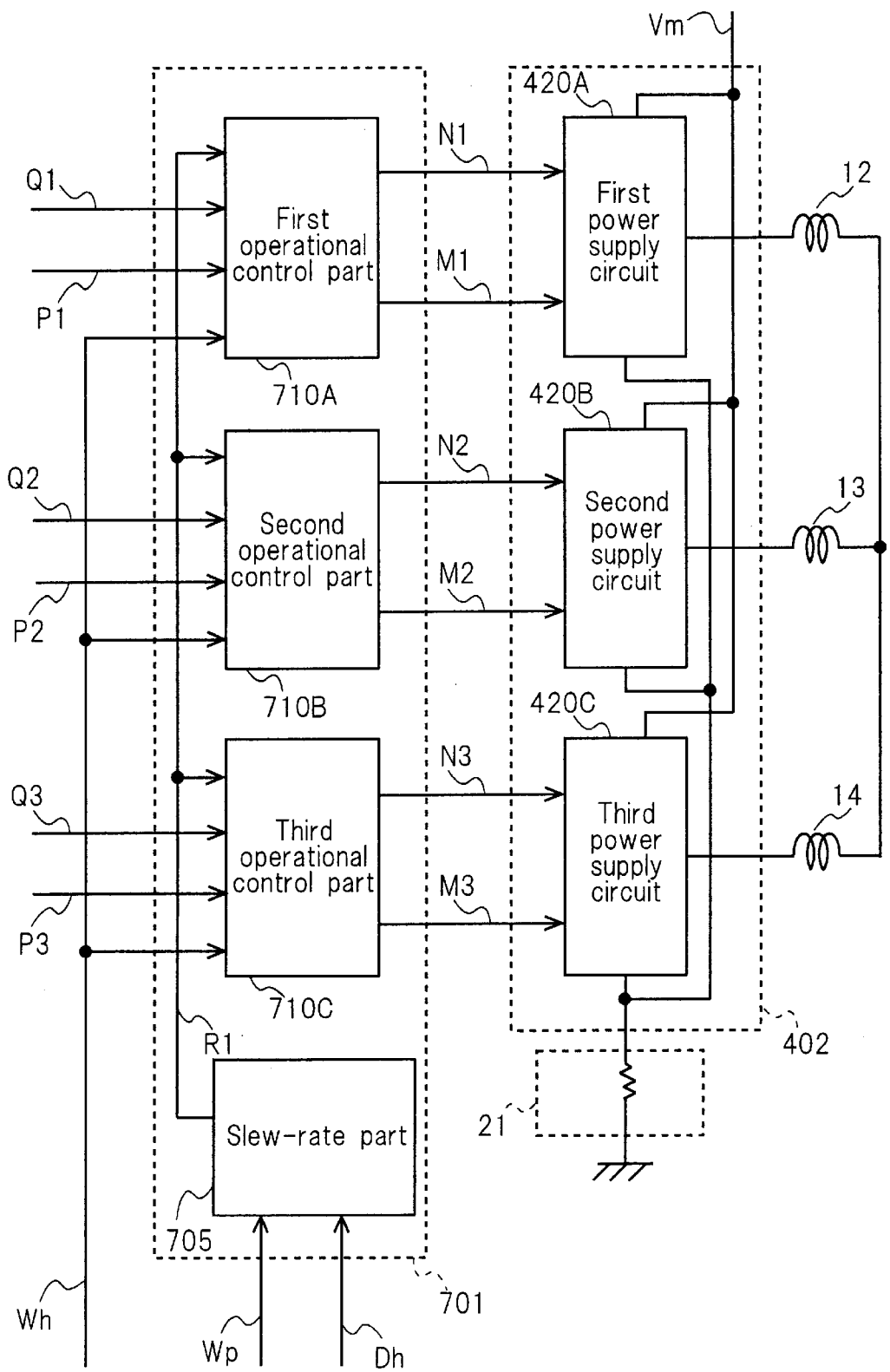
FIG. 29 is a diagram showing configurations of an activation operation part 701 and the power supplying part 402 in accordance with the embodiment 4.

The activation operation part 701 of FIG. 28 outputs the three-phase low-side activation control signals M1, M2 and M3 and the three-phase high-side activation control signals N1, N2 and N3 responding with the three-phase low-side position signals P1, P2 and P3 and the three-phase high-side position signals Q1, Q2 and Q3 of the position detecting part 30 and the switching pulse signal Wp and the auxiliary switching pulse signal Wh of the switching control part 622. The activation operation part 701 makes the high-side activation control signals N1, N2 and N3 switching pulse signals responding with the switching pulse signal Wp in the active periods of the high-side position signals. In addition, the activation operation part 701 makes the low-side activation control signals M1, M2 and M3 ON-OFF signals in the active periods of the high-side position signals. Furthermore, the activation operation part 701 makes the low-side activation control signals M1, M2 and M3 switching pulse signals responding with the auxiliary switching pulse signal Wh in the active periods of the high-side position signals. FIG. 29 shows a configuration of the activation operation part 701.

The activation operation part 701 of FIG. 29 comprises a slew-rate part 705, a first activation control part 710A, a second activation control part 710B and a third activation control part 710C. The slew-rate part 705 receives the switching pulse signal Wp and the change command signal Dh and outputs the slew-rate switching signal R1 responding with the switching pulse signal Wp. The slew rate of the slew-rate switching signal R1 is changed in response to the change command signal Dh. The first activation control part 710A receives the slew-rate switching signal R1, the low-side position signal P1, the high-side position signal Q1 and the auxiliary switching pulse signal Wh, and outputs the low-side activation control signal M1 and the high-side activation control signal N1. The second activation control part 710B receives the slew-rate switching signal R1, the low-side position signal P2, the high-side position signal Q2 and the auxiliary switching pulse signal Wh, and outputs the low-side activation control signal M2 and the high-side activation control signal N2. The third activation control part 710C receives the slew-rate switching signal R1, the low-side position signal P3, the high-side position signal Q3 and the auxiliary switching pulse signal Wh, and outputs the low-side activation control signal M3 and the high-side activation control signal N3.

The power supplying part 402 comprises the first power supply circuit 420A, the second power supply circuit 420B and the third power supply circuit 420C. The first power supply circuit 420A receives the low-side activation control signal M1 and the high-side activation control signal N1 of the first activation control part 710A, and carries out activation to the power supply terminal of the winding 12. The second power supply circuit 420B receives the low-side activation control signal M2 and the high-side activation control signal N2 of the second activation control part 710B, and carries out activation to the power supply terminal of the winding 13. The third power supply circuit 420C receives the low-side activation control signal M3 and the high-side activation control signal N3 of the third activation control part 710C, and carries out activation to the power supply terminal of the winding 14.

Figure 30:
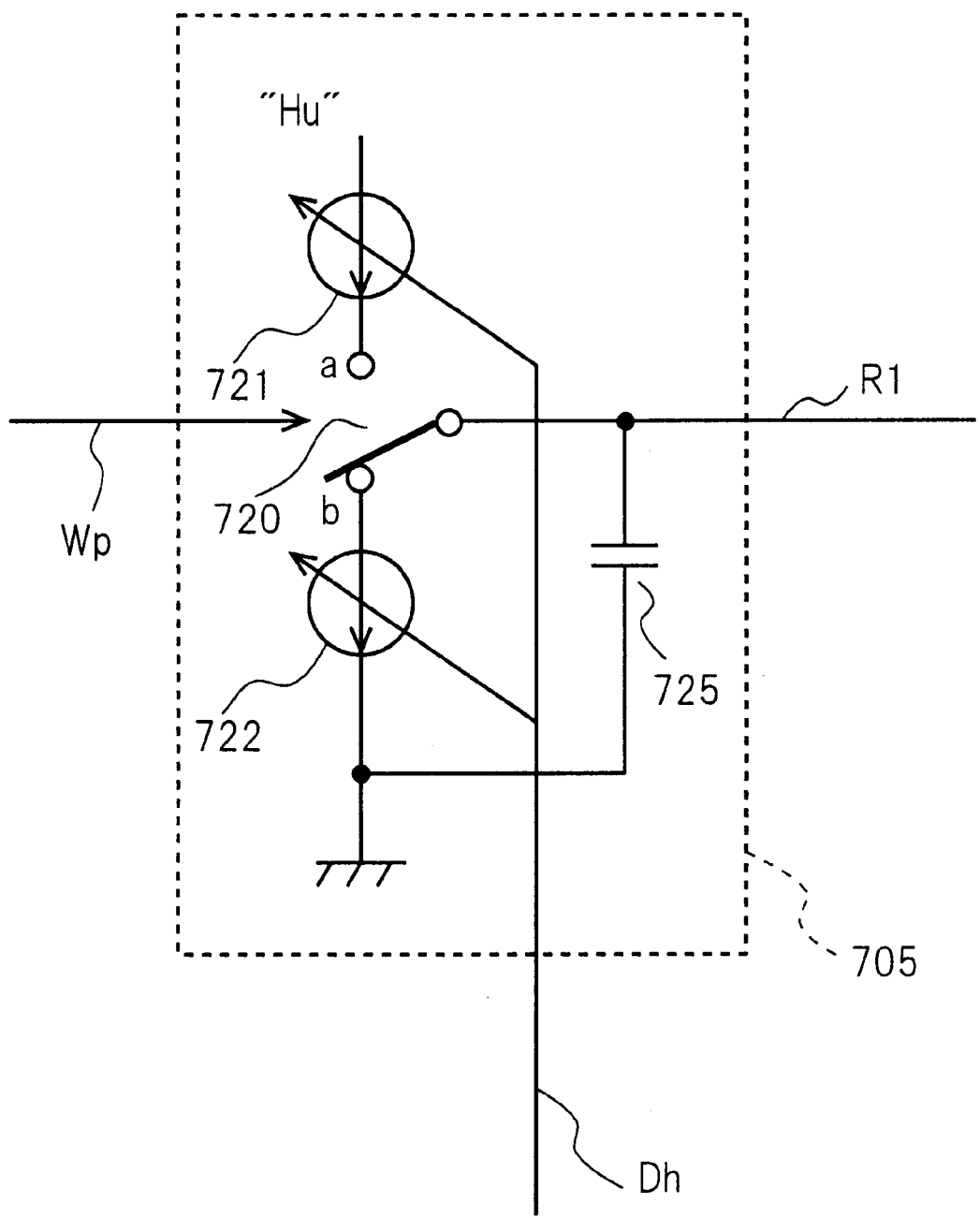
FIG. 30 is a diagram showing a configuration of a slew-rate part 705 in accordance with the embodiment 4.

FIG. 30 shows a configuration of the slew-rate part 705. The slew-rate part 705 comprises a switch circuit 720, constant current circuits 721, 722 and a capacitor 725. The switch circuit 720 makes connection to its contact a when the switching pulse signal Wp is "H," and makes connection to its contact b when the switching pulse signal Wp is "L." The constant current circuit 721, the current of which flows from the high-potential point "Hu," is connected to the contact a of the switch circuit 720. The constant current circuit 722, the current of which flows into the ground potential point (0 V), is connected to the contact b of the switch circuit 720. The capacitor 525 is connected to the output point of the switch circuit 720. When the switch circuit 720 makes connection to its contact a, the capacitor 725 is charged by the output current of the constant current circuit 721, and the terminal voltage rises gradually to the high potential "Hu." When the switch circuit 720 makes connection to its contact b, the capacitor 725 is discharged by the output current of the constant current circuit 722, and the terminal voltage lowers gradually to the ground potential (0 V). As a result, the terminal voltage signal R1 of the capacitor 725 changes responding with the switching pulse signal Wp and becomes a slew-rate switching signal which has moderate voltage slopes at its rising and falling edges. The current values of the constant current circuits 721 and 722 are switched by the change command signal Dh of the change command part 94. When the change command signal Dh is "L," the current values of the constant current circuits 521 and 522 become relatively small. The slew-rate switching signal R1 at the capacitor 525 becomes a slow slew-rate switching signal R1a which has moderate voltage slopes. When the change command signal Dh is "H," the current values of the constant current circuits 721 and 722 become relatively large. The slew-rate switching signal R1 at the capacitor 725 becomes a fast slew-rate switching signal R1b which has steep voltage slopes. The relationship among the switching pulse signal Wp, the slow slew-rate switching signal R1a, the fast slew-rate switching signal R1b and the auxiliary switching pulse signals Wha and Whb is similar to that shown in the parts (a) to (f) in FIG. 27.

When the change command signal Dh is "L," the slow slew-rate switching signal R1a is produced responding with the switching pulse signal Wp. The rising time Tra and the falling time Tfa of the slow slew-rate switching signal R1a are made long. In addition, the auxiliary switching pulse signal Wha is produced responding with the switching pulse signal Wp. The opening time Tha from the falling edge of the switching pulse signal Wp to the rising edge of the auxiliary switching pulse signal Wha is made long. Furthermore, the opening time Tha from the falling edge of the switching pulse signal Wp to the rising edge of the auxiliary switching pulse signal Wha is made longer than the falling time Tfa of the slow slew-rate switching signal R1a (Tha>Tfa).

When the change command signal Dh is "H," the slow slew-rate switching signal R1b is produced responding with the switching pulse signal Wp. The rising time Trb and the falling time Tfb of the slow slew-rate switching signal R1b are made short. In addition, the auxiliary switching pulse signal Whb is produced responding with the switching pulse signal Wp. The opening time Thb from the falling edge of the switching pulse signal Wp to the rising edge of the auxiliary switching pulse signal Whb is made short. Furthermore, the opening time Thb from the falling edge of the switching pulse signal Wp to the rising edge of the auxiliary switching pulse signal Whb is made longer than the falling time Tfb of the slow slew-rate switching signal R1b (Thb>Tfb).

Figure 31:
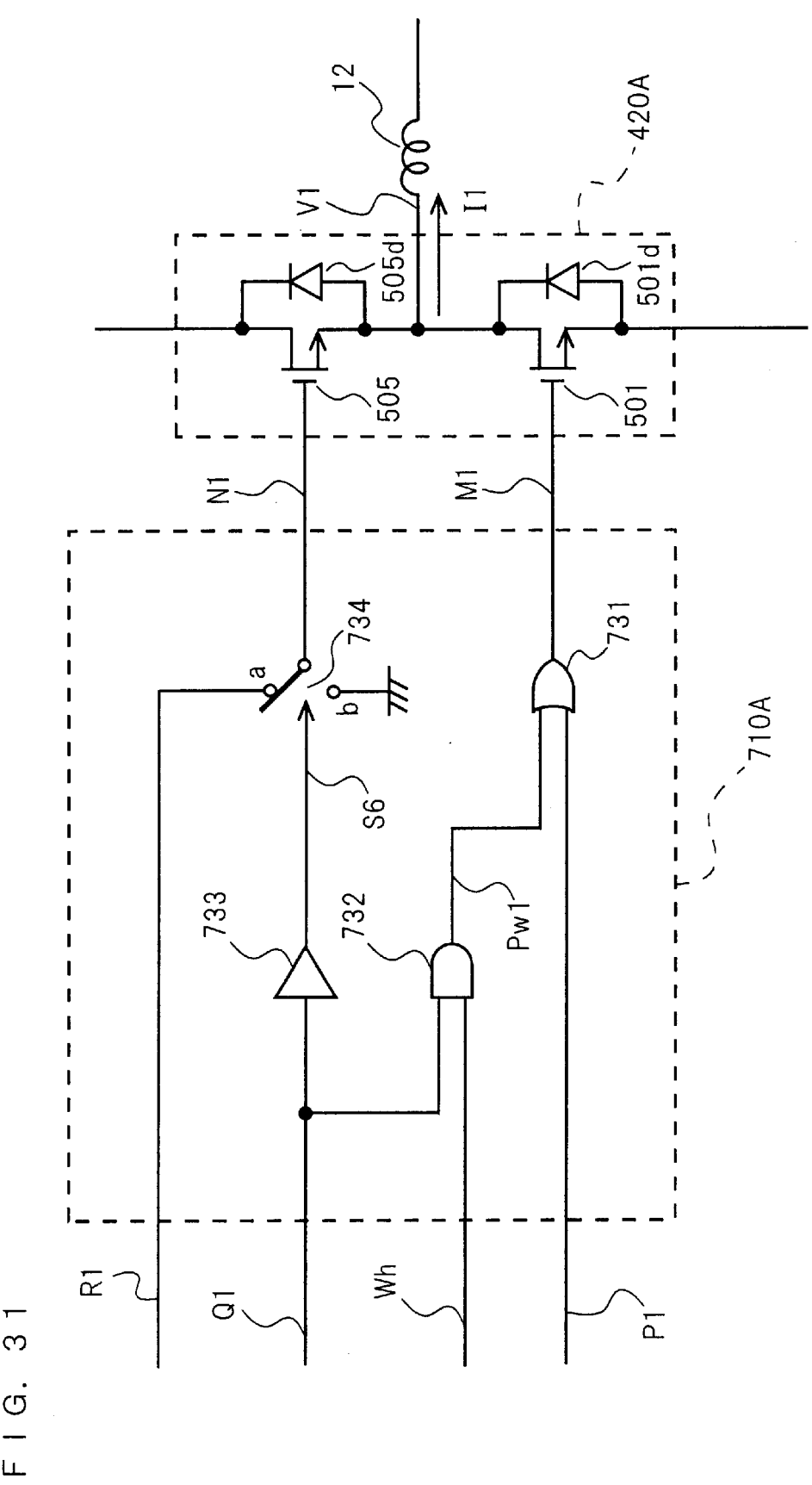
FIG. 31 is a diagram showing configurations of a first activation control part 710A and the first power supply circuit 420A in accordance with the embodiment 4.
Figure 32:
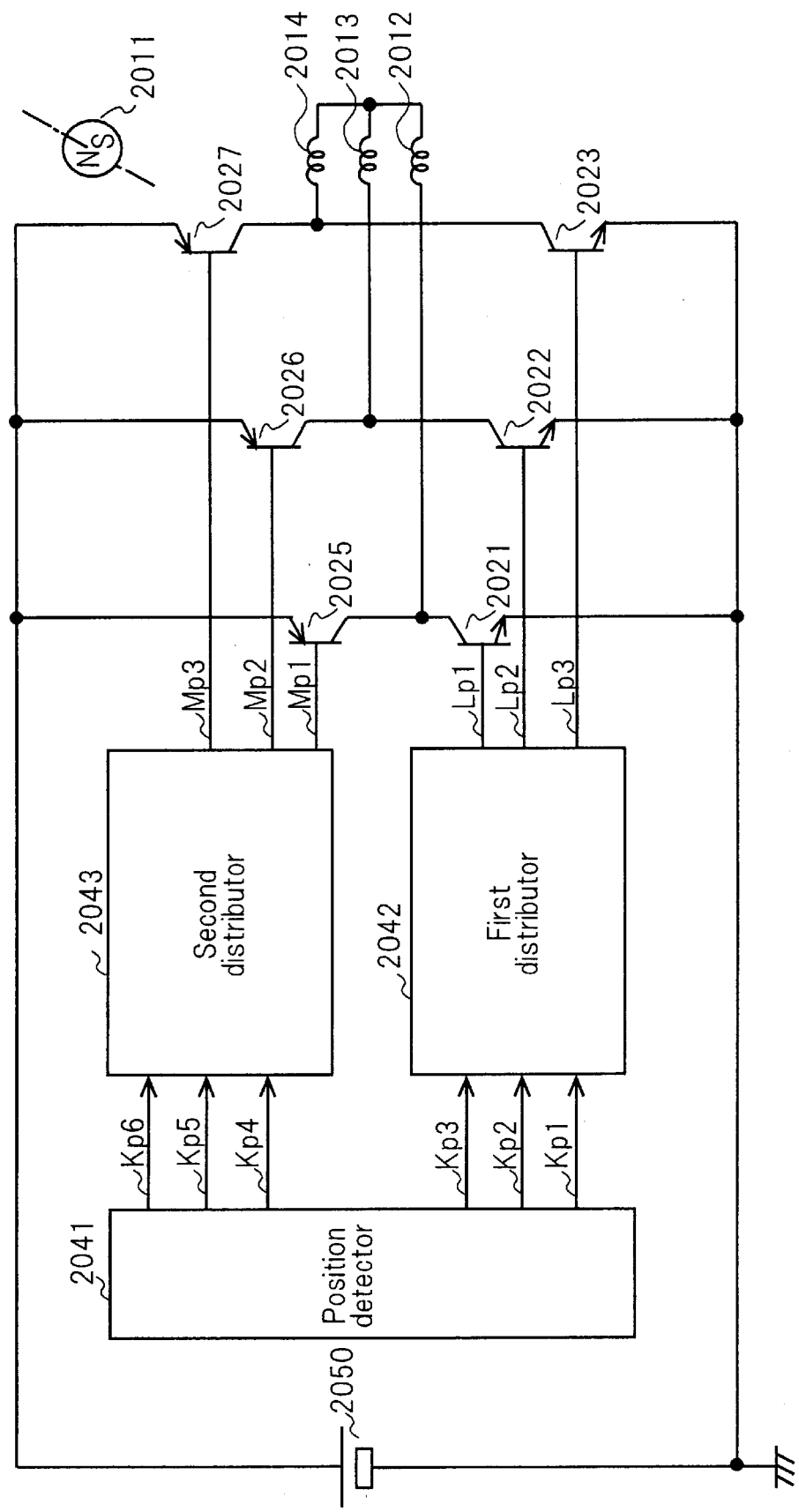
FIG. 32 is a diagram showing the configuration of the conventional motor.

FIG. 31 shows configurations of the first activation control part 710A and the first power supply circuit 420A. The first power supply circuit 420A comprises the low-side power transistor 501, the high-side power transistor 505, the low-side power diode 501d and the high-side power diode 505d. The first power supply circuit 420A supplies the drive voltage signal V1 and the drive current signal I1 to the power supply terminal of the winding 12 responding with the low-side activation control signal M1 and the high-side activation control signal N1. The high-side power transistor 505 and the low-side power transistor 501 are formed of N-channel FET power transistors. The high-side power diode 505d and the low-side power diode 501d are formed of parasitic diodes which are reversely connected to these FET power transistors, respectively.

The first activation control part 710A comprises an OR circuit 731, an AND circuit 732, a buffer circuit 733 and a switch circuit 734. The buffer circuit 733 buffers the high-side position signal Q1, and produces a switch change signal S6. The switch circuit 734 makes connection to its contact a when the switch change signal S6 is "H," and makes connection to its contact b when the switch change signal S6 is "L." The slew-rate switching signal R1 is connected to the contact a of the switch circuit 734, and the ground potential (0 V) is connected to the contact b of the switch circuit 734. The switch circuit 734 outputs the high-side activation control signal N1, and the high-side activation control signal N1 is supplied to the control terminal of the high-side power transistor 505. The AND circuit 732 executes a logical AND operation of the high-side position signal Q1 and the auxiliary switching pulse signal Wh, and produces the auxiliary switching activation pulse signal Pw1. The OR circuit 731 executes a logical OR operation of the low-side position signal P1 and the auxiliary switching activation pulse signal Pw1, and outputs the low-side activation control signal M1. The low-side activation control signal M1 is supplied to the control terminal of the low-side power transistor 501.

First, when the low-side position signal P1 is "L" and the high-side position signal Q1 is "L," the switch change signal S6 (the output of the buffer circuit 733) is "L," and the high-side activation control signal N1 (the output of the switch circuit 734) is the ground potential (0 V), whereby the high-side power transistor 505 of the first power supply circuit 420A is OFF. The output signal of the AND circuit 732 is "L," and the low-side activation control signal M1 (the output of the OR circuit 731) is "L," whereby the low-side power transistor 501 of the first power supply circuit 420A is OFF. As a result, in the case of P1="L" and Q1="L," the first power supply circuit 420A does not supply power to the winding 12.

Since the rotor 11 rotates by the generated drive force, the low-side position signal P1 becomes "H" and the high-side position signal Q1 is still "L." The low-side activation control signal M1 (the output of the OR circuit 731) becomes "H," whereby the low-side power transistor 501 of the first power supply circuit 420A turns ON. The switch change signal S6 of the buffer circuit 733 is "L," and the high-side activation control signal N1 (the output of the switch circuit 734) is the ground potential (0 V), whereby the high-side power transistor 505 of the first power supply circuit 420A is OFF. As a result, in the case of P1="H" and Q1="L," the first power supply circuit 420A supplies the negative part of the drive current signal I1 to the power supply terminal of the winding 12.

Since the rotor 11 further rotates by the generated drive force, the low-side position signal P1 becomes "L" and the high-side position signal Q1 is "L." The high-side activation control signal N1 becomes the ground potential, and the low-side activation control signal M1 becomes "L." Hence, the high-side power transistor 505 and the low-side power transistor 501 turn OFF. In other words, the first power supply circuit 420A does not supply a power to the power supply terminal of the winding 12.

Since the rotor 11 further rotates by the generated drive force, the low-side position signal P1 is "L" and the high-side position signal Q1 becomes "H." The switch change signal S6 (the output of the buffer circuit 733) becomes "H," and the switch circuit 734 makes connection to its contact a. Hence, the high-side activation control signal N1 coincides with the slew-rate switching signal R1. As a result, the high-side power transistor 505 of the first power supply circuit 420A performs high-frequency switching operation responding with the slew-rate switching signal R1. Since the auxiliary switching activation pulse signal Pw1 (the output of the AND circuit 732) coincides with the auxiliary switching pulse signal Wh, the low-side activation control signal M1 (the output of the OR circuit 731) coincides with the auxiliary switching pulse signal Wh. Hence, the low-side power transistor 501 of the first power supply circuit 420A performs high-frequency switching operation responding with the auxiliary switching pulse signal Wh. As a result, in the case of P1="L" and Q1="H," the high-side power transistor 505 of the first power supply circuit 420A performs ON-OFF high-frequency switching operation responding with the slew-rate switching signal R1 of the slew-rate part 705. Furthermore, the low-side power transistor 501 performs auxiliary OFF-ON high-frequency switching operation responding with the auxiliary switching pulse signal Wh. In other words, during the OFF time of the high-frequency switching operation of the high-side power transistor 505, the low-side power transistor 501 or the low-side power diode 501d is activated, and the positive part of the drive current signal I1 is supplied to the winding 12 continuously. Thus, in the case of P1="L" and Q1="H," the first power supply circuit 420A supplies the positive part of the drive current signal I1 to the power supply terminal of the winding 12.

When the change command signal Dh is "L," the current values of the constant current circuits 721 and 722 become small, and the slow slew-rate switching signal R1a is output from the slew-rate part 705. Hence, the high-side power transistor 505 of the first power supply circuit 420A performs ON-OFF high-frequency switching operation by following the slow slew-rate switching signal R1a, and the terminal voltage V1 becomes a high-frequency switching drive voltage signal with a low slew rate. Furthermore, the rising edge of the auxiliary switching pulse signal Wha occurs after a delay of the opening time Tha from the falling edge of the single switching pulse signal Wp. In other words, an OFF period is provided between the effective period of the slow slew-rate switching signal R1a and the effective period of the auxiliary switching pulse signal Wha. As a result, the low-side power transistor 501 becomes OFF surely during the ON period of the high-side power transistor 505. In other words, the high-side power transistor 505 and the low-side power transistor 501 are prevented from turning ON simultaneously. Still further, after the high-side power transistor 505 is turned OFF, the auxiliary switching pulse signal Wha turns ON the low-side power transistor 501. This remarkably reduces a power loss due to the low-side power diode 501d.

When the change command signal Dh is "H," the current values of the constant current circuits 721 and 722 become large, and the fast slew-rate switching signal R1b is output from the slew-rate part 705. Hence, the high-side power transistor 505 of the first power supply circuit 420A performs ON-OFF high-frequency switching, operation by following the fast slew-rate switching signal R1b, and the terminal voltage V1 becomes a high-frequency switching drive voltage signal with a high slew rate. Furthermore, the rising edge of the auxiliary switching pulse signal Whb occurs after a delay of the opening time Thb from the falling edge of the single switching pulse signal Wp. In other words, an OFF period is provided between the effective period of the fast slew-rate switching signal R1b and the effective period of the auxiliary switching pulse signal Whb. As a result, the low-side power transistor 501 becomes OFF surely during the ON period of the high-side power transistor 505. In other words, the high-side power transistor 505 and the low-side power transistor 501 are prevented from turning ON simultaneously. Still further, after the high-side power transistor 505 is turned OFF, the auxiliary switching pulse signal Whb turns ON the low-side power transistor 501. This reduces a power loss due to the low-side power diode 501d. Still further, since the high-side power transistor follows the fast slew-rate switching signal with a fast slew rate, the switching loss of the high-side power transistor is further reduced. Thus a disk drive apparatus with a low power consumption is realized.

The configurations and operations of the first activation control part 710A and the first power supply circuit 420A are described above. However, the configurations and operations of the second activation control part 710B, the third activation control part 710C, the second power supply circuit 420B, the third power supply circuit 420C are similar to those described above. The slew-rate part 705 produces the single slew-rate switching signal R1 responding with the single switching pulse signal Wp. The first activation control part 710A, the second activation control part 710B and the third activation control part 710C supply the slew-rate switching signal R1 to the control terminals of one or two of the high-side power transistors responding with the high-side position signals Q1, Q2 and Q3. Hence, the one or two of the high-side power transistors perform high-frequency switching operation simultaneously responding with the single slew-rate switching signal R1.

This embodiment can also obtain the actions and effects similar to those of the above-mentioned embodiment 1, embodiment 2 or embodiment 3.

In this embodiment, the single slew-rate switching signal R1 is produced responding with the single switching pulse signal Wp, and the power transistors are subjected to high-frequency switching operation responding with the slew-rate switching signal. Hence, the number of components, such as capacitors, for producing the slew-rate switching signals can be reduced, thereby being suited for integration into an IC. Furthermore, since the FET power transistors are used as the high-side power transistors, the waveform of the slew-rate switching signal is not disturbed even when the slew-rate switching signal of the capacitor is directly supplied to the control terminals of the FET power transistors. Furthermore, the low-side power transistors perform auxiliary OFF-ON high-frequency switching operation complementarily to the ON-OFF high-frequency switching operation of the high-side power transistor, thereby remarkably reducing the power loss of the low-side power diode. Still further, when two high-side power transistors alter current paths to the three-phase windings, the two high-side power transistors execute high-frequency switching operation substantially simultaneously responding with the single slew-rate switching signal. Therefore, the two low-side power transistors corresponding to the two high-side power transistors execute complementarily auxiliary OFF-ON high-frequency switching operation substantially simultaneously responding with the single auxiliary switching pulse signal. This can be achieved easily by a simple configuration. As a result, a high-performance disk drive apparatus with a low power consumption and a low noise and a high-performance motor with a low power consumption can be realized at low cost.

Furthermore, in this embodiment, only the high-side power transistors are simultaneously subjected to high-frequency switching operation responding with the slew-rate switching signal, whereby highly accurate current control is realized by a simple configuration. However, the present invention is not limited to such a case. For example, the low-side power transistors can be subjected to high-frequency switching operation, or the high-side power transistors and the low-side power transistors can be subjected to high-frequency switching operation at appropriate times. In addition, this embodiment has various advantages similar to those of the above-mentioned embodiment 1, embodiment 2 and embodiment 3.

The configurations of the above-mentioned embodiments can be modified variously. Each of the three-phase windings can be formed by connecting a number of partial winding portions in series or in parallel, for example. The connection of the three-phase windings is not limited to star connection, but delta connection can be used. Furthermore, the number of the phases of the windings is not limited to three. Generally, it is possible to realize a configuration having windings with a plurality of phases. In addition, the number of the magnetic poles in the field part of the rotor is not limited to two, but multi-poles larger than two can be used.

In the above-mentioned embodiments, the current detecting part is realized simply by using a single resistor. The present invention, however, is not limited to such a configuration, but various current detecting methods can be used. For example, the current detecting part can detect a composed value of the negative parts of the three-phase drive current signals. Furthermore, each of the low-side FET power transistors and the high-side FET power transistors can have multiple output terminals, and the current of one of the terminals can be detected, whereby the current detecting resistor can be eliminated.

In addition, in the above-mentioned embodiments, FET power transistors are used as the power transistors of the power supplying part so as to carry out high-frequency switching operation easily. With this configuration, the power losses and the heat generation of the power transistors are reduced remarkably, whereby the power transistors can be formed into an IC easily. Furthermore, the power transistors are not limited to junction-isolated double-diffused FET power transistors suited for an IC, but dielectric-isolated FET power transistors can be used as the power transistors. The present invention, however, is not limited to such a configuration. For example, bipolar transistors or IGBT transistors can be used as the power transistors.

Furthermore, in the above-mentioned embodiments, the slew-rate switching signal is produced easily by charging and discharging a capacitor. However, instead of such a configuration, the switching pulse signal Wp can be directly used as the fast slew-rate switching signal.

In addition, in the above-mentioned embodiments, since the slew-rate switching signals are produced responding with the single switching pulse signal, it is easy to produce the slew-rate switching signals simultaneously and to achieve the high-frequency switching operation of the power transistors simultaneously. However, instead of such a configuration, a number of slew-rate switching signals responding with multi-phase switching pulse signals can be used.

Furthermore, in the above-mentioned embodiments, since the position signals are produced responding with the terminal voltages of the three-phase windings, position detecting elements are made unnecessary. However, instead of such a configuration, position detecting elements for detecting the magnetic poles of the field part of the rotor can be used.

Still further, although the motor of the present invention is suited for use in a disk drive apparatus, the motor can be used widely to drive rotating components in an office-automation apparatus and an audio-visual apparatus. Moreover, the motor can generally be used widely as a motor for speed control.

In addition, the configuration of the present invention can be modified variously without departing from the purpose of the present invention, and it is needless to say that such modifications can be included in the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A disk drive apparatus comprising:

head means for reproducing a signal from a disk;

processing means for processing an output signal from said head means and outputting a processed signal;

a rotor, having a field part which generates field fluxes, for driving said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said disk; and switching operation means for causing at least one of said Q first power transistors and said Q second power transistors to perform high-frequency switching responding with said command signal; and that said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces at least a slew-rate switching signal which responds with said switching pulse signal at a control terminal side of at least one power transistor among said Q first power transistors and said Q second power transistors, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

2. The disk drive apparatus in accordance with claim 1, wherein said activation operation means produces two slew-rate switching signals which responds with said switching pulse signal at control terminal sides of two of said Q first power transistors and causes said two of said Q first power transistors to perform high-frequency switching substantially simultaneously responding with said switching pulse signal, when said two of said Q first power transistors alter current paths to said Q-phase windings.

3. The disk drive apparatus in accordance with claim 1, wherein said activation operation means causes two of said Q first power transistors to perform high-frequency switching substantially simultaneously responding with said switching pulse signal when said two of said Q first power transistors alter current paths to said Q-phase windings.

4. The disk drive apparatus in accordance with claim 1, wherein said switching operation means produces a noise eliminating signal which responds with said switching pulse signal, and said position detecting means executes or stops detection of terminal voltages of said Q-phase windings responding with said noise eliminating signal, thereby producing said position signal which responds with the terminal voltages of said Q-phase windings.

5. The disk drive apparatus in accordance with claim 4, wherein said position detecting means stops the detection of terminal voltages of said Q-phase windings responding with said noise eliminating signal in at least slope periods of said at least a slew-rate switching signal.

6. The disk drive apparatus in accordance with claim 1, wherein said activation operation means causes at least one of said Q first power transistors to perform ON-OFF high-frequency switching responding with said at least a slew-rate switching signal, produces at least an auxiliary switching pulse signal which responds with said switching pulse signal, and causes at least one of said Q second power transistors to perform auxiliary OFF-ON high-frequency switching responding with said at least an auxiliary switching pulse signal, said at least an auxiliary switching pulse signal being substantially complementary to said at least a slew-rate switching signal.

7. The disk drive apparatus in accordance with claim 6, wherein said switching operation means provides an off period between an effective period of said at least a slew-rate switching signal and an effective period of said at least an auxiliary switching pulse signal.

8. The disk drive apparatus in accordance with claim 1, wherein said activation operation means includes:

capacitor means, and charge-discharge means for charging or discharging said capacitor means responding with said switching pulse signal, thereby producing said at least a slew-rate switching signal.

9. A disk drive apparatus comprising:

head means for reproducing a signal from a disk;

processing means for processing an output signal from said head means and outputting a processed signal;

a rotor, having a field part which generates field fluxes, for driving said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said disk; and switching operation means for causing at least one of said Q first power transistors and said Q second power transistors to perform high-frequency switching responding with said command signal; and that each of said Q first power transistors is a first NMOS-FET power transistor for forming a current path from the positive terminal side of said voltage supplying means to one of said Q-phase windings, each of said Q second power transistors is a second NMOS-FET power transistor for forming a current path from the negative terminal side of said voltage supplying means to one of said Q-phase windings, said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces at least a slew-rate switching signal at a control terminal side of at least one power transistor among said first NMOS-FET power transistors responding with said switching pulse signal, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

10. The disk drive apparatus in accordance with claim 9, wherein said activation operation means produces two slew-rate switching signals which responds with said switching pulse signal at control terminal sides of two of said first NMOS-FET power transistors and causes said two of said first NMOS-FET power transistors to perform high-frequency switching substantially simultaneously responding with said switching pulse signal, when said two of said first NMOS-FET power transistors alter current paths to said Q-phase windings.

11. The disk drive apparatus in accordance with claim 9, wherein said activation operation means causes two of said first NMOS-FET power transistors to perform high-frequency switching substantially simultaneously responding with said switching pulse signal when said two of said first NMOS-FET power transistors alter current paths to said Q-phase windings.

12. The disk drive apparatus in accordance with claim 9, wherein said switching operation means produces a noise eliminating signal which responds with said switching pulse signal, and said position detecting means executes or stops detection of terminal voltages of said Q-phase windings responding with said noise eliminating signal, thereby producing said position signal which responds with the terminal voltages of said Q-phase windings.

13. The disk drive apparatus in accordance with claim 12, wherein said position detecting means stops the detection of terminal voltages of said Q-phase windings responding with said noise eliminating signal in at least slope periods of said at least a slew-rate switching signal.

14. The disk drive apparatus in accordance with claim 9, wherein said activation operation means causes at least one of said Q first power transistors to perform ON-OFF high-frequency switching responding with said at least a slew-rate switching signal, produces at least an auxiliary switching pulse signal which responds with said switching pulse signal, and causes at least one of said Q second power transistors to perform auxiliary OFF-ON high-frequency switching responding with said at least an auxiliary switching pulse signal, said at least an auxiliary switching pulse signal being substantially complementary to said at least a slew-rate switching signal.

15. The disk drive apparatus in accordance with claim 14, wherein said switching operation means provides an off period between an effective period of said at least a slew-rate switching signal and an effective period of said at least an auxiliary switching pulse signal.

16. The disk drive apparatus in accordance with claim 9, wherein said activation operation means includes:
capacitor means, and
charge-discharge means for charging or discharging said capacitor means responding with said switching pulse signal, thereby producing said at least a slew-rate switching signal.

17. A disk drive apparatus comprising:

head means for reproducing a signal from a disk;

processing means for processing an output signal from said head means and outputting a processed signal;

a rotor, having a field part which generates field fluxes, for driving said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said disk; and switching operation means for causing at least one of said Q first power transistors and said Q second power transistors to perform high-frequency switching responding with said command signal; and that said switching operation means includes:
current detecting means for producing a current detection signal which responds with or corresponds to a composed current to said Q-phase windings from said voltage supplying means, and
switching control means for producing a switching pulse signal which responds with said current detection signal and said command signal, and
said activation operation means produces two slew-rate switching signals which responds with said switching pulse signal at control terminal sides of two of said Q first power transistors, each of said two slew-rate switching signals having a smoothed voltage slope in at least one of rising and falling slopes, and causes said two of said Q first power transistors to perform high-frequency switching substantially simultaneously responding with said two slew-rate switching signals, when said two of said Q first power transistors alter current paths to said Q-phase windings while at least one of said Q second power transistors remains ON without ON-OFF switching.

18. The disk drive apparatus in accordance with claim 17, wherein said activation operation means supplies two high-frequency switching drive voltage signals to two terminals of said Q-phase windings when said two of said Q first power transistors alter current paths to said Q-phase windings while said at least one of said Q second power transistors remains ON without ON-OFF switching, each of said two high-frequency switching drive voltage signals having smoothed voltage slopes and responding with said current detection signal and said command signal.

19. The disk drive apparatus in accordance with claim 17, wherein said switching operation means produces a noise eliminating signal which responds with said switching pulse signal, and said position detecting means executes or stops detection of terminal voltages of said Q-phase windings responding with said noise eliminating signal, thereby producing said position signal which responds with the terminal voltages of said Q-phase windings.

20. The disk drive apparatus in accordance with claim 19, wherein
said position detecting means stops the detection of terminal voltages of said Q-phase windings responding with said noise eliminating signal in at least slope periods of said at least a slew-rate switching signal.

21. A motor comprising:
a rotor having a field part which generates field fluxes;
Q-phase windings (Q is an integer of 3 or more);
voltage supplying means, including two output terminals, for supplying a DC voltage;
power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
position detecting means for producing a position signal which responds with the rotation of said rotor;
activation operation means for controlling active periods of said Q first power transistors and said Q second power transistors responding with an output signal of said position detecting means, each of said active periods being larger than the period of 360/Q electrical degrees;
commanding means for producing a command signal which responds with a rotational speed of said rotor; and
switching operation means for causing at least one of said Q first power transistors and said Q second power transistors to perform high-frequency switching responding with said command signal; and that
said switching operation means includes:
current detecting means for producing a current detection signal which responds with or corresponds to a composed current to said Q-phase windings from said voltage supplying means, and
switching control means for producing a switching pulse signal which responds with said current detection signal and said command signal, and
said activation operation means produces at least a slew-rate switching signal which responds with said switching pulse signal at a control terminal side of at least one power transistor among said Q first power transistors and said Q second power transistors, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

22. The motor in accordance with claim 21, wherein
said activation operation means produces two slew-rate switching signals which responds with said switching pulse signal at control terminal sides of two of said Q first power transistors and causes said two of said Q first power transistors to perform high-frequency switching substantially simultaneously responding with said switching pulse signal, when said two of said Q first power transistors alter current paths to said Q-phase windings.

23. The motor in accordance with claim 21, wherein
said activation operation means causes two of said Q first power transistors to perform high-frequency switching substantially simultaneously responding with said switching pulse signal when said two of said Q first power transistors alter current paths to said Q-phase windings.

24. The motor in accordance with claim 21, wherein
said switching operation means produces a noise eliminating signal which responds with said switching pulse signal, and
said position detecting means executes or stops detection of terminal voltages of said Q-phase windings responding with said noise eliminating signal, thereby producing said position signal which responds with the terminal voltages of said Q-phase windings.

25. The motor in accordance with claim 24, wherein
said position detecting means stops the detection of terminal voltages of said Q-phase windings responding with said noise eliminating signal in at least slope periods of said at least a slew-rate switching signal.

26. The motor in accordance with claim 21, wherein
said activation operation means causes at least one of said Q first power transistors to perform ON-OFF high-frequency switching responding with said at least a slew-rate switching signal, produces at least an auxiliary switching pulse signal which responds with said switching pulse signal, and causes at least one of said Q second power transistors to perform auxiliary OFF-ON high-frequency switching responding with said at least an auxiliary switching pulse signal, said at least an auxiliary switching pulse signal being substantially complementary to said at least a slew-rate switching signal.

27. The motor in accordance with claim 26, wherein
said switching operation means provides an off period between an effective period of said at least a slew-rate switching signal and an effective period of said at least an auxiliary switching pulse signal.

28. The motor in accordance with claim 21, wherein
said activation operation means includes:
capacitor means, and
charge-discharge means for charging or discharging said capacitor means responding with said switching pulse signal, thereby producing said at least a slew-rate switching signal.

29. A motor comprising:
a rotor having a field part which generates field fluxes;
Q-phase windings (Q is an integer of 3 or more);
voltage supplying means, including two output terminals, for supplying a DC voltage;
power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
position detecting means for producing a position signal which responds with the rotation of said rotor;

activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said rotor; and switching operation means for causing at least one of said Q first power transistors and said Q second power transistors to perform high-frequency switching responding with said command signal; and that each of said Q first power transistors is a first NMOS-FET power transistor for forming a current path from the positive terminal side of said voltage supplying means to one of said Q-phase windings, each of said Q second power transistors is a second NMOS-FET power transistor for forming a current path from the negative terminal side of said voltage supplying means to one of said Q-phase windings, said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces at least a slew-rate switching signal at a control terminal side of at least one power transistor among said first NMOS-FET power transistors responding with said switching pulse signal, said at least a slew-rate switching signal having a smoothed voltage slope in at least one of rising and falling slopes, and causes said at least one power transistor to follow said at least a slew-rate switching signal, thereby supplying a high-frequency switching drive voltage signal to one terminal of said Q-phase windings, said high-frequency switching drive voltage signal having smoothed voltage slopes and responding with said current detection signal and said command signal.

30. The motor in accordance with claim 29, wherein said activation operation means produces two slew-rate switching signals which responds with said switching pulse signal at control terminal sides of two of said first NMOS-FET power transistors and causes said two of said first NMOS-FET power transistors to perform high-frequency switching substantially simultaneously responding with said switching pulse signal, when said two of said first NMOS-FET power transistors alter current paths to said Q-phase windings.

31. The motor in accordance with claim 29, wherein said activation operation means causes two of said first NMOS-FET power transistors to perform high-frequency switching substantially simultaneously responding with said switching pulse signal when said two of said first NMOS-FET power transistors alter current paths to said Q-phase windings.

32. The motor in accordance with claim 29, wherein said switching operation means produces a noise eliminating signal which responds with said switching pulse signal, and said position detecting means executes or stops detection of terminal voltages of said Q-phase windings responding with said noise eliminating signal, thereby producing said position signal which responds with the terminal voltages of said Q-phase windings.

33. The motor in accordance with claim 32, wherein said position detecting means stops the detection of terminal voltages of said Q-phase windings responding with said noise eliminating signal in at least slope periods of said at least a slew-rate switching signal.

34. The motor in accordance with claim 29, wherein said activation operation means causes at least one of said Q first power transistors to perform ON-OFF high-frequency switching responding with said at least a slew-rate switching signal, produces at least an auxiliary switching pulse signal which responds with said switching pulse signal, and causes at least one of said Q second power transistors to perform auxiliary OFF-ON high-frequency switching responding with said at least an auxiliary switching pulse signal, said at least an auxiliary switching pulse signal being substantially complementary to said at least a slew-rate switching signal.

35. The motor in accordance with claim 34, wherein said switching operation means provides an off period between an effective period of said at least a slew-rate switching signal and an effective period of said at least an auxiliary switching pulse signal.

36. The motor in accordance with claim 29, wherein said activation operation means includes:

capacitor means, and charge-discharge means for charging or discharging said capacitor means responding with said switching pulse signal, thereby producing said at least a slew-rate switching signal.

37. A motor comprising:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

position detecting means for producing a position signal which responds with the rotation of said rotor, activation operation means for controlling active periods of said Q first power transistors and said Q second power transistors responding with an output signal of said position detecting means, each of said active periods being larger than the period of 360/Q electrical degrees;

commanding means for producing a command signal which responds with a rotational speed of said rotor; and switching operation means for causing at least one of said Q first power transistors and said Q second power transistors to perform high-frequency switching responding with said command signal; and that said switching operation means includes:

current detecting means for producing a current detection signal which responds with or corresponds to a composed current to said Q-phase windings from said voltage supplying means, and switching control means for producing a switching pulse signal which responds with said current detection signal and said command signal, and said activation operation means produces two slew-rate switching signals which responds with said switching pulse signal at control terminal sides of two of said Q first power transistors, each of said two slew-rate switching signals having a smoothed voltage slope in at least one of rising and falling slopes, and causes said two of said Q first power transistors to perform high-frequency switching substantially simultaneously responding with said two slew-rate switching signals, when said two of said Q first power transistors alter current paths to said Q-phase windings while at least one of said Q second power transistors remains ON without ON-OFF switching.

38. The motor in accordance with claim 37, wherein said activation operation means supplies two high-frequency switching drive voltage signals to two terminals of said Q-phase windings when said two of said Q first power transistors alter current paths to said Q-phase windings while said at least one of said Q second power transistors remains ON without ON-OFF switching, each of said two high-frequency switching drive voltage signals having smoothed voltage slopes and responding with said current detection signal and said command signal.

39. The motor in accordance with claim 37, wherein said switching operation means produces a noise eliminating signal which responds with said switching pulse signal, and said position detecting means executes or stops detection of terminal voltages of said Q-phase windings responding with said noise eliminating signal, thereby producing said position signal which responds with the terminal voltages of said Q-phase windings.

40. The motor in accordance with claim 39, wherein said position detecting means stops the detection of terminal voltages of said Q-phase windings responding with said noise eliminating signal in at least slope periods of said at least a slew-rate switching signal.

* * * * *